US012739864B2

(12) United States Patent
Yi et al.

(10) Patent No.: US 12,739,864 B2
(45) Date of Patent: Sep. 15, 2026

(54) TRANSMISSION CONFIGURATION INDICATION STATE PARTITIONING IN MULTI-BEAM SCENARIOS

(71) Applicant: KONINKLIJKE PHILIPS N.V., Eindhoven (NL)

(72) Inventors: Yunjung Yi, Vienna, VA (US); Esmael Hejazi Dinan, McLean, VA (US); Ali Cagatay Cirik, Chantilly, VA (US); Hua Zhou, Vienna, VA (US); Hyoungsuk Jeon, Centreville, VA (US); Alireza Babaei, Fairfax, VA (US); Kyungmin Park, Vienna, VA (US); Youngwoo Kwak, Woodbury, NY (US)

(73) Assignee: Koninklijke Philips N.V., Eindhoven (NL)

(*) Notice: Subject to any disclaimer, the term of this patent is extended or adjusted under 35 U.S.C. 154(b) by 198 days.

(21) Appl. No.: 17/866,113

(22) Filed: Jul. 15, 2022

(65) Prior Publication Data

US 2022/0353869 A1 Nov. 3, 2022

Related U.S. Application Data

(63) Continuation of application No. 16/864,322, filed on May 1, 2020, now Pat. No. 11,395,303.

(Continued)

(51) Int. Cl.

*H04W 4/00* (2018.01)
*H04L 5/00* (2006.01)

(Continued)

(52) U.S. Cl.

CPC ........... *H04W 72/53* (2023.01); *H04L 5/0082* (2013.01); *H04L 5/0092* (2013.01); *H04W 8/24* (2013.01);

(Continued)

(58) Field of Classification Search

None

See application file for complete search history.

(56) References Cited

U.S. PATENT DOCUMENTS

2019/0199571 A1* 6/2019 John Wilson ......... H04L 5/0094
2019/0342907 A1 11/2019 Huang et al.

(Continued)

OTHER PUBLICATIONS

3GPP TS 38.213 V15.5.0 (Mar. 2019); Technical Specification; 3rd Generation Partnership Project; Technical Specification Group Radio Access Network; NR; Physical layer procedures for control (Release 15).

(Continued)

*Primary Examiner* — Zewdu A Beyen

(57) ABSTRACT

A wireless device may receive downlink control information (DCI) indicating a resource for reception of a transport block. The wireless device may select, for reception of the transport block, a transmission configuration indicator (TCI) state, among a first TCI state associated with a first set of transmission time intervals (TTIs) and a second TCI state associated with a second set of TTIs, based on which of the first set of TTIs or the second set of TTIs overlaps in time with the resource. The wireless device may receive, based on the TCI state, the transport block via the resource.

20 Claims, 31 Drawing Sheets

Related U.S. Application Data

(60) Provisional application No. 62/842,172, filed on May 2, 2019.

(51) Int. Cl.
*H04W 8/24* (2009.01)
*H04W 72/0446* (2023.01)
*H04W 72/23* (2023.01)
*H04W 72/53* (2023.01)
*H04W 76/27* (2018.01)
*H04W 80/02* (2009.01)

(52) U.S. Cl.
CPC ....... *H04W 72/0446* (2013.01); *H04W 72/23* (2023.01); *H04W 76/27* (2018.02); *H04W 80/02* (2013.01)

(56) References Cited

U.S. PATENT DOCUMENTS

| | | | | |
|---|---|---|---|---|
| 2019/0394793 | A1* | 12/2019 | Venugopal | H04L 27/2646 |
| 2020/0112974 | A1* | 4/2020 | Sun | H04L 1/0027 |
| 2020/0314881 | A1 | 10/2020 | Bagheri et al. | |

OTHER PUBLICATIONS

3GPP TS 38.214 V15.5.0 (Mar. 2019); Technical Specification; 3rd Generation Partnership Project; Technical Specification Group Radio Access Network; NR; Physical layer procedures for data; (Release 15).
3GPP TS 38.321 V15.4.0 (Dec. 2018); Technical Specification; 3rd Generation Partnership Project; Technical Specification Group Radio Access Network; NR; Medium Access Control (MAC) protocol specification; (Release 15).
3GPP TS 38.331 V15.4.0 (Dec. 2018); Technical Specification; 3rd Generation Partnership Project; Technical Specification Group Radio Access Network; NR; Radio Resource Control (RRC) protocol specification; (Release 15).
R1-1904314; 3GPP TSG RAN WG1 Meeting #96bis; Xi'an, China, Apr. 8-12, 2019; Source: Intel Corporation; Title: On Beam Management Enhancement; Agenda item: 7.2.8.3; Document for: Discussion and Decision.
R1-1903971; 3GPP TSG RAN WG1 Meeting #96bis; Xi'an, China, Apr. 8-12, 2019; Agenda Item:7.2.8.3; Source: Huawei, HiSilicon; Title: Enhancements on multi-beam operation.
R1-1904013; 3GPP TSG RAN WG1 #96bis; Xi'an, China, Apr. 8-12, 2019; Source: ZTE; Title:Enhancements on Multi-TRP and Multi-panel Transmission; Agenda item:7.2.8.2.
R1-1904014; 3GPP TSG RAN WG1 Meeting #96bis; Xi'an, China, Apr. 8-12, 2019; Source: ZTE; Title: Enhancements on multi-beam operation; Agenda Item: 7.2.8.3; Document for: Discussion and Decision.
R1-1904021; 3GPP TSG RAN WG1 #96bis; Xi'an, China, Apr. 8-12, 2019; Source: ZTE; Title: Considerations on beam management for multi-TRP; Agenda item:7.2.8.6.
R1-1904208; 3GPP TSG RAN WG1 Meeting #96bis; Xi'an, China, Apr. 8-12, 2019; Agenda item: 7.2.8.2; Source: LG Electronics; Title: Enhancements on multi-TRP/panel transmission; Document for: Discussion and Decision.
R1-1904209; 3GPP TSG RAN WG1 Meeting #96bis; Xi'an, China, Apr. 8-12, 2019; Agenda item: 7.2.8.3; Source: LG Electronics; Title: Discussion on multi-beam based operations and enhancements; Document for: Discussion and Decision.
R1-1904313; 3GPP TSG RAN WG1 Meeting #96bis; Xi'an, China, Apr. 8-12, 2019; Source: Intel Corporation; Title: On multi-TRP/multi-panel transmission; Agenda item: 7.2.8.2.
R1-1904449; 3GPP TSG RAN WG1 Meeting #96bis; Xi'an, China, Apr. 8-12, 2019; Agenda item: 7.2.8.2; Source: Samsung; Title: Enhancements on Multi-TRP/Panel Transmission; Document for: Discussion and Decision.
R1-1904450; 3GPP TSG RAN WG1 96bis; Xi'an, China, Apr. 12-16, 2019; Agenda item: 7.2.8.3; Source: Samsung; Title: Enhancements on multi-beam operations.
R1-1904781; 3GPP TSG RAN WG1 #96bis; Xi'an, China, Apr. 8-12, 2019; Agenda Item: 7.2.8.3; Source: Spreadtrum Communications; Title: Discussion on multi-beam operation; Document for: Discussion and decision.
R1-1904966; 3GPP TSG RAN WG1 #96bis; Xi'an, China, Apr. 8-12, 2019; Source: NTT Docomo, Inc; Title: Enhancements on multi-TRP/panel transmission; Agenda Item: 7.2.8.2.
R1-1904967; 3GPP TSG RAN WG1 #96bis; Xi'an, China, Apr. 8-12, 2019; Source: NTT Docomo, Inc.; Title: Discussion on multi-beam enhancement; Agenda Item: 7.2.8.3.
R1-1905026; 3GPP TSG-RAN WG1 Meeting #96b; Apr. 8-12, 2019; Xi'an, China; Source: Qualcomm Incorporated; Title: Multi-TRP Enhancements; Agenda item: 7.2.8.2.
R1-1905027; 3GPP TSG-RAN WG1 Meeting #96-Bis; Xi'an, China, Apr. 8-12, 2019; Agenda item: 7.2.8.3; Title: Enhancements on Multi-beam Operation; Source: Qualcomm Incorporated.
R1-1905064; 3GPP TSG RAN WG1 #96bis Meeting; Xi'an, China, Apr. 8-12, 2019; Agenda item: 7.2.8.2; Source: Nokia, Nokia Shanghai Bell; Title: Enhancements on Multi-TRP/Panel Transmission.
R1-1905065; 3GPP TSG RAN WG1 #96bis Meeting; Xi'an, China, Apr. 8-12, 2019; Agenda item: 7.2.8.3; Source: Nokia, Nokia Shanghai Bell; Title: Enhancements on Multi-beam Operation.
R1-1905155; 3GPP TSG RAN WG1 Meeting #96bis; Xi'an, China, Apr. 8-12, 2019; Agenda Item: 7.2.4.2.2; Source: KT Corp.; Title: Consideration on Mode 2 resource allocation for NR sidelink.
R1-1905156; 3GPP TSG-RAN WG1 Meeting #96bis; Xi'an, China, Apr. 8-12, 2019; Agenda Item: 7.2.8.3; Source: Ericsson; Title: Enhancements to multi-beam operation.

* cited by examiner

User Plane Protocol Stack

Control Plane Protocol Stack

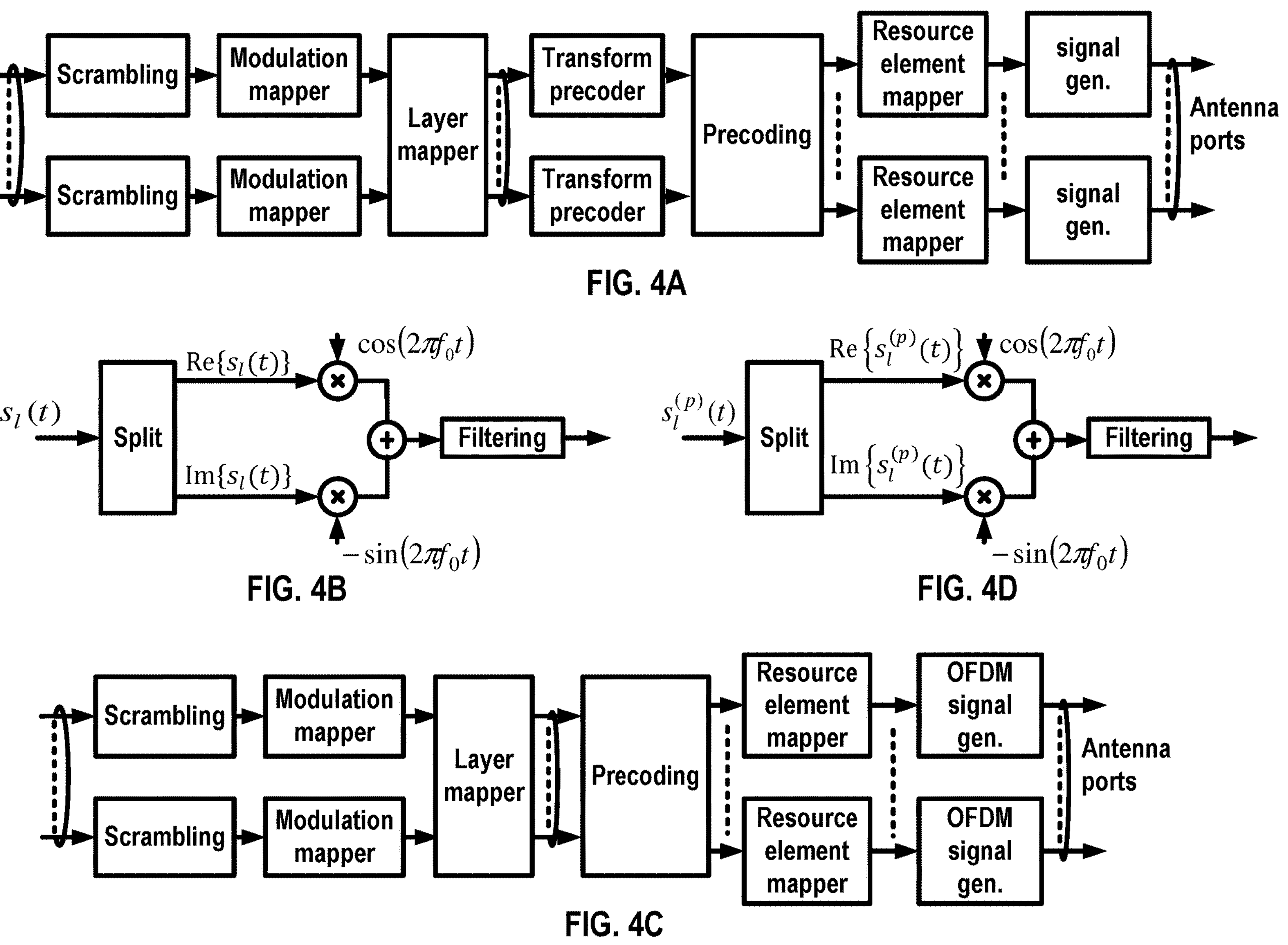

Scrambling
Modulation mapper
Scrambling
Modulation mapper
Layer mapper
Transform precoder
Transform precoder
Precoding
Resource element mapper
Resource element mapper
signal gen.
signal gen.
Antenna ports
FIG. 4A
$s_l(t)$
Split
$\mathrm{Re}\{s_l(t)\}$
$\mathrm{Im}\{s_l(t)\}$
$\cos(2\pi f_0 t)$
$-\sin(2\pi f_0 t)$
Filtering
FIG. 4B
$s_l^{(p)}(t)$
Split
$\mathrm{Re}\{s_l^{(p)}(t)\}$
$\mathrm{Im}\{s_l^{(p)}(t)\}$
$\cos(2\pi f_0 t)$
$-\sin(2\pi f_0 t)$
Filtering
FIG. 4D
Scrambling
Modulation mapper
Scrambling
Modulation mapper
Layer mapper
Precoding
Resource element mapper
Resource element mapper
OFDM signal gen.
OFDM signal gen.
Antenna ports
FIG. 4C

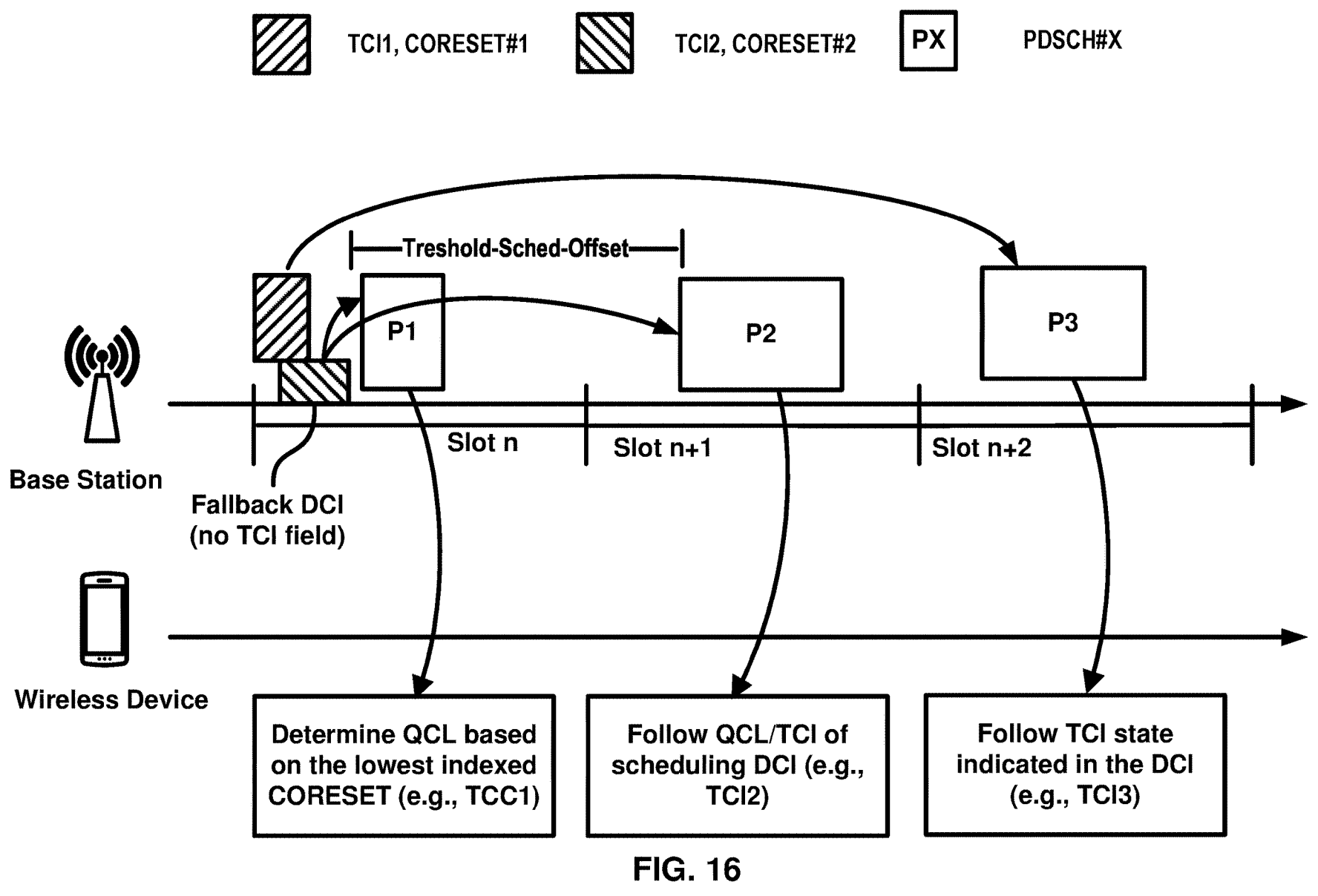

TCI1, CORESET#1

TCI2, CORESET#2

PX PDSCH#X

Base Station

Wireless Device

Fallback DCI
(no TCI field)

Treshold-Sched-Offset

P1

P2

P3

Slot n

Slot n+1

Slot n+2

Determine QCL based on the lowest indexed CORESET (e.g., TCC1)

Follow QCL/TCI of scheduling DCI (e.g., TCI2)

Follow TCI state indicated in the DCI (e.g., TCI3)

FIG. 16

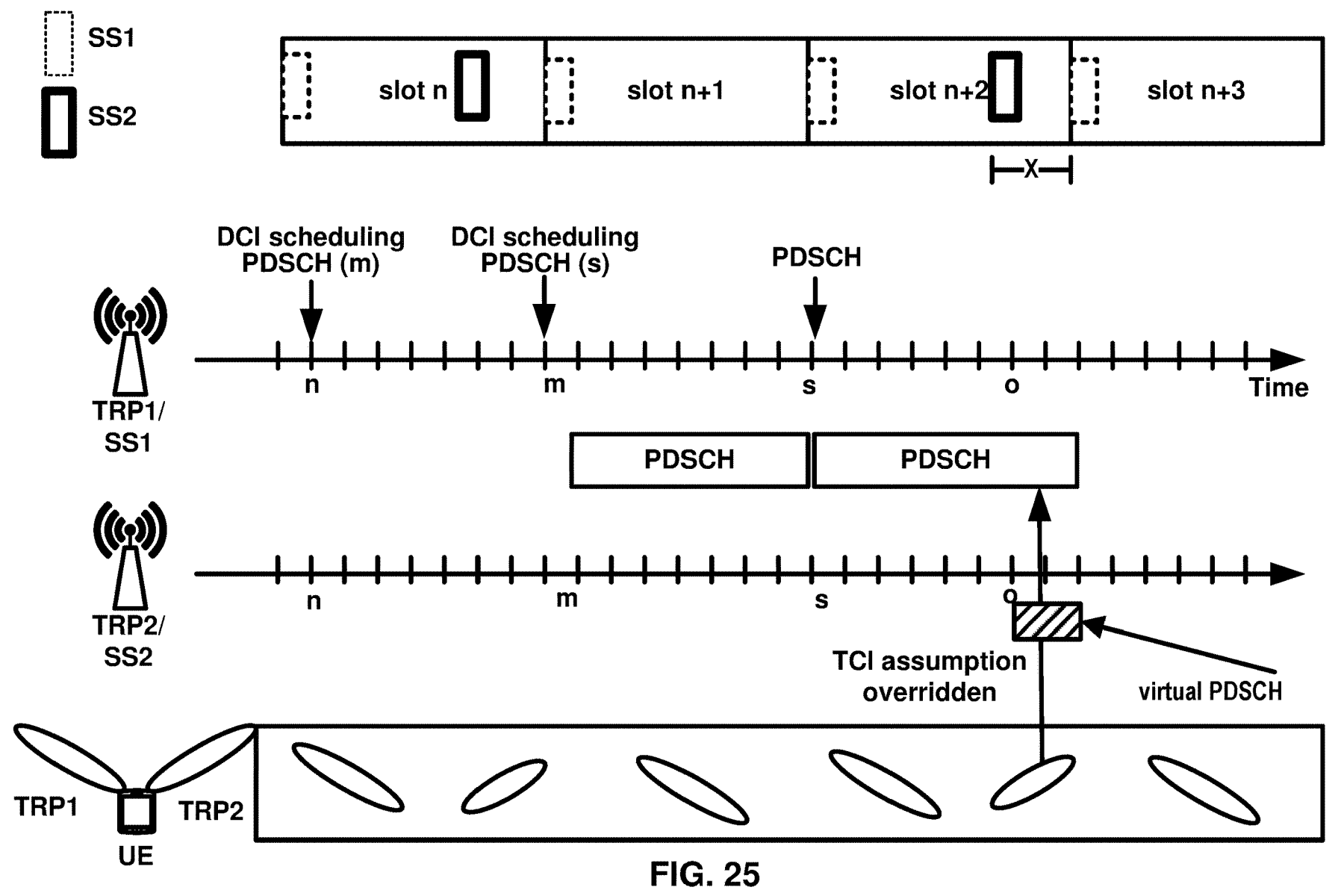

SS1
SS2
slot n
slot n+1
slot n+2
slot n+3
X
TRP1/ SS1
DCI scheduling PDSCH (m)
DCI scheduling PDSCH (s)
PDSCH
n
m
s
o
Time
PDSCH
PDSCH
TRP2/ SS2
n
m
s
o
TCI assumption overridden
virtual PDSCH
TRP1
UE
TRP2

FIG. 25

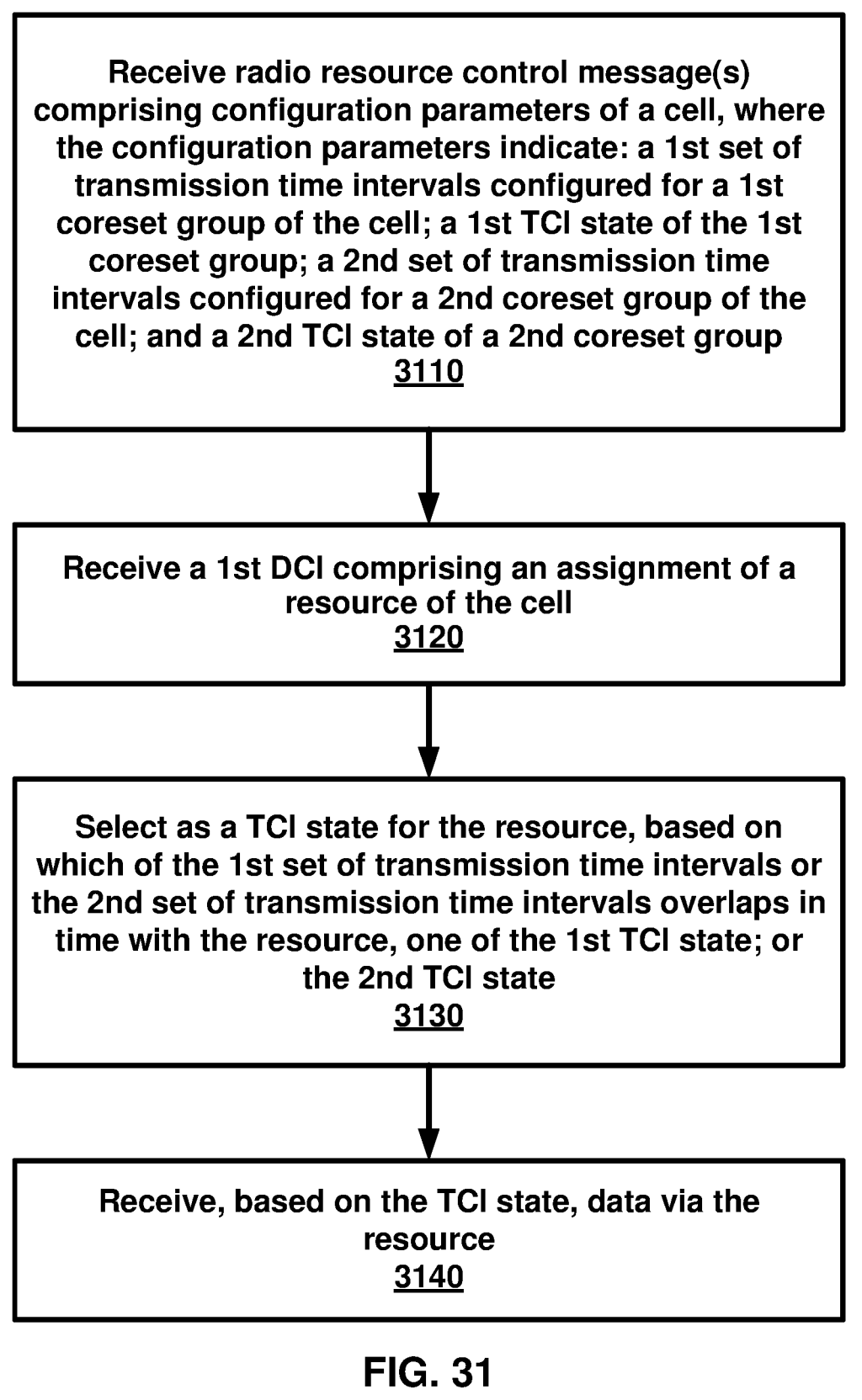

Receive radio resource control message(s) comprising configuration parameters of a cell, where the configuration parameters indicate: a 1st set of transmission time intervals configured for a 1st coreset group of the cell; a 1st TCI state of the 1st coreset group; a 2nd set of transmission time intervals configured for a 2nd coreset group of the cell; and a 2nd TCI state of a 2nd coreset group
3110

Receive a 1st DCI comprising an assignment of a resource of the cell
3120

Select as a TCI state for the resource, based on which of the 1st set of transmission time intervals or the 2nd set of transmission time intervals overlaps in time with the resource, one of the 1st TCI state; or the 2nd TCI state
3130

Receive, based on the TCI state, data via the resource
3140

FIG. 31

TRANSMISSION CONFIGURATION INDICATION STATE PARTITIONING IN MULTI-BEAM SCENARIOS

CROSS-REFERENCE TO RELATED APPLICATIONS

This application is a continuation of U.S. application Ser. No. 16/864,322, filed May 1, 2020, which claims the benefit of U.S. Provisional Application No. 62/842,172, filed May 2, 2019, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 16 is an example diagram of a TCI state determination procedure.

FIG. 25 is an example diagram of a TCI state determination procedure considering different use cases.

FIG. 31 is a flow diagram of an aspect of an example embodiment of the present disclosure.

DETAILED DESCRIPTION

Figure 1:
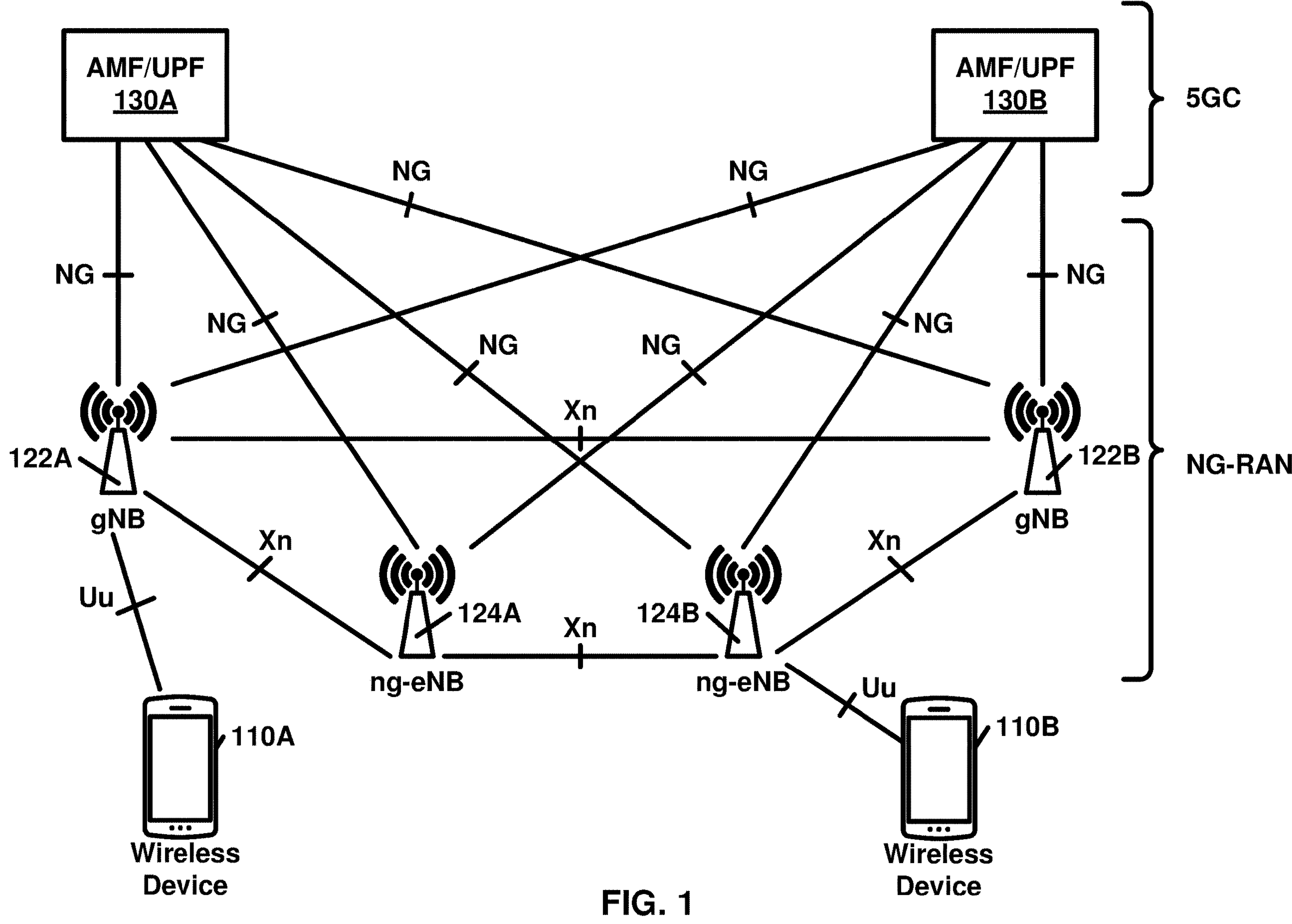
FIG. 1 is a diagram of an example RAN architecture as per an aspect of an embodiment of the present disclosure.

Example embodiments of the present disclosure enable operation of a time domain resource partitioning to determine one or more TCI states. Embodiments of the technology disclosed herein may be employed in the technical field of multicarrier communication systems. More particularly, the embodiments of the technology disclosed herein may relate to Transmission Configuration Indication (TCI) in multicarrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
sPCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between 3rd Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
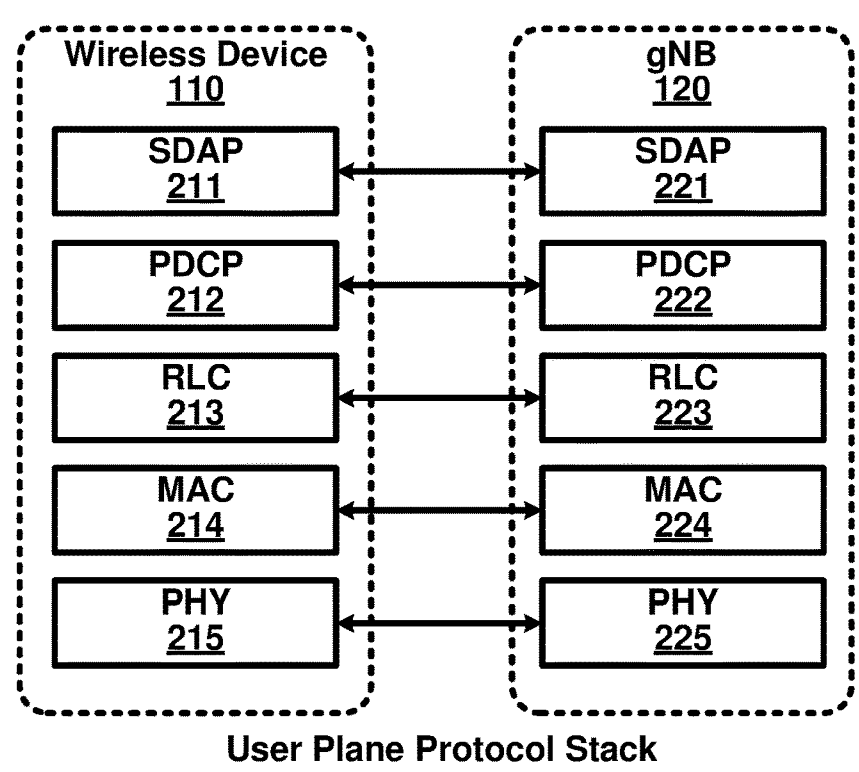
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TB s) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs.

In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
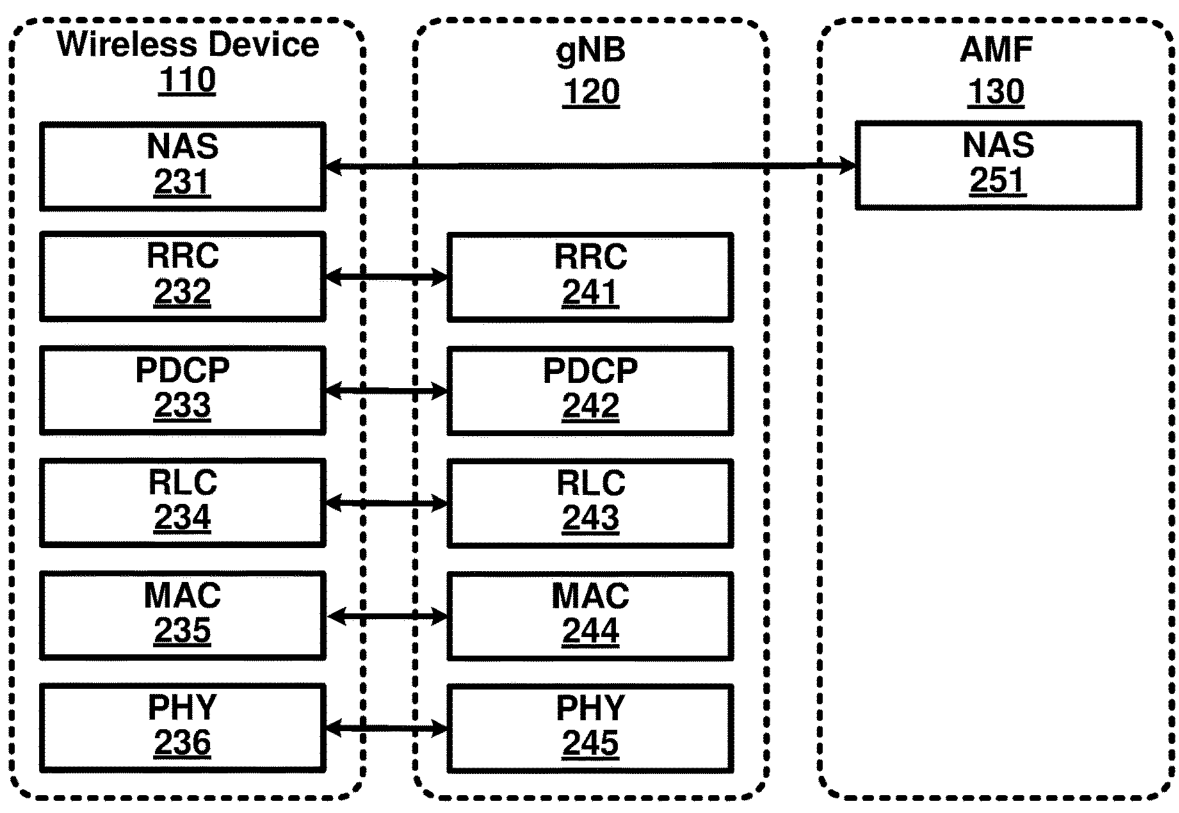
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
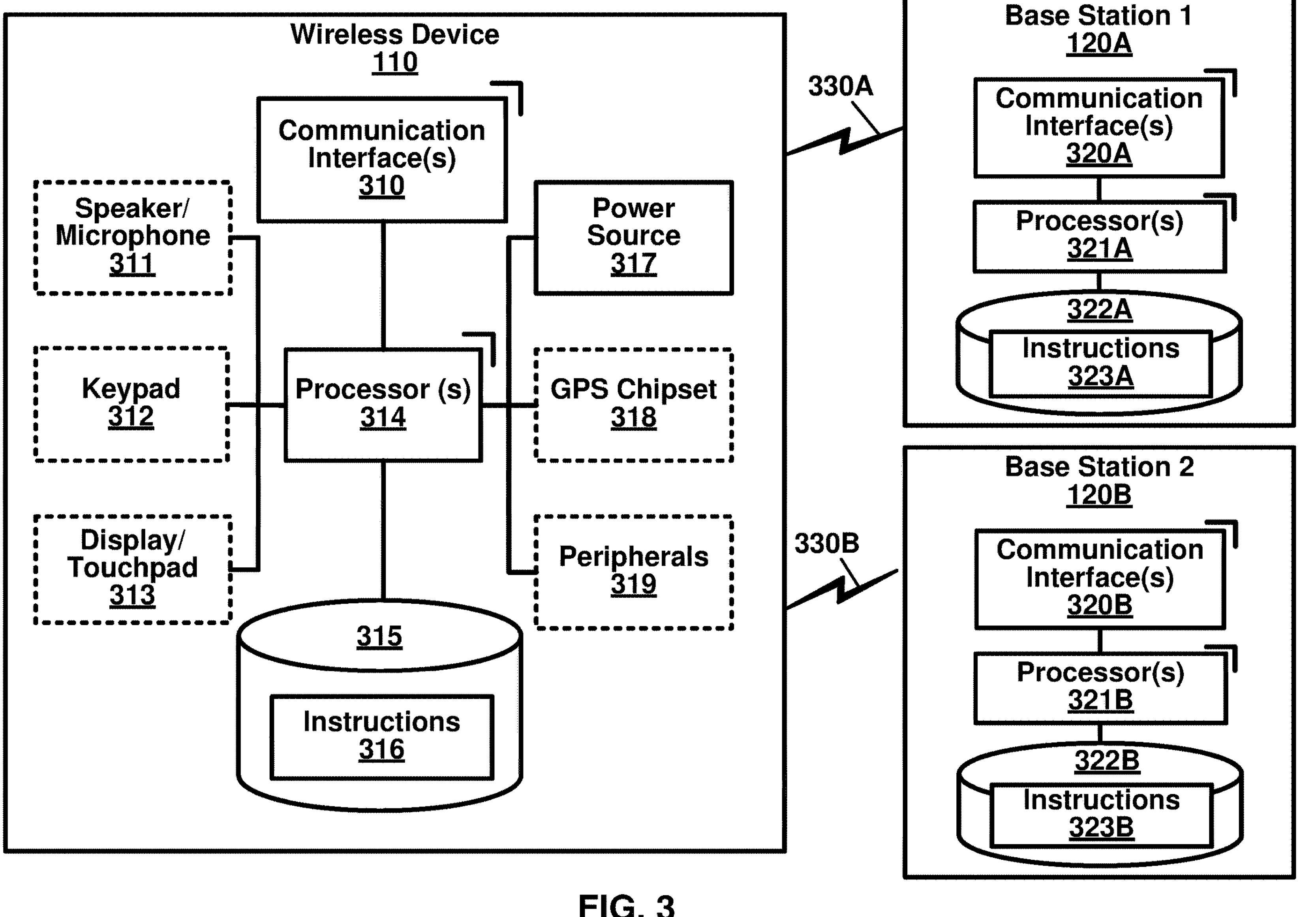
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to reestablish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figures 5A, 5B:
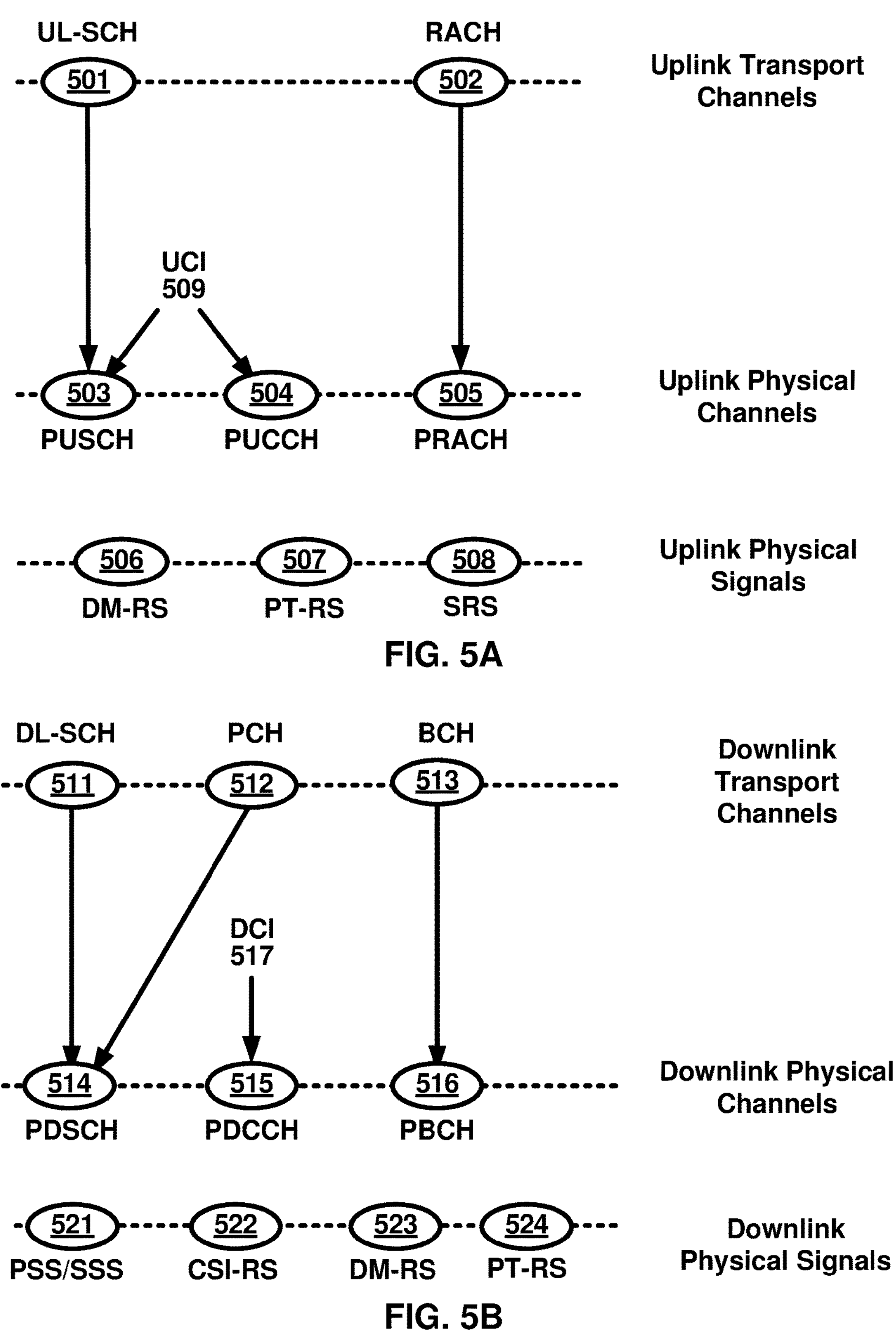
FIG. 5A is a diagram of an example uplink channel mapping and example uplink physical signals as per an aspect of an embodiment of the present disclosure.
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning the same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume the same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in the same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with the same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ the same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ the same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume the same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
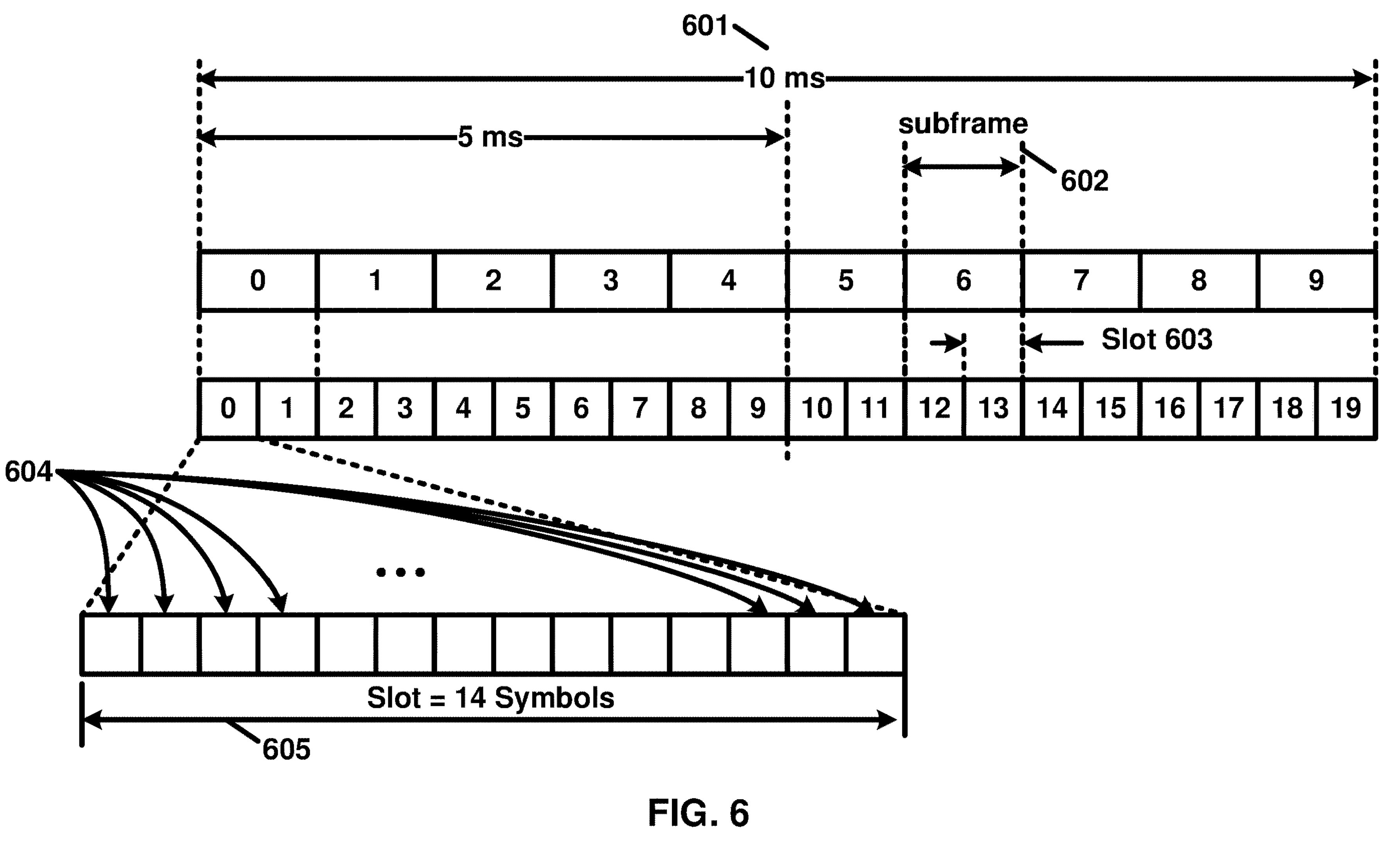
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figures 7A, 7B:
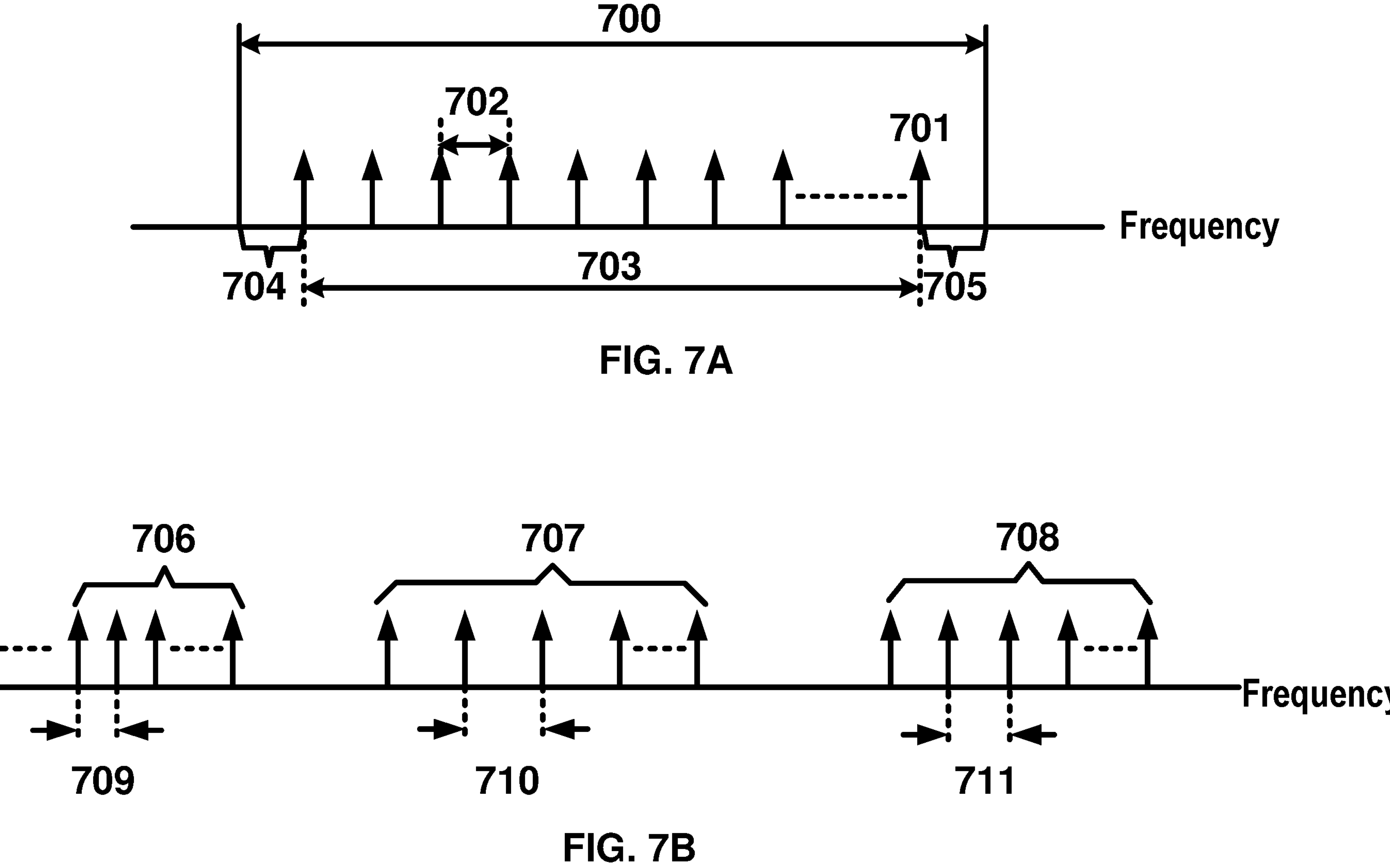
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
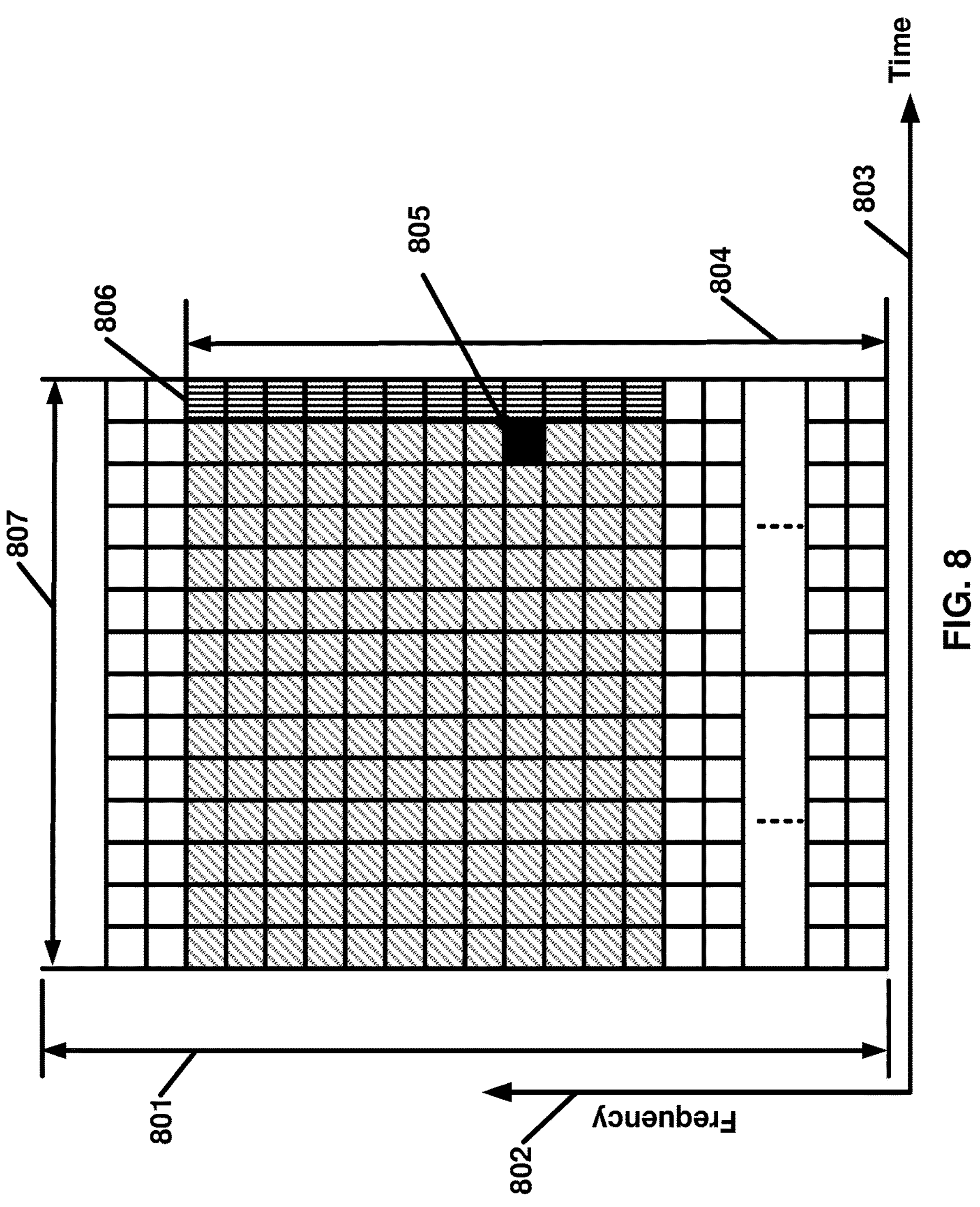
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message (s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figures 9A, 9B:
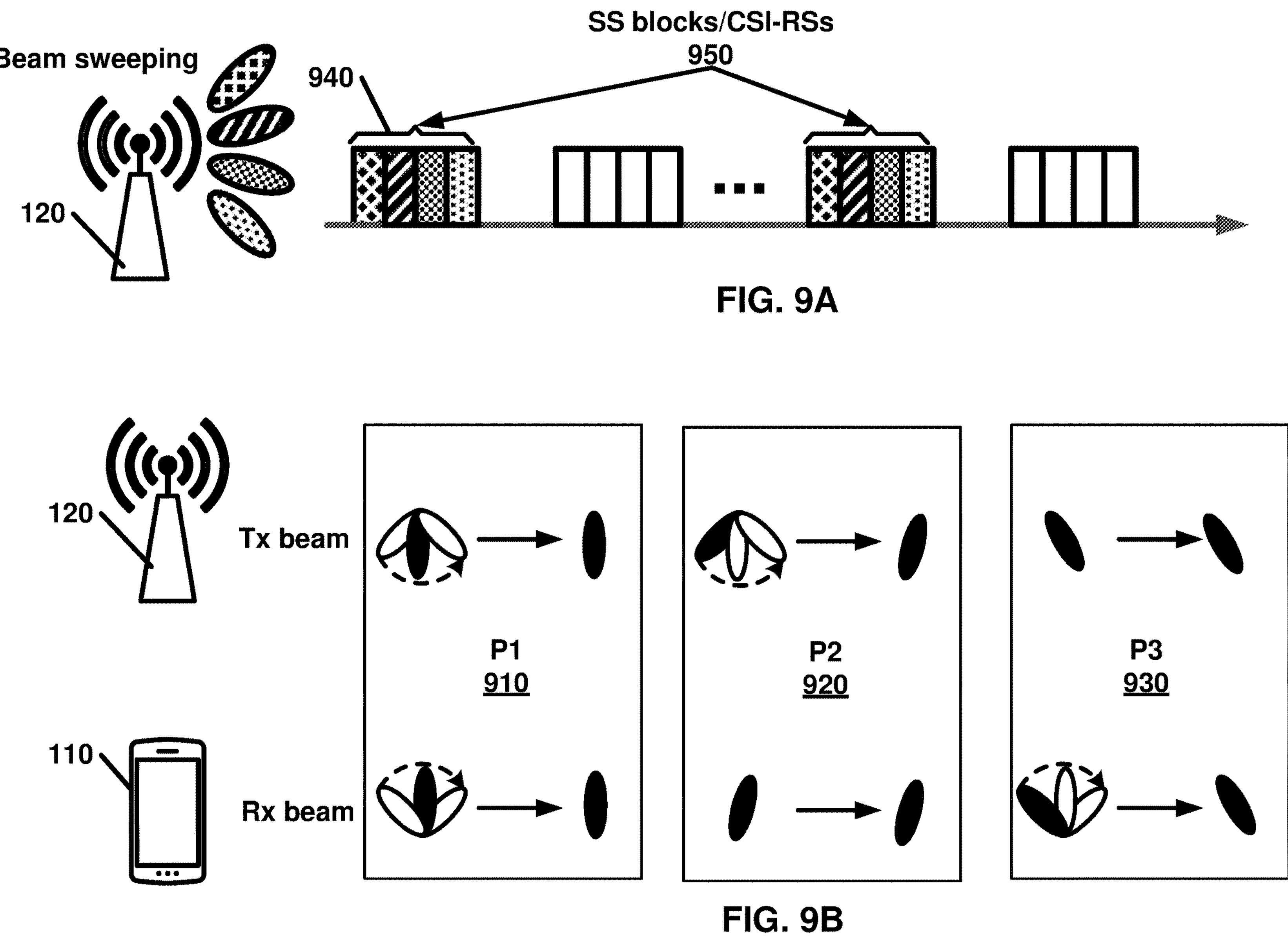
FIG. 9A is a diagram depicting an example CSI-RS and/or SS block transmission in a multi-beam system.
FIG. 9B is a diagram depicting an example downlink beam management procedure as per an aspect of an embodiment of the present disclosure.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
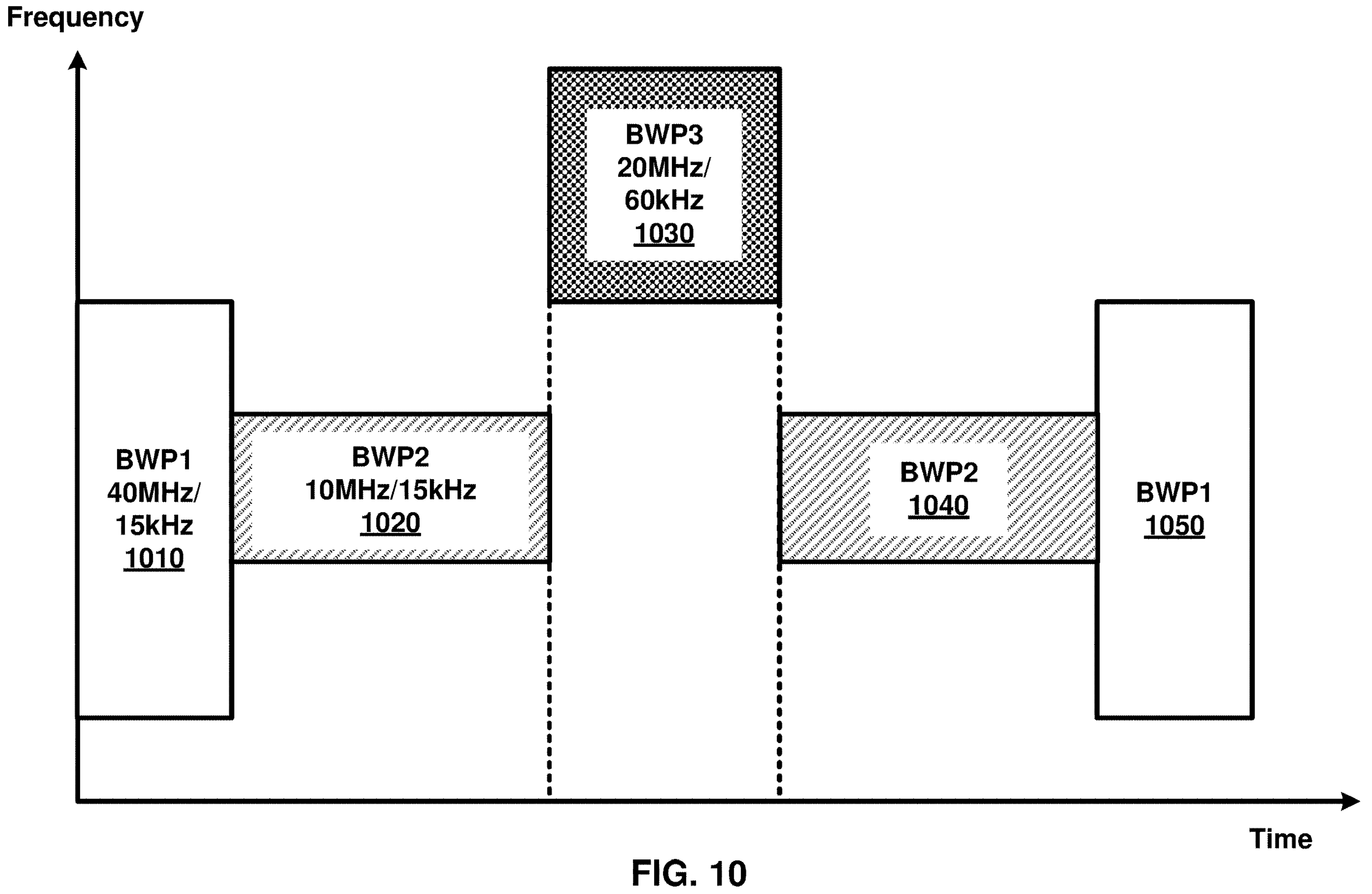
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a sPCell (e.g., SpCell), in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
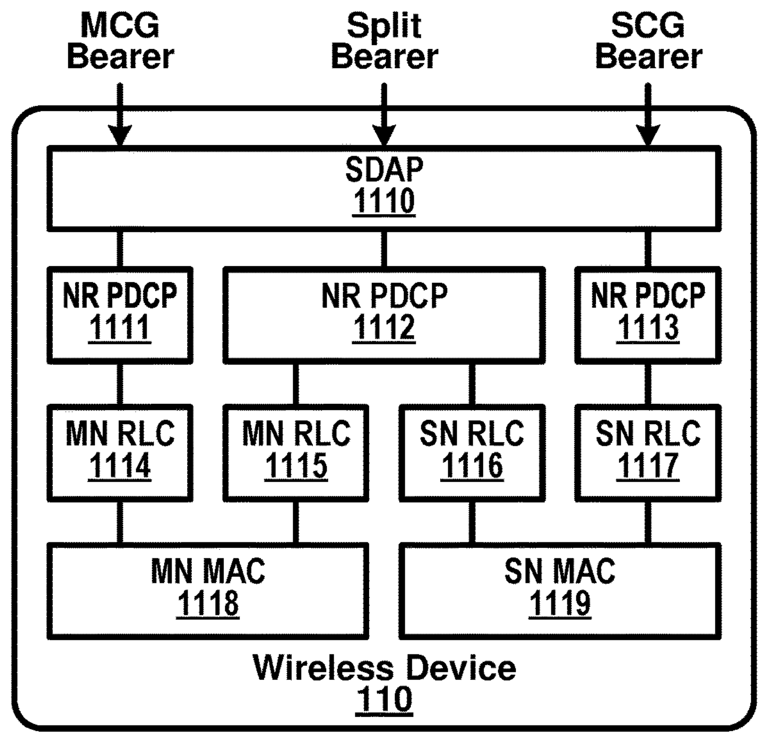
FIG. 11A, and FIG. 11B are diagrams of an example multi connectivity as per an aspect of an embodiment of the present disclosure.
Figure 11B:
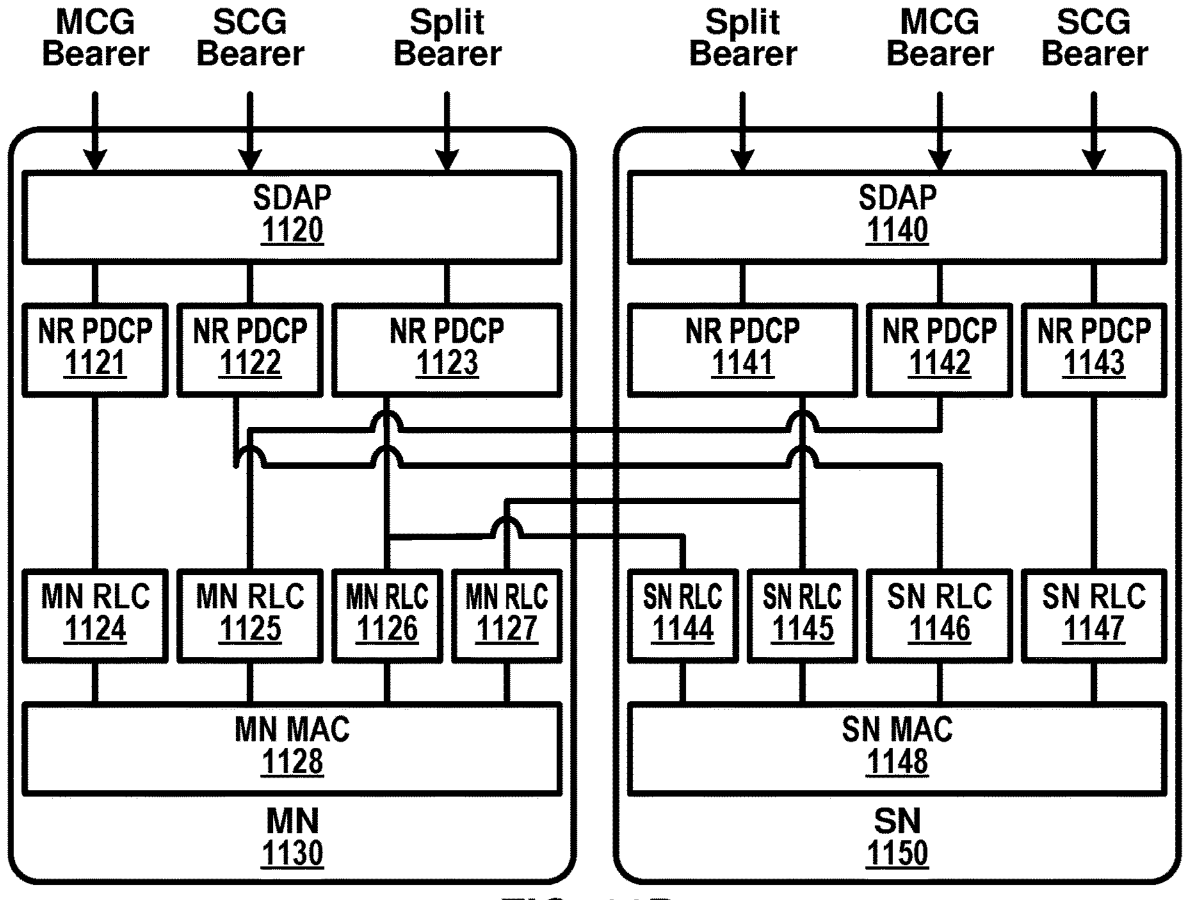

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (sPCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (sPCell, PCell of SCG, or sometimes called PCell), is configured with PUCCH resources; when an SCG is configured, there may be at least one SCG bearer or one Split bearer; upon detection of a physical layer problem or a random access problem on a sPCell, or a number of NR RLC retransmissions has been reached associated with the SCG, or upon detection of an access problem on a sPCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or sPCell may not be de-activated; sPCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a sPCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a sPCell of a SCG.

Figure 12:
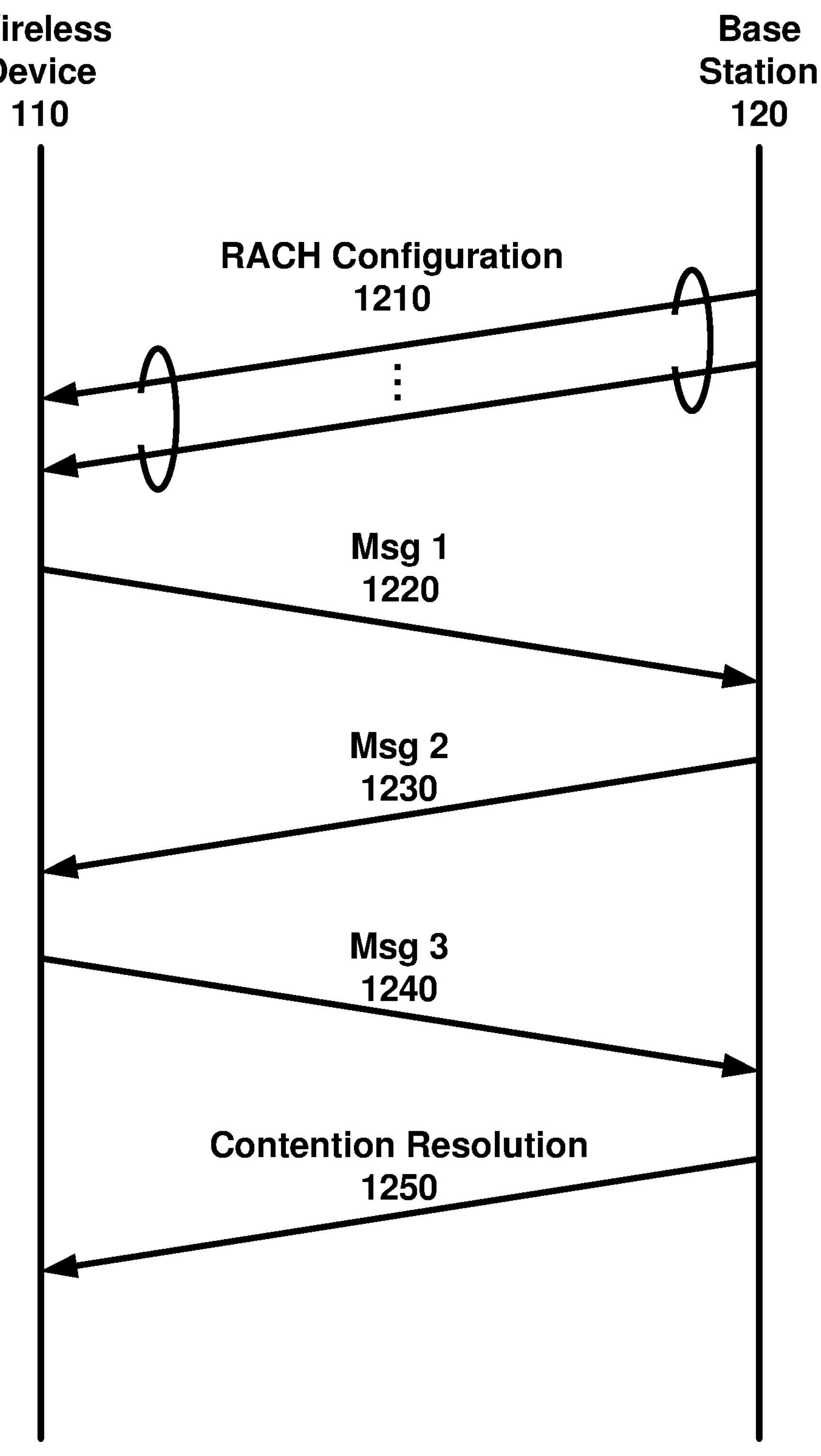
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-Response Window) to monitor response on beam failure recovery request. For example, a UE may start a time window (e.g., ra-Response Window or bfr-Response Window) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on the same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting the same preamble to a base station and receive, from the base station, the same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
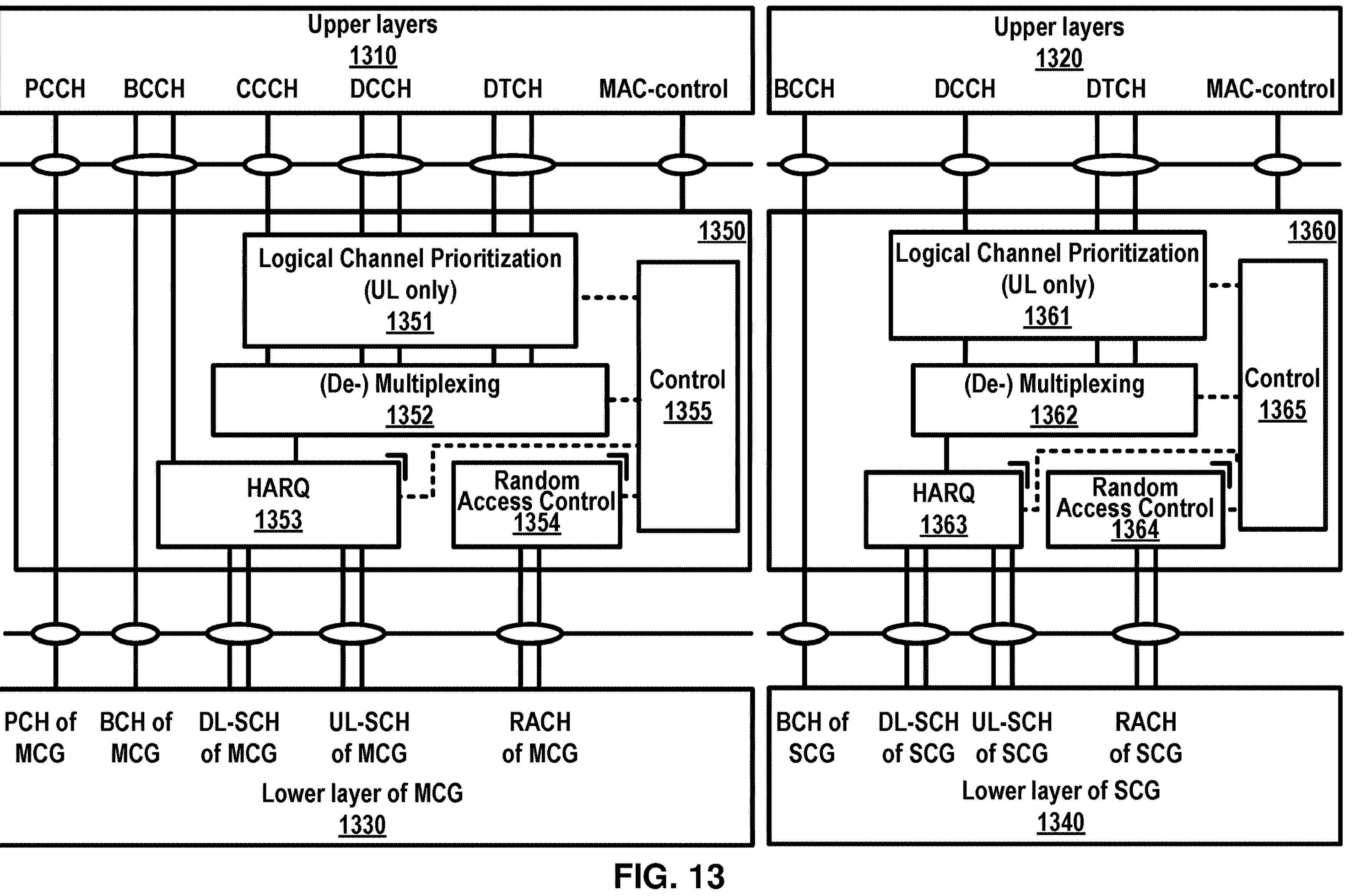
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called sPCell or PCell of SCG, or sometimes may be simply called PCell. A sPCell may be configured with PUCCH resources. In an example, when a SCG is configured, there may be at least one SCG bearer or one split bearer. In an example, upon detection of a physical layer problem or a random access problem on a sPCell, or upon reaching a number of RLC retransmissions associated with the SCG, or upon detection of an access problem on a sPCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
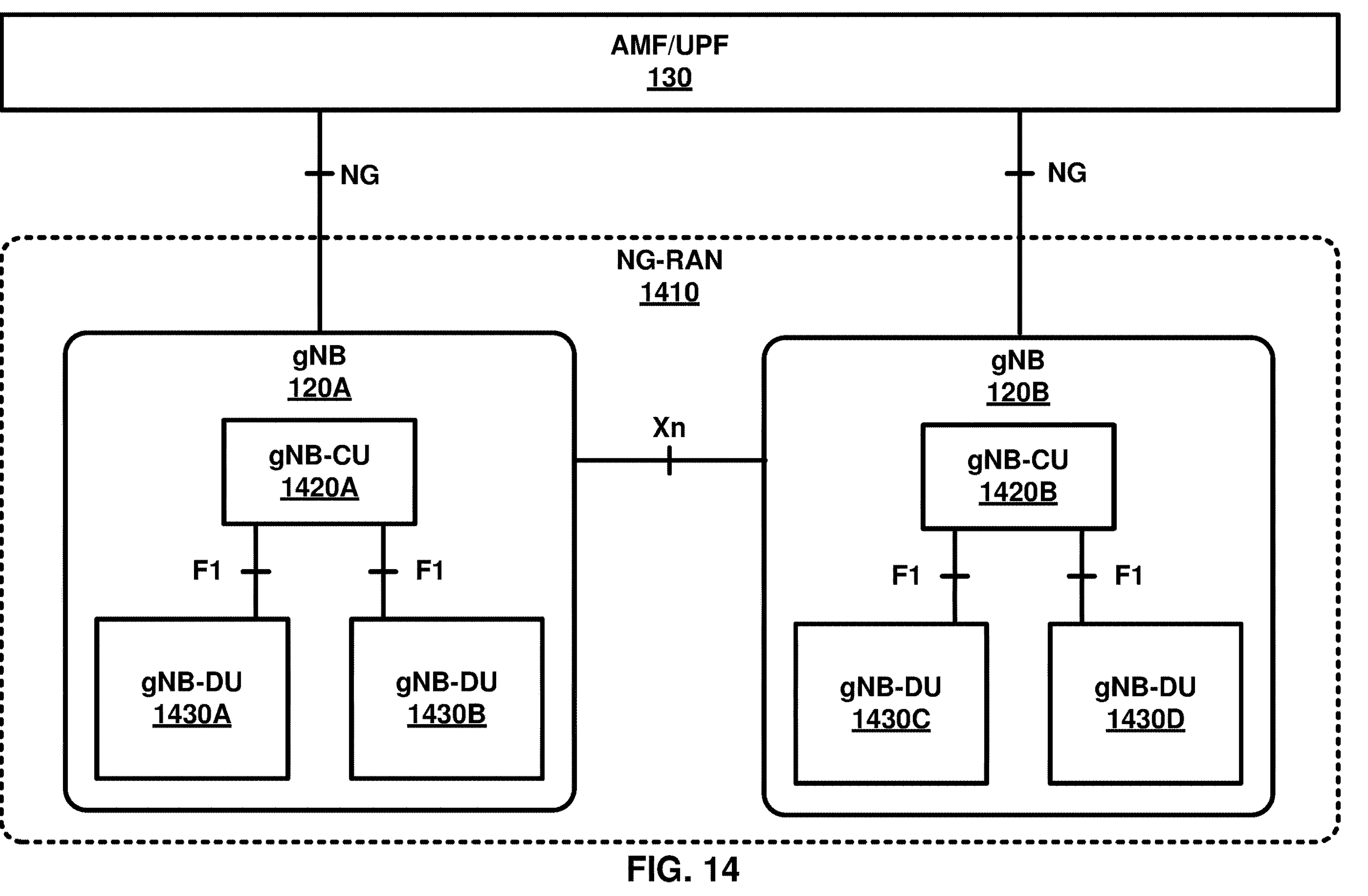
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
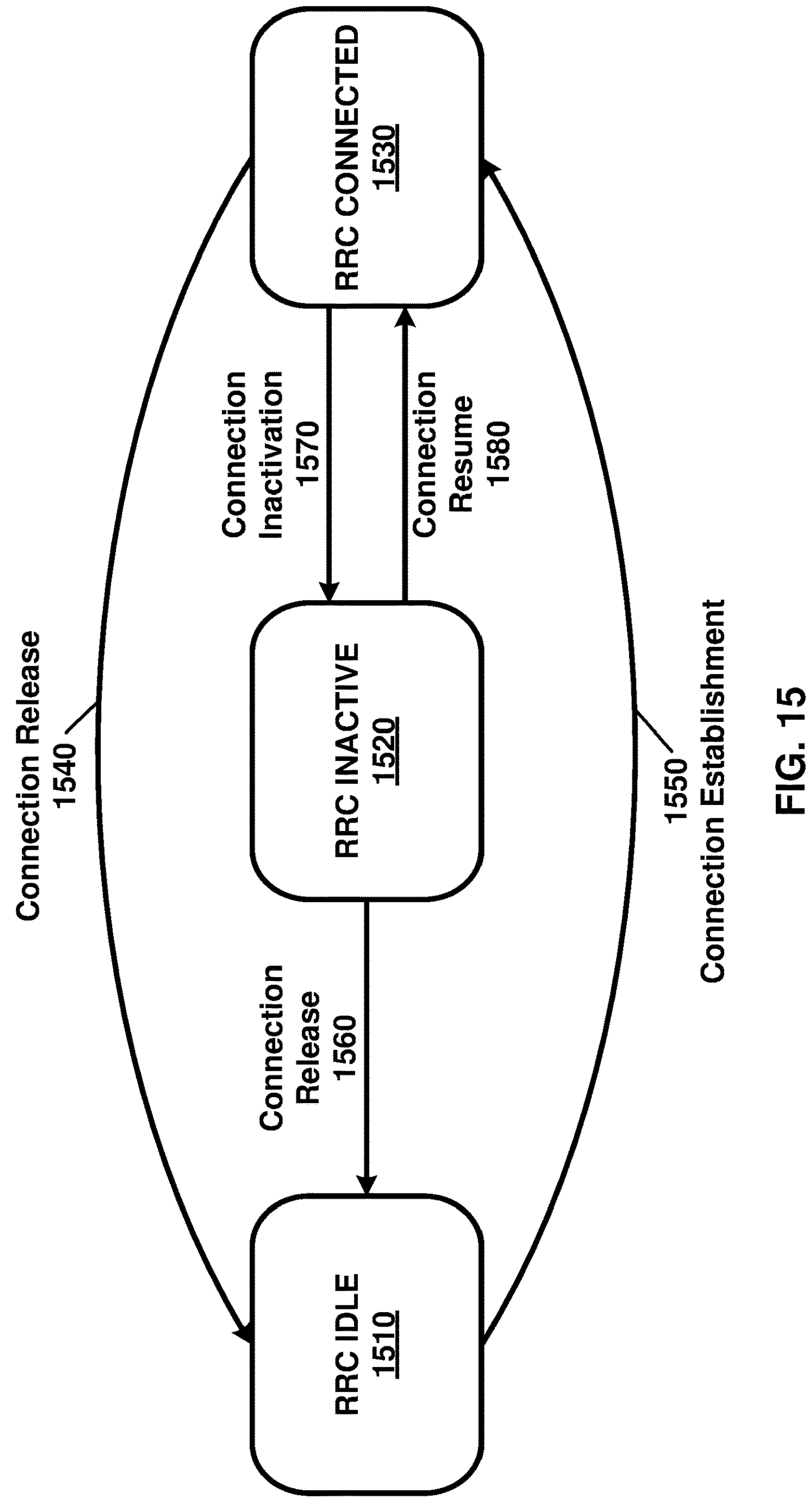
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC_Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

A gNB and/or a wireless device may support one or more beams (e.g., digital beams, analog beams, digital/analog hybrid beams). The gNB may be equipped with first transmission RFs/transmission beams/TX spatial filters/spatial TX parameters and/or first reception RFs/receiver beams/RF filter/spatial RX parameters. The wireless device may be equipped with second transmission RFs/transmission beams/TX spatial filters/spatial TX parameters and/or second reception RFs/receiver beams/RF filter/spatial RX parameters. The gNB and the wireless device may need to align one or more first set of transmission beams (e.g., TX spatial filters) of the gNB and one or more first set of reception beams (e.g., RX parameters) of the wireless device. The gNB and the wireless device may need to align one or more second set of reception beams (e.g., RX parameters) of the gNB and one or more second set of transmission beams (e.g., TX spatial filters) of the wireless device. A gNB and a wireless device may align the beams for communication based on Transmission Configuration Indication (TCI) state.

A gNB may configure one or more TCI states to a wireless device. A TCI state may be configured/indicated/associated with one or more downlink reference signals (e.g., tracking reference signals, CSI-RS, SSB). The gNB may configure one or more quasi-colocation (QCL) types for a downlink reference signal configured/indicated/associated for with a TCI state. One or more parameters in a TCI state (e.g., a set of {QCL-type, RS}) may define TX parameters used in transmitting control and data by the gNB. The wireless device may determine a receive beam/RF filer/spatial RX parameters to effectively receive a downlink beam based on a TCI state. The wireless device may determine one or more RX parameters based on the one or more parameters in the TCI state (e.g., spatial RX filter is determined based on a RS with QCL-Type D of the TCI state). For example, the wireless device may perform measurements on the one or more downlink reference signals of the TCI state to select the one or more RX parameters. When the wireless device is configured with a plurality of TCI states, the wireless device may determine one or more RX parameters for each TCI state.

A base station may transmit one or more RRC messages comprising a list of TCI state configurations (e.g., a mother set of TCI states) for a PDSCH-Config. The base station may configure a PDSCH-config for a BWP of a cell. The base station may configure one TCI state or more than one TCI states, from the list of TCI state configurations (e.g., the mother set of TCI states), for each CORESET of the BWP of the cell. The gNB may activate a TCI state of a CORESET via MAC CEs or DCIs among the more than one TCI states, when the gNB configures the more than one TCI states for the CORESET. A wireless device may support up to M active TCI states where M may be different based on a UE capability.

A TCI state may comprise parameters for defining quasi col-location (QCL) relationships between one or more downlink reference signals configured in the TCI state and DM-RS ports of a PDSCH (and/or a PDCCH). QCL relationships may configured by the base station using qcl-Type1 based on a first downlink reference signal, and qcl-Type2 based on a second downlink reference signal. A gNB may or may not configure a qcl-Type2 in a TCI state. The second downlink reference signal may be the same as the first downlink reference signal. The second downlink reference signal may be different from the first downlink reference signal. In an example, different QCL-types may be considered to support various use cases and one of QLC-types may be indicated in each qcl-Type1 or qcl-Type2. For example, QCL-TypeA means that a downlink reference signal (e.g., CSI-RS, TRS) and DM-RSs of a PDSCH (and/or a PDCCH) may have similar properties in Doppler shift, Doppler spread, average delay and delay spread. For example, QCL-TypeB means that a downlink reference signal and DM-RSs of a PDSCH (and/or a PDCCH) may have similar properties in Doppler shift and Doppler spread. For example, QCL-TypeC means that a downlink reference signal and DM-RSs of a PDSCH (and/or a PDCCH) may have similar properties in Doppler shift and average delay. For example, QCL-TypeD means that a downlink reference signal and DM-RSs of a PDSCH (and/or a PDCCH) may have similar properties in spatial RX parameters. QCL-TypeD may be used between a gNB and a wireless device to determine one analog beam (e.g., a selected beam) from one or more analog beams (e.g., beams). A wireless device may determine spatial RX parameters to receive a downlink analog beam (e.g., a selected beam) based on a QCL-TypeD property configured in a TCI state corresponding to the selected beam.

In response to receiving the one or more RRC messages of the TCI states (e.g., a mother set of TCI states) initially (e.g., RRC configuration of TCI states first time), the wireless device may assume that DM-RS ports of a PDSCH of a serving cell are QCL-ed with an SSB (synchronization signals block) used in an initial access procedure with respect to QCL-Type A and QCL-TypeD (QCL-TypeD when applicable). The wireless device may receive one or more MAC CE commands indicating up to K (e.g., K=8) TCI sates from the RRC configured TCI states (e.g., the mother set of TCI states). The indicated K TCI states may be mapped to one or more codepoints of a DCI field 'Transmission Configuration Indication' (if present). One or more DCI formats (e.g., DCI format 1_1) may carry the DCI field 'Transmission Configuration Indication'. In response to receiving the one or more MAC CE commands, the wireless device may determine and apply one TCI state from the activated TCI states for DM-RS ports of a PDSCH of the serving cell based on a rule. In an example, the rule is determined based on one or more CORESETs configured to a BWP of the serving cell, a timing offset between a scheduling DCI and the PDSCH, a DCI format of the scheduling DCI, one or more TCI related parameters (e.g., tci-PresentInDCI).

A wireless device may receive an RRC message indicating tci-PresentInDCI is enabled for a CORESET carrying a DCI comprising a resource assignment for a downlink PDSCH. In response to enabled tci-PresentInDCI, the wireless device may expect the DCI field 'Transmission Configuration Indication' in a first DCI, from the CORESET, comprising a resource assignment based on one or more first DCI formats (e.g., DCI format 1_1). The wireless device may not expect the DCI field 'Transmission Configuration Indication' in a second DCI, from the CORESET, comprising a resource assignment based on one or more second DCI formats (e.g., DCI format 1_0).

A wireless device may determine QCL/TCI information of DM-RS ports of a PDSCH based on one or more CORESETs configured to a BWP of a cell, a timing offset between a scheduling DCI and the PDSCH, a DCI format of the scheduling DCI, one or more TCI related parameters (e.g., tci-PresentInDCI). For example, the wireless device may receive a first DCI, from a first CORESET that is configured with tci-PresentInDCI, scheduling a first PDSCH in an active BWP of the cell. The wireless device may determine a TCI state of the first PDSCH based on an indicated TCI state by the first DCI based on a timing offset between the first DCI and the first PDSCH being larger than or equal to a Threshold-Sched-Offset. The indicated TCI state may be an explicit indicated TCI state from 'Transmission Configuration Indication' field in the first DCI when the first DCI is based on a DCI format with the field (e.g., DCI format 1_1). The indicated TCI state may be the same TCI state or QCL information of the first CORESET when the first DCI does not carry the field (e.g., based on DCI format 1_0). The wireless device may determine the TCI state of the first PDSCH based on a TCI state or QCL information of a lowest indexed CORESET among one or more CORESETs monitored in a most recent slot of the active BWP of the cell. For example, the wireless device may receive a second DCI, from a second CORESET that is not configured with tci-PresentInDCI, scheduling a second PDSCH in the active BWP of the cell. The wireless device may determine a TCI state of the second PDSCH based on a TCI state or QCL information of the second CORESET based on a timing offset between the second DCI and the second PDSCH being larger than or equal to a Threshold-Sched-Offset. The wireless device may determine the TCI state of the second PDSCH based on a TCI state or QCL information of a lowest indexed CORESET among one or more CORESETs monitored in a most recent slot of the active BWP of the cell.

FIG. 16 illustrates an example of a TCI determination rule. For example, a wireless device may monitor CORESET #1 and CORESET #2 in a slot n. The wireless device may monitor a PDSCH #1, a PDSCH #2 and a PDSCH #3 (e.g., P1, P2 and P3 respectively) scheduled by the CORESET #1 or the CORESET #2. For example, the CORESET #1 may be configured with tci-PresentInDCI enabled and the CORESET #2 may not be configured with tci-PresentInDCI. A first DCI carried scheduling P3 via CORESET #1 may include a TCI field. One or more second DCIs (e.g., scheduling P1 and P2) via CORESET #2 may not include a TCI field. A QCL assumption or a TCI state of the PDSCH #1 (e.g., P1) scheduled by the CORESET #2 is determined based on a timing offset between the CORESET (e.g., the CORESET #2) and the PDSCH (e.g., P1) scheduled by a second DCI of the CORESET. With a smaller offset compared to a Threshold-Sched-Offset, the wireless device may assume that QCL assumption or the TCI state of P1 is determined based on the lowest indexed CORESET monitored in the latest slot (e.g., slot n). The wireless device determines TCI1 as the TCI state for the PDSCH #1 as TCI state #1 is a TCI state of CORESET #1. The second PDSCH (e.g., PDSCH #2, P2) is scheduled by a third DCI based on a fallback DCI format which does not include a TCI field. With a larger timing gap between the CORESET (e.g., CORESET #2) and the PDSCH (e.g., P2), the TCI state or QCL assumption of P2 follows the TCI state or the QCL assumption of the CORESET #2 where the third DCI is transmitted. The wireless device assumes TCI2 for the second PDSCH (e.g., PDSCH #2) that is a TCI state of the CORESET #2. The third PDSCH (e.g., PDSCH #3, P3) may be indicated with an explicit TCI state by a scheduling DCI (e.g., the first DCI) from CORESET #1. For example, if the third PDSCH (e.g., P3) is indicated with TCI state #3 (e.g., TCI3) and the timing gap between the first DCI and the third PDSCH is greater than or equal to the Threshold-Sched-Offset, the wireless device applies TCI state #3 to the third PDSCH.

Figure 17:
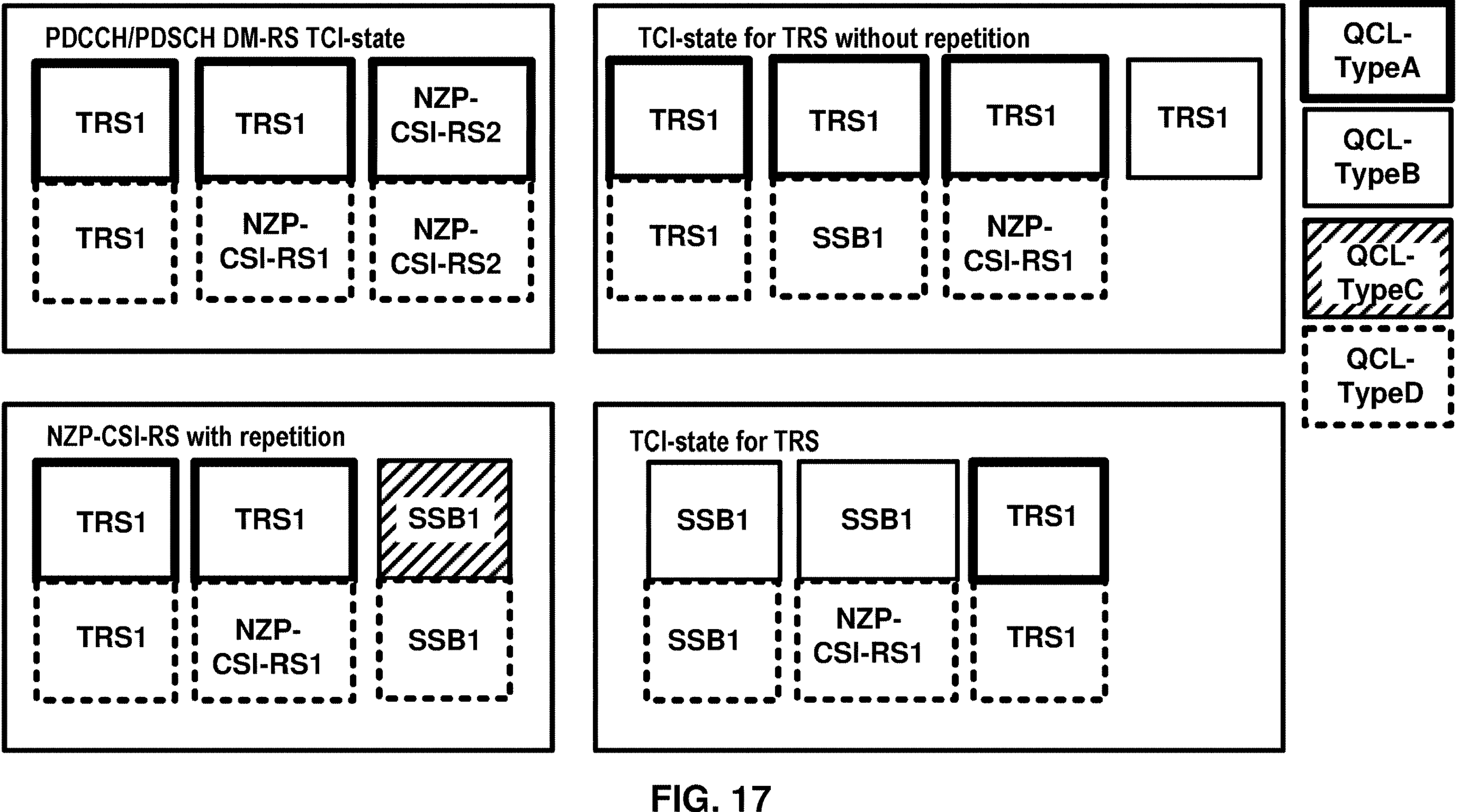
FIG. 17 is an example diagram of reference signals to determine a TCI state for various reference signals.

FIG. 17 illustrates an example of possible TCI state configurations for various non-zero-power (NZP) CSI-RS downlink reference signals including tracking RS (TRS). QCL-TypeD may or may not applied to a scenario (e.g., depending on a frequency range, depending on a configuration, depending on a UE capability, etc.). A NZP-CSI-RS may be used for a tracking RS (TRS), a CSI-RS reference resource, and/or the like. For example, for a periodic CSI-RS resource for a TRS, a wireless device may expect that a TCI state is one of at least the following: QCL-TypeC with an SSB and QCL-TypeD with the same SSB; or QCL-TypeC with an SSB and QCL-TypeD with a NZP-CSI-RS with repetition. For example, a wireless device may assume that for an aperiodic NZP-CSI-RS for a TRS, a TCI state may indicate that QCL-TypeA and QCL-TypeD with a periodic TRS. For example, a TRS without repetition, a wireless device may expect a TCI state indicates one of at least following: QCL-TypeA and QCL-TypeD with a TRS; QCL-TypeA with a TRS and QCL-TypeD with an SSB; QCL-TypeA with a TRS and QCL-TypeD with a NZP-CSI-RS with repetition; or QCL-TypeB with a TRS and QCL-TypeD is not applicable. For example, a wireless device may assume that a TCI state of an NZP-CSI-Rs resource with repetition may be one of at least: QCL-TypeA and QCL-TypeD with a TRS; QCL-TypeA with a TRS and QCL-TypeD with a NZP-CSI-RS with prepetition; or QCL-TypeC and QCL-Type with an SSB. For example, for DM-RS ports of a PDCCH or a PDSCH, a TCI state may be one of at least: QCL-TypeA and QCL-Type D with a TRS; QCL-TypeA with a TRS and QCL-TypeD with an NZP-CSI-RS with repetition; or QCL-TypeA and QCL-TypeD with a NZP-CSI-RS without repetition.

With consideration of analog beam forming technologies applied to a wireless device (e.g., UE) and a base station (e.g., gNB) to enhance UE performance and network coverage, finer (e.g., with narrower beam width than beams used in existing technologies) beam forming becomes essential in a new radio access technology. For example, a wireless device may have a first analog beam (e.g., a first RX spatial parameter) which is used to communicate with a first TRP. The wireless device may have a second analog beam (e.g., a second RX spatial parameter) which is used to communicate with a second TRP. The wireless device may be configured/activated with the first TRP and the second TRP on a cell/carrier/frequency. The first RX spatial filter and the second RX spatial filter may provide proper RX spatial filtering parameters to support a first beam with a good quality from the first TRP and a second beam with a good quality from the second TRP. A wireless device may need to have advanced capabilities to support the first RX spatial filter (e.g., the first RX spatial parameters) and the second RX spatial filter (e.g., the second RX spatial parameters) in parallel. With a limited form factor, a limited power and/or a limited capability, assuming the advanced UE capabilities may not be possible in many cases. A multi-TRP scenario, a wireless device being activated with more than one TRPs at a given cell/frequency/carrier, may be beneficial to the UE even without the advanced UE capabilities. For example, a wireless device may move, which may result in frequent hand-over events. Frequent hand-over occurrences may lead to high signaling overhead. With the help of multiple TRPs deployment, the signaling overhead may be reduced with two adjacent TRPs serving the wireless device in a serving cell. A similar use case may apply to a case where a wireless device is associated with PCell and sPCell via a dual connectivity scenario in the same frequency. The scenario may allow reduced handover cases as the coverage based on combining PCell and sPCell would be increased compared to a coverage of either PCell or sPCell. The mobility handling is a key to a high-frequency scenario (e.g., above 6 GHz). In a multi-TRP or a DC scenario, it is likely that TRPs or gNBs may not be able to communicate each other with near-zero latency. With a backhaul communication with a latency, a real-time coordination to determine a qualified analog beam (e.g., a beam with best measurement results) for a wireless device may not be easily achievable. To support better mobility handling and UE performance without requiring an ideal backhaul communication, there is a necessity to enhance a coordination mechanism across multi-TRPs or multi-gNBs.

Figure 18:
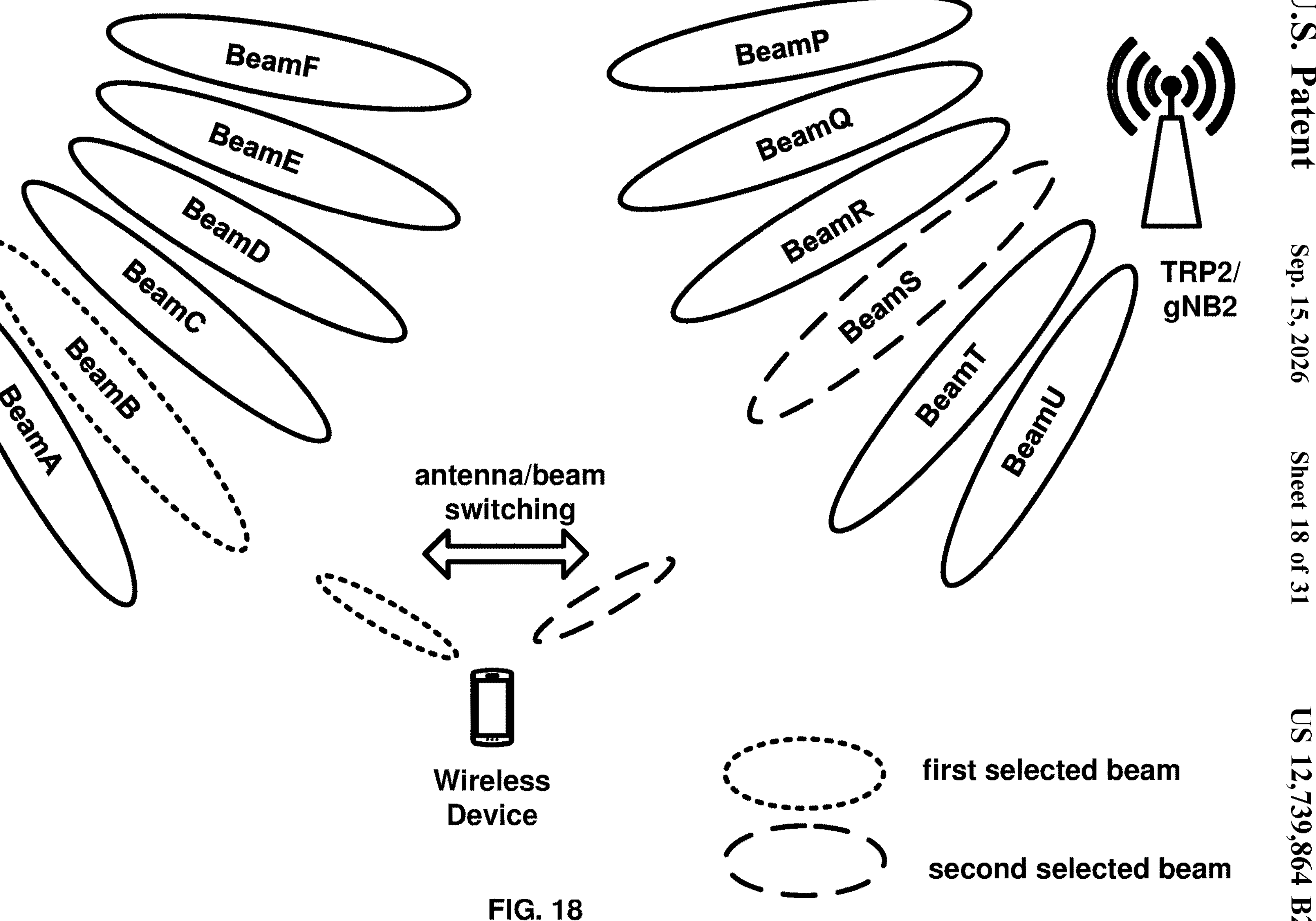
FIG. 18 is an example diagram of an antenna/beam switching across multi-TRPs in a cell.

In an example shown in FIG. 18, a wireless device may switch its analog beam between a first analog beam (e.g., a first selected beam, beamB) towards a first TRP (TRP1) and a second analog beam (e.g., a second selected beam, beamS) towards a second TRP (TRP2) in turns. One or more first TCI states associated with beams (e.g., beamA, beamB, . . . , beamF) are associated with the first TRP. In an example, the first TRP may support the one or more TCI states that are associated with the first TRP in transmitting to one or more wireless devices. For example, a wireless device is configured with the one or more TCI states for the first TRP when the one or more TCI states are associated with the first TRP. A wireless device may be activated with one or more second TCI states from the one or more first TCI states in communication with the first TRP. One or more third TCI states associated with beams (e.g., beamP, beamQ, . . . , beamU) are associated with the second TRP.

As shown in FIG. 18, a first selected beam (e.g., a first TCI state associated with a good quality beam for the first TRP) from TRP1 and corresponding first RX spatial parameters may be different from a second selected beam (e.g., a second TCI state associated with a good quality beam for the second TRP) from TRP2 and corresponding second RX spatial parameters. A wireless device may support both TRPs by switching between the first RX parameters and the second RX parameters for the first TRP and the second TRP in a time-domain partitioning manner. For example, the wireless device may apply the first RX parameters at a first time t (e.g., symbol/slot/frame) to communicate with the first TRP. For example, the wireless device may apply the second RX parameters at a second time t1 (e.g., symbol/slot/frame) to communicate with the second TRP. A similar implementation in applying a TX filter may be considered. A similar implementation in a dual connectivity scenario, where a wireless device is configured/activated with a first cell of a master cell group and a second cell of a secondary cell group in the same frequency, may be considered.

Figure 19:
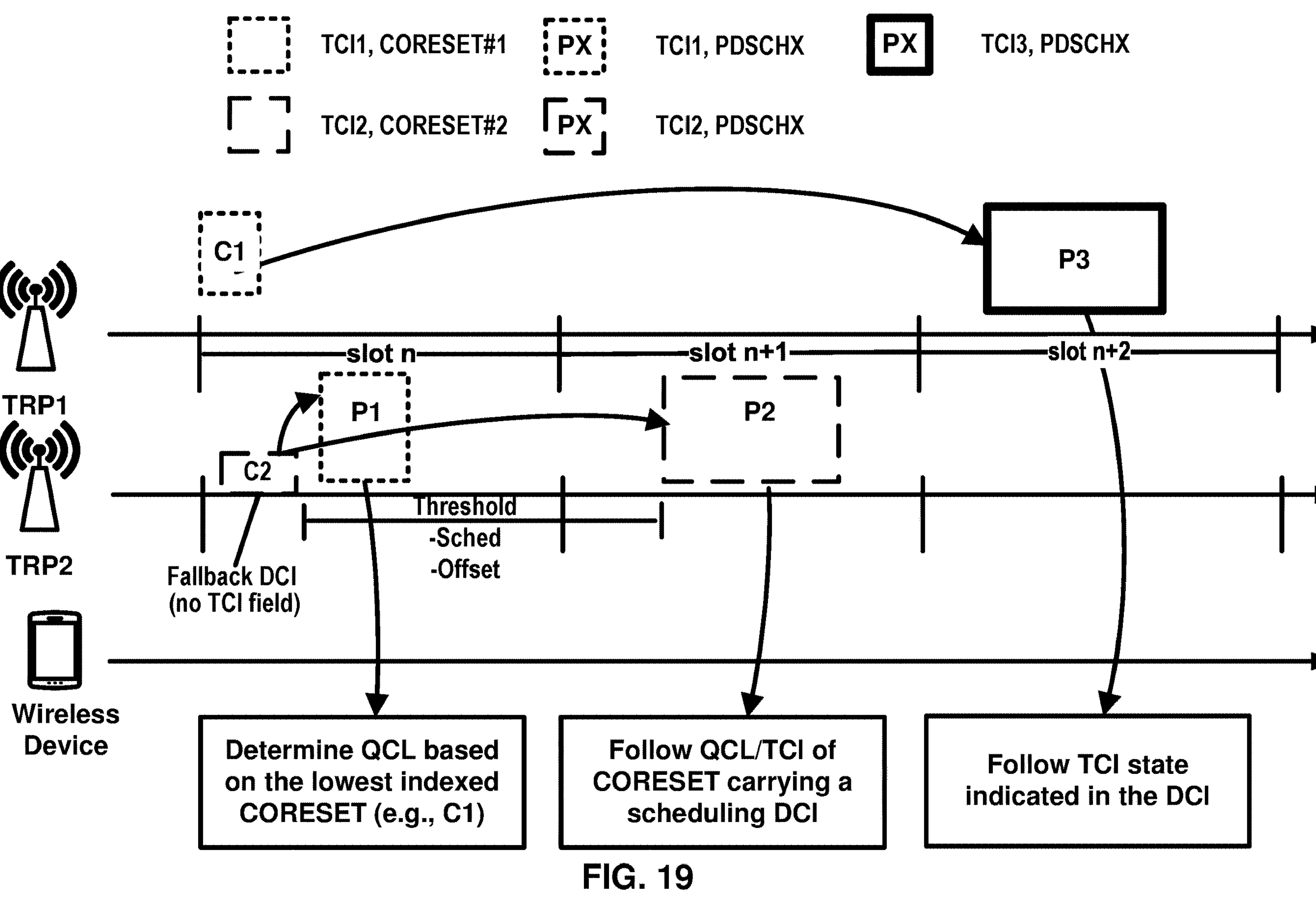
FIG. 19 is an example diagram of a TCI state determination in a multi-TRP scenario.

In legacy systems with a single TRP on a cell/carrier/frequency, a wireless device may determine a TCI state to receive one or more PDSCH based on one or more factors. The one or more factors may comprise a timing offset between a scheduling DCI of the PDSCH, and/or a first transmission occasion of the PDSCH, and/or a TCI state indicated by the scheduling DCI, and/or a DCI format used in the scheduling DCI, and/or TCI states of monitored CORESETs in an active BWP of a cell, Threshold-Sched-Offset of a UE capability, and/or etc. An extension of legacy systems to a multi-TRP scneario, where non-ideal backhaul or idea-backhaul communication across TRPs may be used, on a cell/carrier/frequency may be supported. Determining a TCI state for a PDSCH based on a legacy mechanism may not fully work in a multi-TRP scenario. FIG. 19 illustrates an example where a wireless device and a base station may have different assumption on a TCI state. A wireless device is configured/activated with a first TRP (TRP1) and a second TRP (TRP2) in a cell. Two TCI states (e.g., TCI state #1 and TCI state #3, TCI1 and TCI3) are active for the first TRP among one or more first TCI states configured/associated for/with the first TRP. A TCI state (e.g., TCI state #2, TCI2) is active for the second TRP among one or more second TCI states configured/associated for/with the second TRP. The wireless device is configured with CORESET #1 for the first TRP where a TCI state of the CORESET #1 is TCI state #1.

The wireless device is configured with CORESET #2 for the second TRP where a TCI state of the CORESET #2 is TCI state #2.

The wireless device may receive a first PDSCH (e.g., PDSCH #1, P1) from the second TRP (TRP2), a second PDSCH (e.g., PDSCH #2, P2) from the second TRP (TRP2), and a third PDSCH (e.g., PDSCH #3, P3) from the first TRP. Based on a legacy mechanism to identify a TCI state for a PDSCH, a wireless device may determine a TCI state of the first PDSCH (e.g., P1) based on a lowest indexed CORESET (e.g., CORESET #1, C1) monitored in a latest slot (e.g., a most recent slot before the first PDSCH, slot n) to determine a default TCI state of the first PDSCH. The wireless device may determine a default TCI state when a timing offset between a PDSCH and a scheduling DCI is smaller than Threshold-Sched-Offset. The wireless device determines the TCI state of the CORESET #1 (e.g., TCI1, TCI state #1) as the default TCI state of the first PDSCH (e.g., P1). In the example, the TCI state of the CORESET #1 is an active TCI state for the first TRP. The second TRP may have applied the TCI state #2 in transmitting the first PDSCH as the TCI state #2 is the active TCI state of the second TRP. The wireless device may not successfully receive the first PDSCH with applying the TCI state #1 as a first TCI state assumed by the second TRP (e.g., TCI state #2) is different from a second TCI state assumed by the wireless device (e.g., TCI state #1). With non-ideal backhaul communication between TRP1 and TRP2, TRP2 may not know whether the wireless device determines the TCI state #1 as the default TCI state or the TCI #2 as the default state for the first PDSCH. A wireless device and a TRP (or a gNB) may have different assumption in determining a default TCI state for a PDSCH in a slot configured to monitor with one or more CORESETs for a first TRP and one or more CORESETs for a second TRP. To support efficient a multi-TRP scenario, there is a need to enhance a TCI determination mechanism.

In an example, a first TRP and a second TRP may coordinate a first set of transmission time intervals for the first TRP and a second set of transmission time intervals for the second TRP. A set of transmission time intervals may be interpreted as an intended transmission time intervals. A gNB or a network or a base station may indicate the first set of transmission time intervals and/or the second set of transmission time intervals. In response to the indication, a wireless device may determine a first default TCI based on one or more first TCI states associated with the first TRP in the first set of transmission time intervals. For example, a wireless device may be configured with the one or more first TCI states, by RRC messages, for the first TRP when the one or more first TCI states are associated with the first TRP. The wireless device may determine a second default TCI based on one or more second TCI states associated with the second TRP in the second set of transmission time intervals. For example, slot n+1 may belong to the first set of transmission time intervals and slot n and slot n+2 may belong to the second set of transmission time intervals in FIG. 19. The wireless device may determine a default TCI state of the first PDSCH based on one or more TCI states for the second TRP (TRP2) in slot n based on the slot n belonging to the second set of transmission time intervals. The wireless device may select the lowest CORESET among CORESETs associated with the second TRP in the slot n for determining the default TCI state. The wireless device may select the CORESET #2 and determine the default TCI state as the TCI state #2 that is the TCI state of the CORSET #2 for the first PDSCH. With a time resource partitioning for determining a default TCI state, a first TRP and a second TRP may be able to transmit one or more PDSCHs based on the default TCI state without ambiguity due to dynamic adaptations in the TRPs. The wireless device may be able to receive the one or more PDSCHs based on a default TCI state, wherein the default TCI state is aligned with a configured/intended TCI state by a TRP.

Figure 20:
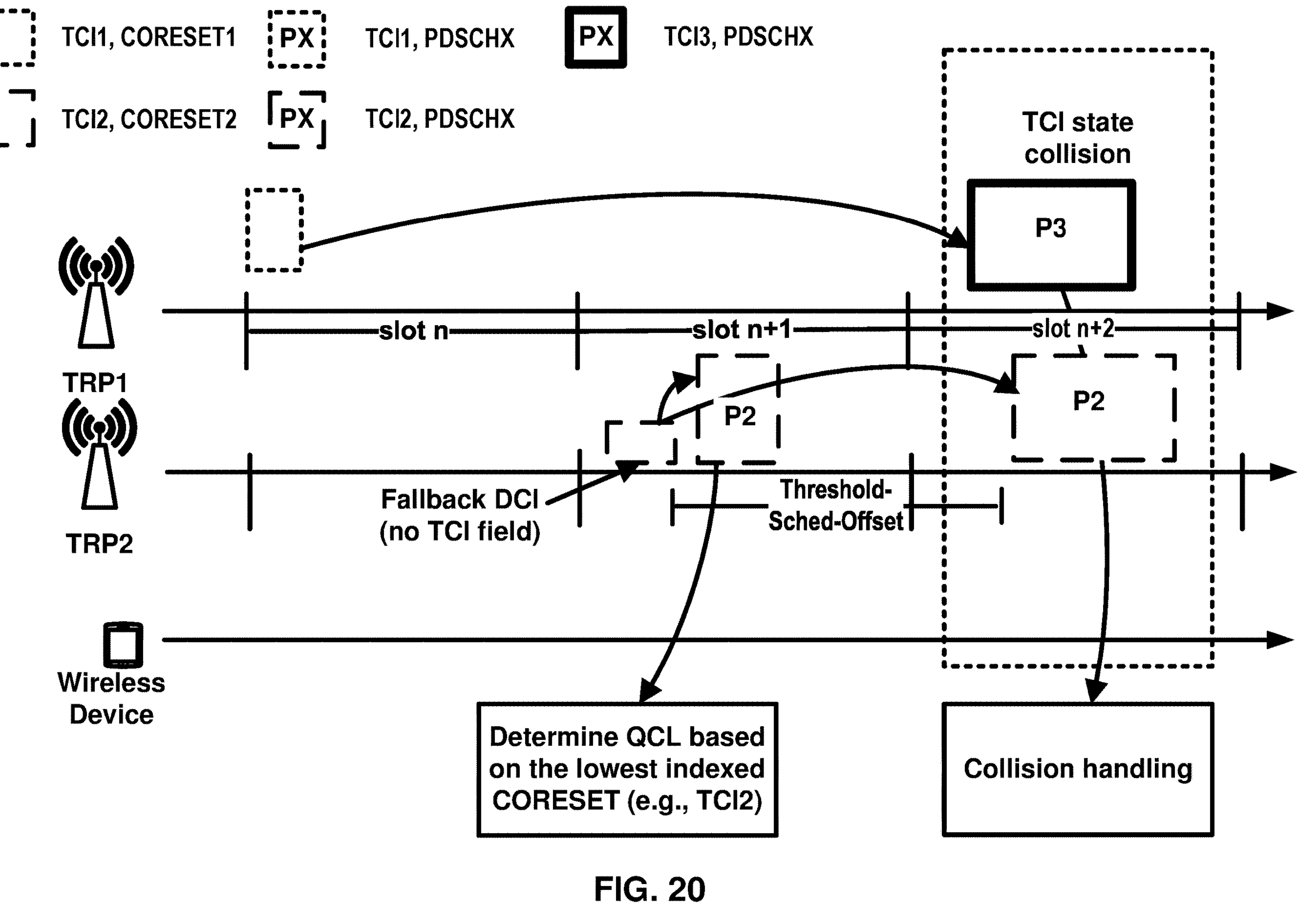
FIG. 20 is an example diagram of a TCI state collision in a multi-TRP scenario.

In an example, a first TRP and a second TRP of a cell may schedule one or more first PDSCHs and one or more second PDSCHs respectively and independently. Without a coordination between TRPs, one or more conflicts between a first TCI state of a first PDSCH, from the one or more first PDSCHs, and a second TCI state of a second PDSCH, from the one or more second PDSCHs, in a given time may occur. A base station may transmit a DCI scheduling the one or more first PDSCHs and the one or more second PDSCHs. The base station may transmit a first DCI scheduling the one or more first PDSCHs and a second DCI scheduling the one or more second PDSCHs. The base station may transmit one or more DCIs scheduling the one or more first PDSCHs and the one or more second PDSCHs via the first TRP and/or the second TRP. For example, FIG. 20 illustrates an example of potential collisions across multiple-TRPs. A wireless device is configured/activated with a first TRP (TRP1) and a second TRP (TRP2). The first TRP schedules a third PDSCH (e.g., PDSCH #3, P3) and the second TRP schedules a first PDSCH (e.g., PDSCH #1, P1) and a second PDSCH (e.g., #PDSCH #2, P2). There is a collision between the second PDSCH and the third PDSCH in a slot n+2. In the example, a first TCI state of the third PDSCH is TCI state #3 (e.g., TCI3) and a second TCI state of the second PDSCH is TCI state #2 (e.g., TCI2). Assuming that a wireless device may support one set of RX parameters at a given time (e.g., support a TCI state at a time), the wireless device may not able to support both TCI states at the slot n+2. The wireless device may select a TCI state in case when multiple TCI states collide at a time. For example, a wireless device may select a TCI state depending on whether the time resource (e.g., a slot), where collision occurs, belongs to the first set of transmission time intervals or the second set of transmission time intervals. For example, when slot n+2 belongs to the second set of transmission time intervals, the wireless device may select the TCI state #2 (for the second TRP) as the second set of transmission time intervals are for the second TRP. With a time resource partitioning, a first TRP and a second TRP may be able to transmit one or more PDSCHs with a TCI state (either by explicit TCI field or implicitly determined based on a CORESET to transmit a scheduling DCI) with high reliability in the assigned time resource partitions. The wireless device may be able to effectively address potential scheduling collisions from multiple TRPs. The wireless device may attempt to receive both PDSCHs (e.g., the second PDSCH and the third PDSCH) when collisions occur with a single TCI state assumption (based on a selected/prioritized TCI state). The wireless device may transmit HARQ-ACK feedbacks on both PDSCHs. The wireless device may drop a PDSCH not selected for a TCI determination. The wireless device may not support more than one PDSCHs at a time, thus, may drop other PDSCHs(s) than the PDSCH associated with the selected TCI state.

In an example, a wireless device may receive one or more first RRC messages to indicate a first set of transmission time intervals and one or more first TCI states associated with the first set of transmission time intervals. For example, a wireless device may determine the first set of transmission time intervals based on one or more CORESETs and/or Search Space configurations associated with the first TCI states. A CORESET is assumed to be associated with a TCI state wherein an active TCI state of the CORESET is the TCI state. A Search Space is assumed to be associated with a TCI state wherein an active TCI state of a CORESET configured/associated for the Search Space is the TCI state. A TCI state of a Search Space is defined as a TCI state of a CORESET configured for the Search Space. For example, a wireless device may determine the first set of transmission time intervals based on one or more CORESETs/Search Space configurations associated with a first TRP, a first CORESET group, a first TCI state group, etc. The wireless device may determine a TRP based on a CORESET group. For example, the first CORESET group may correspond to the first TRP. A second CORESET group may correspond to a second TRFor example, a CORESET/Search Space may be associated with a TRP when a TCI state of the CORESET/Search Space is one of TCI states configured for the TRP. A resource unit from a starting OFDM symbol of a search space monitoring occasion based on the one or more CORESETs/Search Space configurations (e.g., for the first TRP) to an ending OFDM symbol of the monitoring occasion+Threshold-Sched-Offset is considered as a first transmission time interval.

For example, a wireless device may receive one or more RRCs comprising the first set of transmission time intervals. The wireless device may receive one or more second RRC messages to indicate a second set of transmission time intervals and one or more second TCI states associated with the second set of transmission time intervals. For example, a wireless device may determine the second set of transmission time intervals based on one or more CORESETs and/or Search Space configurations associated with the second TCI states. For example, a wireless device may determine the second set of transmission time intervals based on one or more CORESETs/Search Space configurations associated with a second TRP, a second CORESET group, a second TCI state group, etc. A resource unit from a starting OFDM symbol of a search space monitoring occasion based on the one or more CORESETs/Search Space configurations (e.g., for the second TRP) to an ending OFDM symbol of the monitoring occasion+Threshold-Sched-Offset is considered as a second transmission time interval. For example, a wireless device may receive one or more RRCs comprising the second set of transmission time intervals. For example, a wireless device may determine the first set of transmission time intervals of a set of slots that a slot does not belong to the second set of transmission time intervals. The wireless device may determine a first selected TCI state for a first resource, during the first set of transmission time intervals, based on the first TCI states. The wireless device may determine a second selected TCI state for a second resource, during the second set of transmission time intervals, based on the second TCI states. The wireless device may receive and transmit a control and a data via the first resource based on the first selected TCI state. The wireless device may receive and transmit a control and a data via the second resource based on the second selected TCI state.

Figure 21:
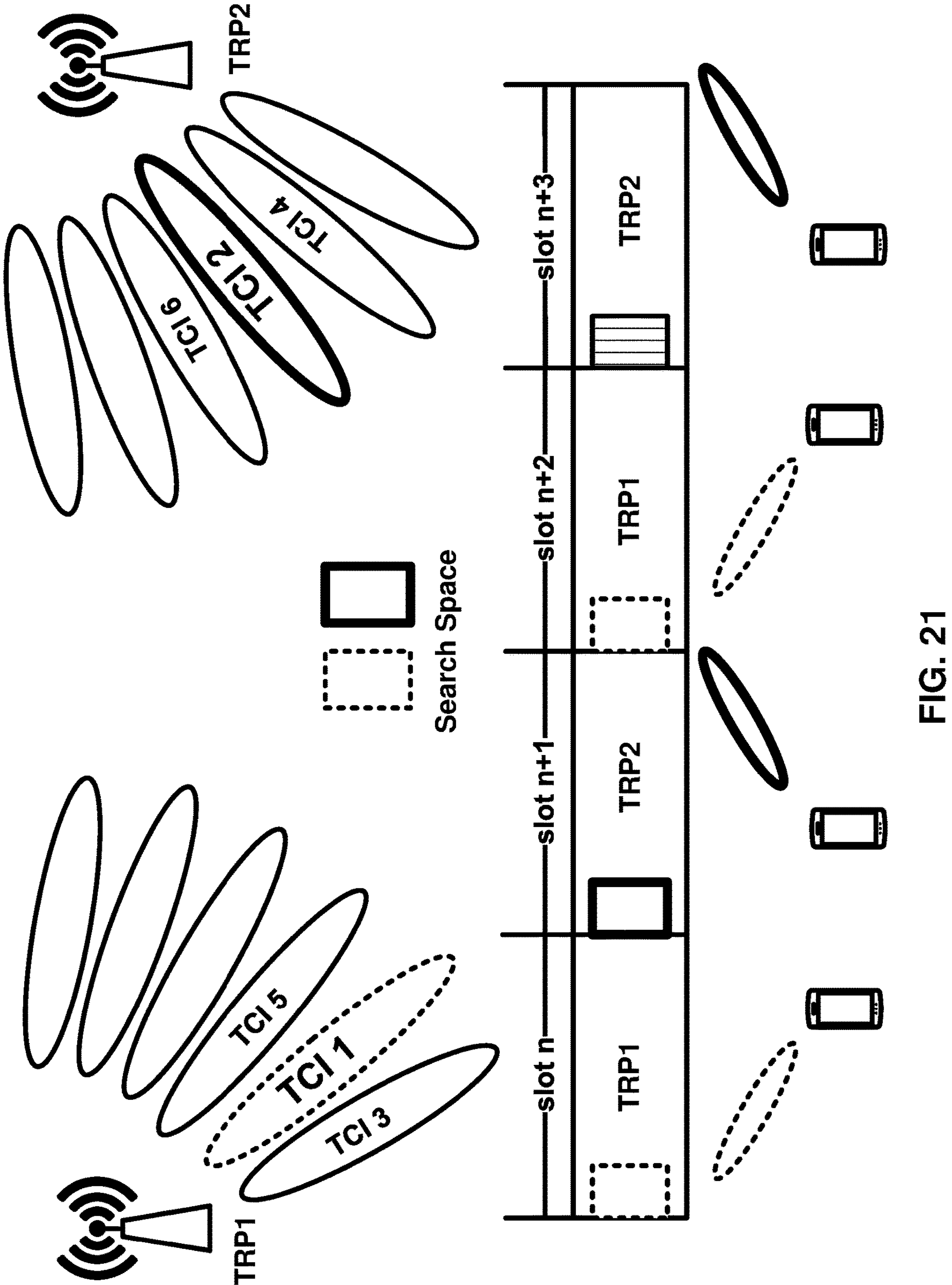
FIG. 21 is an example diagram of a semi-static time partitioning for different TCI states.

FIG. 21 illustrates an example of an embodiment where resources are partitioned across multiple TRPs. For example, a wireless device may receive one or more RRC messages indicating that a first set of transmission time intervals are slot n and slot n2+. The one or more RRC messages indicate that a second set of transmission time intervals are slot n+1 and slot n+3. The one or more RRC messages indicate that a first TCI states (e.g., TCI1, TCI3, TCI5) are associated with a first TRP (e.g., the first TCI states are configured for the first TRP). The one or more RRC messages indicate that a second TCI states (e.g., TCI2, TCI4, TCI6) are associated with a second TRP (e.g., the second TCI states are configured for the second TRP). For example, the first set of transmission time intervals may be configured/associated with a first CORESET group. The first CORESET group may be configured for the first TRP. The second set of transmission time intervals may be configured/associated with a second CORESET group. The second CORESET group may be configured for the second TRP. The wireless device may determine a first selected TCI state in the first set of transmission time intervals based on the first TCI states. For example, the wireless device may determine the first selected TCI state among TCI1, TCI3 and TCI5 in the slot n and slot n+2. For example, the wireless device may determine the second selected TCI state among TCI2, TCI4 and TCI6 in the slot n+1 and slot n+3. A TCI state of a search space monitored in a slot may be determined based on the transmission time intervals and the associated TCI states. For example, a TCI state of a Search Space in a slot n or slot n+2 may be one TCI from the first TCI states. For example, a TCI state of a Search Space in a slot n+1 or slot n+3 may be one TCI form the second TCI states. For example, the wireless device may monitor a CORESET/a Search Space on slot n assuming TCI1 from TRP1. The wireless device may monitor the CORESET/the Search Space on slot n+1 assuming TCI2 from TRP2. The first set of transmission time intervals and the second set of transmission time intervals may define a priority of each resource between the first TCI states and the second TCI states (e.g., associated with the first TRP and the second TRP respectively). For example, the wireless device may determine a TCI state of a PDSCH based on TCI state(s) of CORESET(s), a TCI state of a CORESET scheduling a DCI, or based on a TCI field in a DCI for a resource considering different sets of TCI states. When the wireless device may receive a PDSCH in a slot n, the wireless device may determine the TCI state of the PDSCH based on one or more CORESETs of the TRP1 without considering other CORESET(s) from TRP2.

A base station may indicate/configure a prioritized TRP for a resource via indicating a first set of transmission time intervals and a second set of transmission time intervals. A wireless device may assume that first TCI states associated with a first TRP may be prioritized in the first set of transmission time intervals. The wireless device may assume that second TCI states associated with a second TRP may be prioritized in the second set of transmission time intervals. A base station may activate a first selected TCI state and a second selected TCI associated with a CORESET in a BWP of a cell based on transmission time intervals. A wireless device may assume an active TCI state of the CORESET is the first selected TCI state during the first set of transmission time intervals. The wireless device may assume the active TCI state of the CORESET is the second selected TCI state during the second set of transmission time intervals. This mechanism may allow to share one or more CORESETs/Search Spaces among more than one TRPs. This mechanism may allow a wireless device to utilize existing capabilities (e.g., a number of supporting CORESETs/Search Spaces in a BWP of a cell) for an enhanced multi-TRP scenario without increasing the UE capabilities.

In an example, a wireless device may receive a DCI scheduling one or more PDSCHs across a plurality of slots. For example, the wireless device may receive the one or more PDSCHs for repeated transport block (TB) transmission. For example, the wireless device may receive the one or more PDSCHs for one or more TBs transmission. For example, the wireless device may receive the one or more PDSCHs based on a single TCI state or more than one TCI states. In an example, the wireless device may determine a single TCI state for the one or more PDSCHs based on a TCI state of a first PDSCH from the one or more PDSCHs. The wireless device may determine the first PDSCH, wherein the first PDSCH may occur at an earliest time resource among the one or more PDSCHs. The wireless device may determine the first PDSCH, wherein the first PDSCH is a PDSCH scheduled on a resource allocation comprised in the DCI. The wireless device may determine the first PDSCH based on a base station configuration (e.g., n-th PDSCH). The wireless device may apply the TCI state of the first PDSCH to the remaining PDSCHs of the one or more PDSCHs. The wireless device determines the TCI state of the first PDSCH same as a single PDSCH transmission.

In an example, the wireless device may determine a TCI state of a PDSCH independently for each PDSCH from the one or more PDSCHs. For example, the DCI may include a TCI field. The wireless device may apply the TCI state in the TCI field to a first PDSCH (e.g., an earliest PDSCH of the one or more PDSCHs) wherein the first PDSCH may have an equal or a larger timing offset than Threshold-Sched-Offset from the DCI. For other PDSCHs from the one or more PDSCHs, wherein the other PDSCHs may occur before the first PDSCH, the wireless device may determine a TCI state based on a default TCI determination. The wireless device may apply the TCI state to one or more second PDSCHs of the one or more PDSCHs, wherein the one or more second PDSCHs may occur after the first PDSCH. For example, the DCI may include a first TCI field with a first TCI state and a second TCI field with a second TCI state or a second TCI field which corresponds to a first TCI state and a second TCI state. For example, the second TCI field may indicate an index/code point, wherein the index/code point may be associated with the first TCI state and the second TCI state. The first TCI state may be associated with a first TRP. The second TCI state may be associated with a second TRP. The wireless device may apply the first TCI state to a first PDSCH, among the one or more PDSCHs, wherein the first PDSCH is a first PDSCH of one or more second PDSCHs, wherein the one or more second PDSCHs may haves an equal or a larger timing offset than Threshold-Sched-Offset from the DCI. A gap between the DCI to a PDSCH of the one or more second PDSCHs may be equal to or larger than Threshold-Sched-Offset. The wireless device may determine the first PDSCH, wherein the first PDSCH may be scheduled on an earliest resource of the one or more second PDSCHs. The first PDSCH may have a gap between the DCI and the first PDSCH, wherein the gap is equal to the Threshold-Sched-Offset. The wireless device may determine the first PDSCH based on a rule or based on a base station configuration.

The wireless device may apply the second TCI state to a next PDSCH (a PDSCH scheduled immediately after the first PDSCH, e.g., a next slot, a next resource unit, a next available resource, a next transmission occasion, a next scheduled resource, and/or the like) of the first PDSCH from the one or more second PDSCHs. The wireless device may apply the first TCI state and the second TCI state to the one or more second PDSCHs from the first PDSCH in a turn. The wireless device may apply a default TCI for one or more third PDSCHs of the one or more PDSCHs, wherein the one or more third PDSCHs may occur before the first PDSCH. For example, the DCI may not include a TCI field. The wireless device may apply a TCI state of a CORESET transmitting the DCI to a first PDSCH, among the one or more PDSCHs, wherein the first PDSCH may be an earliest occurring/scheduled PDSCH with a gap between the DCI and the first PDSCH being an equal or a larger timing offset than Threshold-Sched-Offset. When the CORESET is associated with more than one active TCI states, the wireless device may apply a first active TCI state and a second active TCI state in a turn for PDSCHs after the first PDSCH. The wireless device may apply a default TCI state for a PDSCH before the first PDSCH from the one or more PDSCHs. The wireless device may apply a TCI state of the CORESET, when a single TCI state is active for the CORESET, to a first PDSCH, among the one or more PDSCHs, which has a larger timing offset than Threshold-Sched-Offset from the DCI. The wireless device may apply a default TCI state for a PDSCH before the first PDSCH.

In an example, a wireless device may receive one or more RRC messages and/or MAC CE commands and/or DCIs for a CORESET for a BWP for a cell comprising a first selected TCI state and a second selected TCI state. The first selected TCI state may correspond to one TCI state of first TCI states. The second selected TCI state may correspond to one TCI state of second TCI states. The wireless device may identify first TCI states and second TCI states based on a rule or a configuration. For example, when a wireless device may be configured with a TRP index for one or more TCI states, the first TCI states may be defined as a set of TCI states with the TRP index to the first TRP. The second TCI states may be defined as a set of TCI states with the TRP index to the second TRP. For example, when a wireless device may be configured with a CORESET group index for one or more TCI states, the wireless device may determine the first TCI states based on the first CORESET group index and the second TCI states based on the second CORESET group index. For example, the wireless device may receive the first TCI states and the second TCI states via one or more RRC messages (e.g., TCI state groups). The wireless device may expect the first selected TCI state from the first TCI states and the second selected TCI state from the second TCI states.

In an example, a wireless device may be configured with a single TCI state for a CORESET of a BWP of a cell. The wireless device may assume the single TCI state is activated for the CORESET. In an example, a wireless device may be configured with a first TCI state and a second TCI state for a CORESET of a BWP of a cell. The wireless device may assume that the first TCI state and the second TCI state are activated for the CORESET when the first TCI state and the second TCI state may not belong to the same CORESET group or the same TRP or the same TCI state group. In an example, a wireless may be configured with more than one TCI states where more than one TCI states belong to the same CORESET group or the same TRP or the same TCI state group, the wireless device may not assume that the configured TCI states are activated until the wireless device may receive one or more MAC CEs to active one or two TCI states.

The wireless device may be indicated with a first set of transmission time intervals for the first TCI state. The wireless device may be indicated with a second set of transmission time intervals for the second TCI state. The wireless device may assume the first TCI state in the indicated first set of transmission time intervals. The wireless device may assume the second TCI state in the indicated second set of transmission time intervals. For example, the first set of transmission time intervals may comprise a set of slots which are not indicated in the second set of transmission time intervals.

Figure 22:
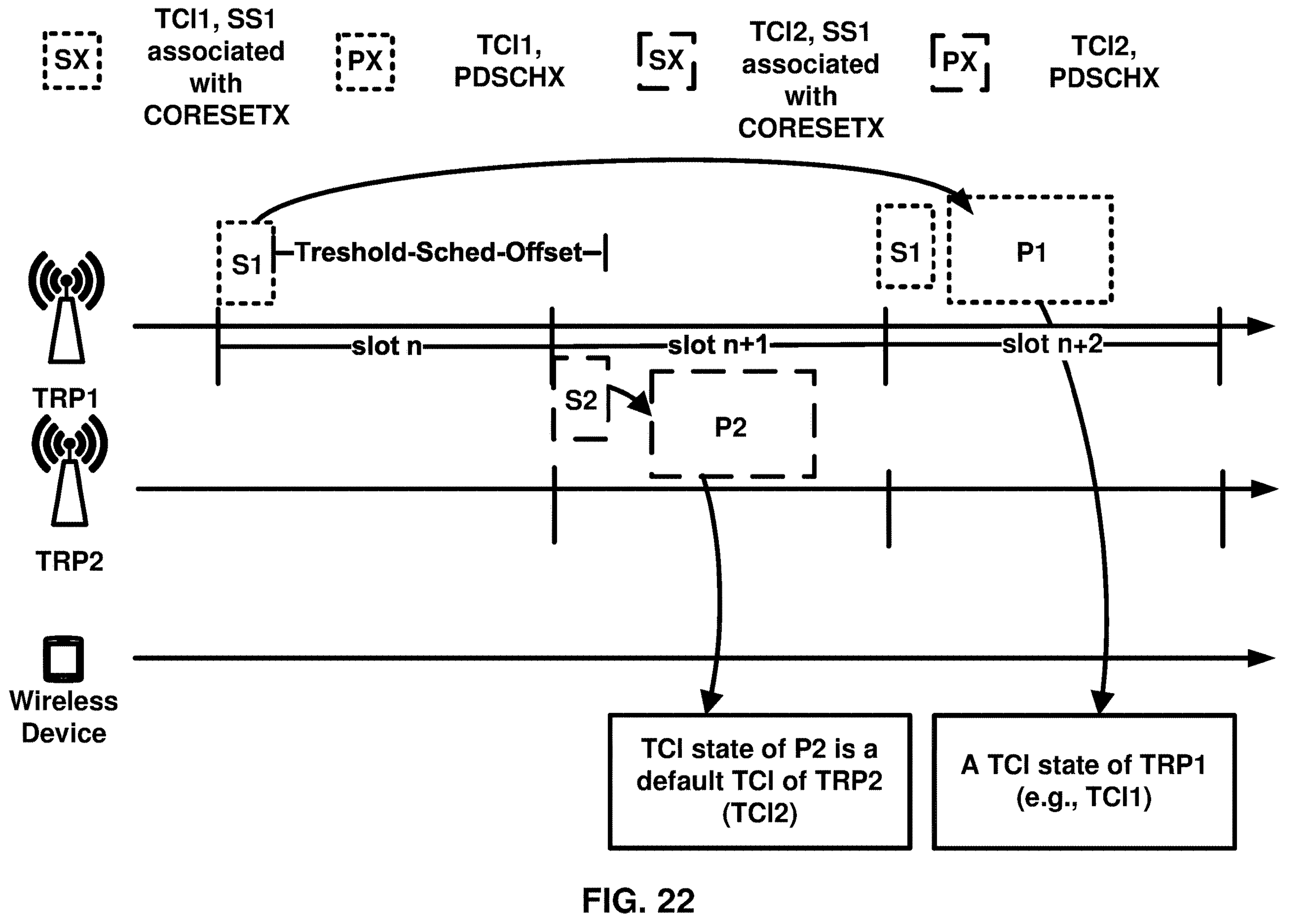
FIG. 22 is an example diagram of a TCI state determination in a multi-TRP scenario.

In an example, a wireless device may be configured with a first CORESET with a first active TCI state and a second CORESET with a second active TCI state. The wireless device may be configured with one or more search spaces (Search Spaces) where the first active TCI state and the second active TCI state are applied. The wireless device may receive a Search Space configuration that is associated with the first CORESET as well as the second CORESET. The wireless device, for the Search Space, may receive a first monitoring occasion configuration (e.g., periodicity, offset, monitoring symbols) associated with the first CORESET and a second monitoring occasion configuration (e.g., periodicity, offset, monitoring symbols) associated with the second CORESET. The wireless device may not expect that there is any overlap between the first monitoring occasions and the second monitoring occasions. The wireless device may apply the first active TCI state and the second active TCI state for the Search Space depending on the first monitoring occasions or the second monitoring occasions. With a limited number of Search Space configurations supported by a wireless device, this approach may allow a set of candidates are associated with multiple TCI states in different time occasions. FIG. 22 illustrates an example. For example, a base station may configure a search space (SS1) that is associated with a CORESET of a first TRP (TRP1) (e.g., CORESET1) and a CORESET of a second TRP (TRP2) (e.g., CORESET2) to a wireless device. The gNB configures an active TCI state of the CORESET1 as TCI state #1 (e.g., TCI1) and an active TCI state of the CORESET2 as TCI state #2 (e.g., TCI2). The base station may configure a slot n and a slot n+2 as first monitoring occasions for the SS1, which is associated with the TCI state #2 of the first TRP. The base station may configure a slot n+1 as second monitoring occasions for the SS1, which is associated with the TCI state #1 of the second TRP. The wireless device monitors using TCI1 in slot n/n+2 and TCI1 in slot n+1 based on the first and the second monitoring occasion configurations.

In an example, a wireless device may determine a TCI state of a search space based on a first set of transmission time intervals and a second set of transmission time intervals. The wireless device may determine a TCI state based on a first CORESET during the first set of transmission time intervals where the first CORESET belongs to the first TRP (e.g., TCI state of the first CORESET may belong to a first TRP group or the first CORESET may belong to the first CORESET group). Similarly, the wireless device may determine a TCI state based on a second CORESET during the second set of transmission time intervals where the second CORESET belongs to the second TRP. In FIG. 22, the base station may configure the first set of transmission time intervals of a slot n and n+2. The base station may configure the second set of transmission time intervals of a slot n+1. In determining a TCI state of a PDSCH (e.g., P2) where a timing offset between a DCI (e.g., carried in S1) and the PDSCH is smaller than Threshold-Sched-Offset, the wireless device applies a TCI state of a lowest indexed CORESET among the CORESETs monitoring in the recent slot (e.g., slot n+1). The wireless device may determine the TCI state of CORESET #2 as the TCI state of the PDSCH (e.g., P2) based on the CORESET index. In slot n+2, the wireless device may identify a TCI state of a PDSCH (e.g., P1) scheduled by a DCI on SS1 from TRP1 among the first TCI states. For example, the DCI may indicate TCI state #1 for the PDSCH #1 (e.g., P1).

In an example, a wireless device may determine a TCI state of a PDSCH based on a timing offset between a scheduling DCI of the PDSCH and the PDSCH, and/or one or more CORESETs monitored for a TRP in the most recent slot, and/or a TCI field in the DCI, and/or a DCI format used for the DCI, and/or the like. In an example, in FIG. 19, the wireless device may assume that a TCI state of the first PDSCH (e.g., P1) (a PDSCH scheduled with an offset less than a Threshold-Sched-Offset) based on the lowest indexed CORESET among one or more CORESETs, associated with a first TRP, monitored in the most recent slot. The state of a PDSCH in such a case may be called as a default TCI state of the PDSCH. The first TRP may be a primary TRP or a TRP with a smallest index of TRP index or a TRP with a smallest CORESET group index or a base station may indicate the index for the first TRP or the CORESET group index to determine the first TRP. The wireless device may determine a default TCI state based on one or more TCI states associated with the first TRP when the timing offset is smaller than the threshold (e.g., Threshold-Sched-Offset). The default TCI may be determined based on one or more CORESETs of a primary TRP or a lowest indexed TRP or the lowest CORESET group index or based on the base station configuration. For example, TRP1 is the first TRP used for determining a default TCI state in FIG. 19. The wireless device determines a TCI state of a first PDSCH (e.g., P1) based on CORESET #1 only in slot n. For example, TRP2 is the first TRP used for determining a default TCI state in FIG. 19. The wireless device determines the default TCI state of the first PDSCH (e.g., P1) based on CORESET #2 in slot n. In an example, a wireless device may determine a default TCI state based on one or more CORESETs monitored in a cell without considering association to either TRP or both TRPs. In an example, a wireless device may identify a default TCI state based on one or more first CORESETs configured to monitor in a most recent slot instead of based on one or more second CORESETs actually monitored in the most recent slot. The wireless device may skip one or more CORESETs from the one or more first CORESETs based on a power saving technique or based on broadcast (e.g., SIB) monitoring. Regardless of actual monitoring behavior, the wireless device may use the configured CORESETs to determine a TCI state. This may avoid ambiguity in a TRP in terms of a determined TCI state based on a dynamic change of a UE search space monitoring. In an example, a wireless device may use only actually monitored CORESETs in determining a TCI state.

In an example, a wireless device may be indicated with a first set of time resources (e.g., transmission time intervals) for a first TRP. The wireless device may be indicated with a second set of time resources (e.g., transmission time intervals) for a second TRP. The wireless device may determine a first default TCI state of a PDSCH during the first set of time resources based on one or more TCI states associated with one or more first CORESETs associated with the first TRP. The wireless device may determine a second default TCI state of a PDSCH during the second set of time resources based on one or more TCI states associated with one or more second CORESETs associated with the second TRP. A CORESET may be associated with a TRP based on a TCI configuration for the CORESET. A CORESET may be associated with a TRP based on a CORESET group index configured for the CORESET. A CORESET may be associated with a TRP based on a TRP index configured for the CORESET. A wireless device may determine a TCI state of a CORESET, which the wireless device monitored in the most recent slot, as a default TCI state of a PDSCH in a slot n without consideration of association with one or more TRPs.

In an example, a wireless device may determine a default TCI state of a PDSCH based on one or more CORESETs of a first TRP when there is at least one CSS actually monitored (e.g., when the wireless device has monitored a CSS) in a most recent slot. The wireless may determine the default TCI of a PDSCH based on one or more CORESETs monitored in the most recent slot without consideration of association with one or more TRPs when the wireless device has not monitored any CSS during the most recent slot.

In an example, a wireless device may not expect to be configured with one or more search space where a gap/interval between a first monitoring occasion of a first search space and a second monitoring occasion of a second search space may be smaller than Threshold-Sched-Offset. The first search space and the second search space are different. A first TCI state of the first Search Space and a second TCI state of the second Search Space are different. A first TRP associated with the first Search Space and a second TRP associated with the second Search Space may be different. The first search space may be associated with the first TRP. The second search space may be associated with the second TRP. Between two monitoring occasions of different TRPs may not be smaller than Threshold-Sched-Offset. When this configuration is assumed, the wireless device may determine a default TCI state based on one or more CORESETs monitored in the most recent slot regardless of a TRP.

In an example, a wireless device may receive RRC messages indicating a first set of transmission time intervals for a first TRP. The wireless device may receive RRC messages indicating a second set of transmission time intervals for a second TRP. The wireless device may determine the first set of transmission time intervals and the second set of transmission time intervals based on one or more semi-static configurations such as one or more search space configurations. For example, a wireless device, for a first slot of an active BWP of a cell, may assume a resource starting from a first OFDM symbol of a first search space monitoring during Threshold-Sched-Offset duration may belong the first set of transmission time intervals if a TCI state of the first search space is associated with the first TRP. The wireless device, for a second slot of the active BWP of the cell, may assume a resource starting from a first OFDM symbol of a second search space monitoring during Threshold-Sched-Offset duration may belong the second set of transmission time intervals if a TCI state of the first search space is associated with the second TRP. When there is an overlap between the first set of transmission time intervals and the second set of transmission time intervals, the wireless device may assume that the overlapped resource may belong to the first set of transmission time intervals. In determining a first set of transmission time intervals and/or a second set of transmission time intervals, a wireless device may use a first active BWP of a first TRP and a second active BWP of a second TRP (or an active BWP for a TRP). In response to a BWP switching of a TRP, a new set of transmission time intervals may be determined based on the new active BWP. In an example, the first active BWP and the second active BWP may be the same.

Figure 23:
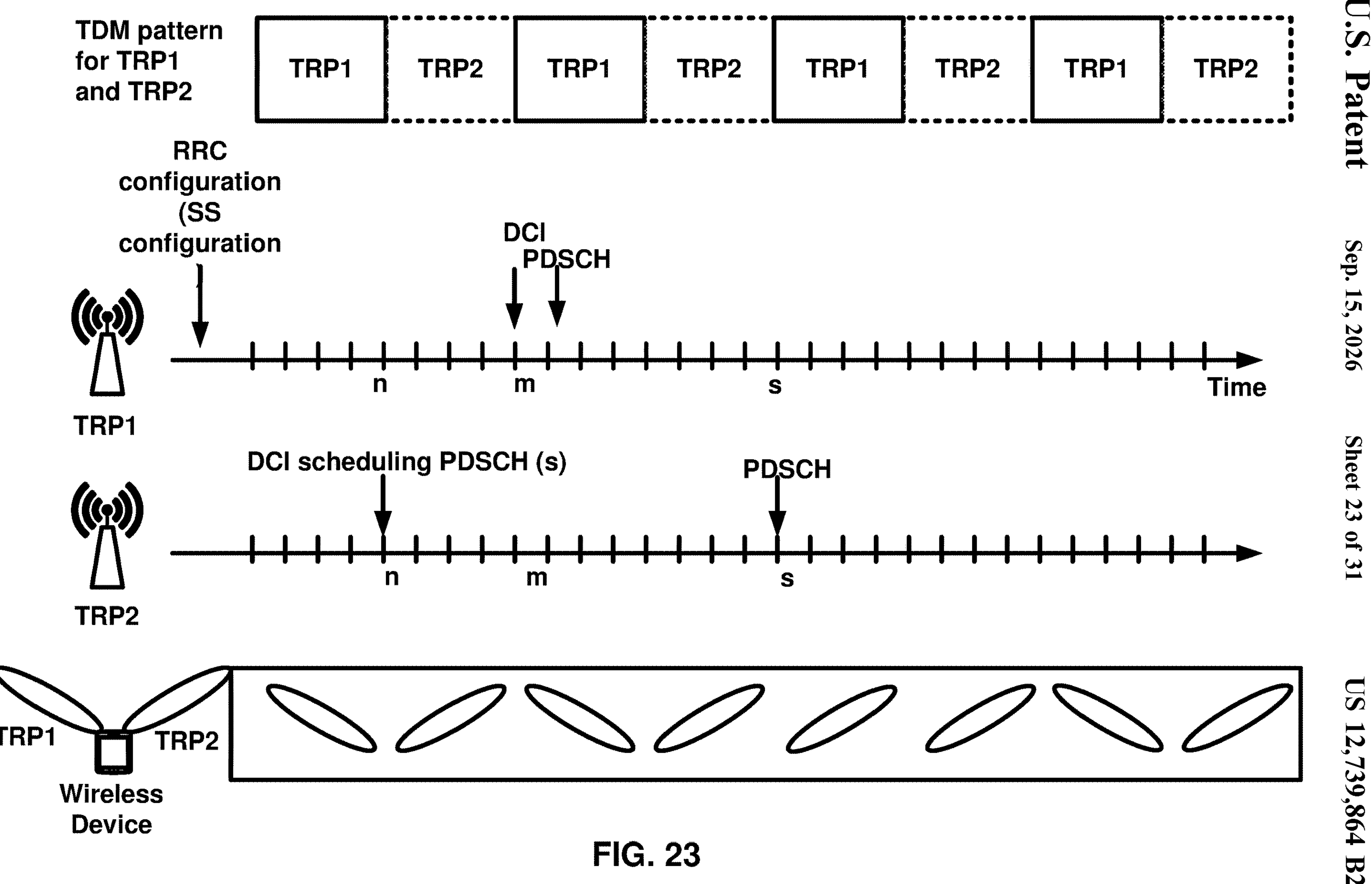
FIG. 23 is an example diagram of a TCI state determination procedure.

In an example, a wireless device may determine a first default TCI state of a first resource, during the first set of transmission time intervals, based on a first CORESETs monitored in the most recent slot of the first set of transmission time intervals. The wireless device may determine a second default TCI state of a second resource, during the second set of transmission time intervals, based on a second CORESETs monitored in the most recent slot of the second set of transmission time intervals. FIG. 23 illustrates an example. In an example, a wireless device is configured/activated with a first TRP (TRP1) and a second TRP (TRP2). For example, a wireless device may receive one or more RRC configurations to determine a first set of transmission time intervals and a second set of transmission time intervals. Based on one or more Search Space configurations or explicit configurations, the wireless device determines a TDM pattern where the first and the second set of transmission time intervals take a turn in each unit. The wireless device may apply a default TCI state determined based on the first and the second set of transmission time intervals in each transmission time interval unit unless otherwise noted. For example, the wireless device applies a first default TCI before a time n based on the first TRP. For example, the wireless device applies a second default TCI after a time n to a time m based on the second TRP, and so on. In a time n, the second TRP (TRP2) transmits a first DCI scheduling a first PDSCH at a time s. For example, one transmission time interval unit is larger than or equal to Threshold-Sched-Offset. The first DCI includes a TCI field to indicate a TCI state of the PDSCH. The first TRP (TRP1) transmits a second DCI on time m where a second PDSCH is transmitted immediately after. A TCI state of the second PDSCH may be determined based on a first default TCI state and based on the one or more first CORESETs monitored for the second TRP in the slot/transmission time interval. The wireless device applies a TCI state of the first TRP to the second PDSCH. In receiving the first PDSCH scheduled by the first DCI with the TCI field, the wireless device applies the indicated TCI state by the TCI field to the second PDSCH even though the transmission time interval where the first PDSCH is received belongs to the first set of transmission time intervals. In determining a TCI state of a PDSCH, a wireless device may override a default TCI state when there is implicit or explicit indication of a TCI state. For example, an implicit indication may include a DCI based on DCI format 1_0 schedules the PDSCH where a timing offset between the DCI and the PDSCH is greater than or equal to Threshold-Sched-Offset. For example, an implicit indication may include a DCI from a CORESET that is not configured with tci-PresentInDCI schedules the PDSCH where a timing offset between the DCI and the PDSCH is greater than or equal to Threshold-Sched-Offset. For example, an explicit indication may include a DCI with a TCI field from a CORESET that is configured with tci-PresentInDCI schedules the PDSCH where a timing offset between the DCI and the PDSCH is greater than or equal to Threshold-Sched-Offset.

Figure 24:
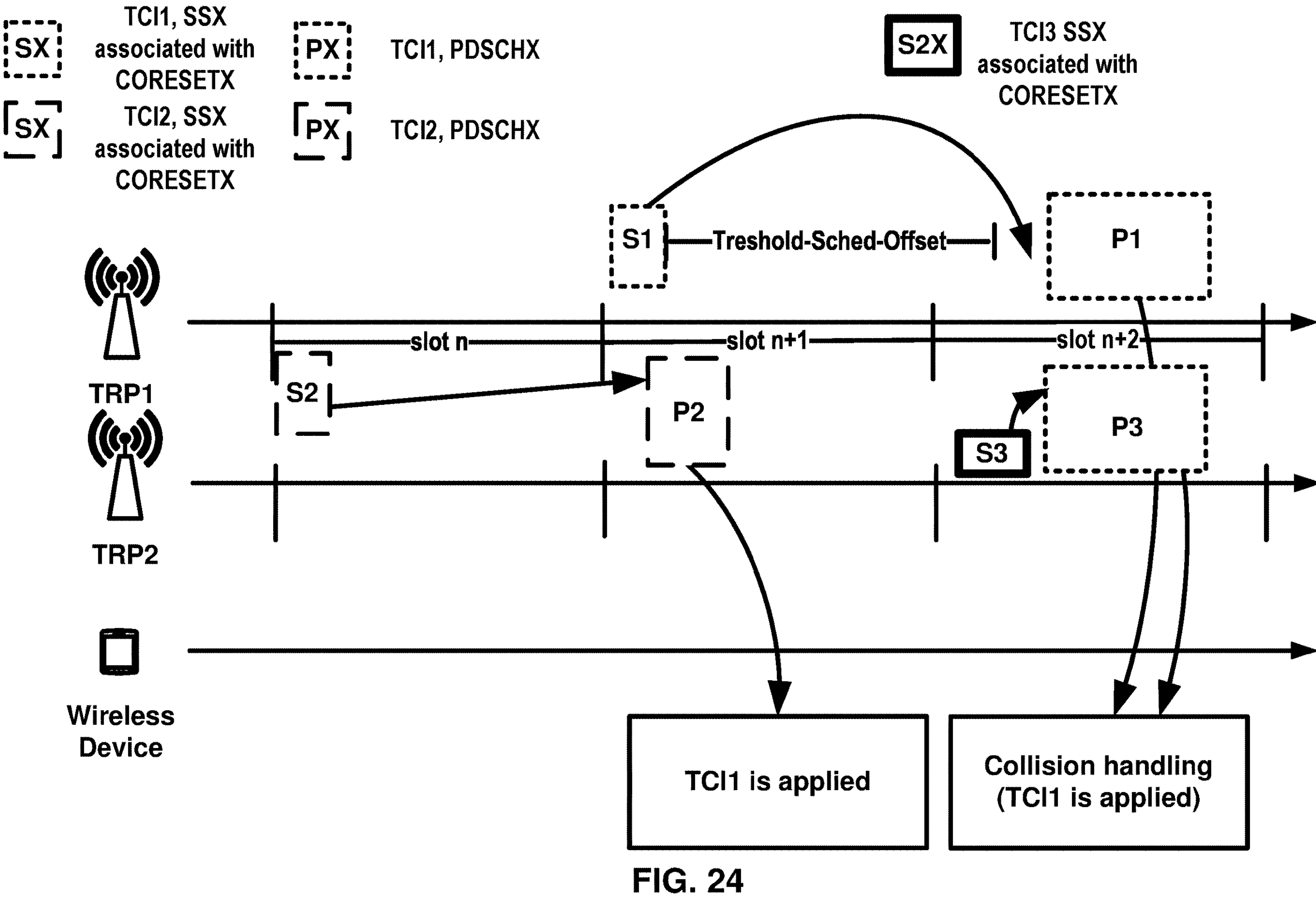
FIG. 24 is an example diagram of a TCI state determination procedure.

FIG. 24 illustrates an example of a potential collision between a default TCI of a second TRP and an explicit TCI indicated by a scheduling DCI for a first TRP in a time resource (e.g., a slot). A wireless device is configured/activated with a first TRP (TRP1) and a second TRP (TRP2). A base station configures a first set of transmission time intervals of a slot n and n+2 for the first TRP. The base station configures the second set of transmission time intervals of a slot n+1 for the second TRP. A TCI state of CORESET1/SS1 is TCI state #1, a TCI state of CORESET2/SS2 is TCI state #2, and a TCI state of CORESET3/SS3 is TCI state #3. In a slot n+1, the first TRP transmits a first DCI scheduling a first PDSCH (e.g., P1) at slot n+2. In a slot n, the second TRP transmits a second DCI scheduling a second PDSCH (e.g., P2) at slot n+1. In a slot n+2, the second TRP transmits a third DCI scheduling a third PDSCH (e.g., P3) at slot n+2. The wireless device determines a TCI state of the second PDSCH (e.g., P2) based on the TCI state of CORESET2, assuming the second DCI is based on a fallback DCI format (e.g., DCI format 1_0), as the timing offset between the second DCI and the second PDSCH is equal to or larger than Threshold-Sched-Offset. Based on the second DCI scheduling P2 and the TCI state of the second PDSCH is implicitly determined, the wireless device prioritizes the TCI state implicitly indicated by the second DCI for the second PDSCH on slot n+1 over a default TCI state (e.g., TCI state 1 in slot n+1). In slot n+2, the wireless device may put higher priority on a first TCI state, that is explicitly indicated by the first DCI for the first PDSCH (e.g., P1), over a third TCI state, that is determined based on a default TCI state for the third PDSCH (e.g., P3). The wireless device applies the first TCI state (e.g., TCI state #1) in PDSCH(s) reception at slot n+2. The wireless device may skip receiving the third PDSCH P3 (as the TCI state (TCI1) is not desirable for P3) or may receive P3 with the TCI state (e.g., TCI1). A wireless device may follow a TCI state of a PDSCH which has been implicitly or explicitly indicated by a scheduling DCI. The scheduling DCI may implicitly indicate the TCI if a CORESET carrying the DCI may not be configured with tci-PresentInDCI and the timing offset between the scheduling DCI and the PDSCH is larger than or equal to Threshold-Sched-Offset. The scheduling DCI may implicitly indicate the TCI if a CORESET carrying the DCI may be configured with tci-PresentInDCI and the DCI is based on a DCI format which does not carry a TCI field (e.g., a fallback DCI format) and the timing offset between the scheduling DCI and the PDSCH is larger than or equal to Threshold-Sched-Offset. The scheduling DCI may explicitly indicate the TCI if a CORESET carrying the DCI may be configured with tci-PresentInDCI and the DCI is based on a DCI format which may carry a TCI field (e.g., a fallback DCI format) and the timing offset between the scheduling DCI and the PDSCH is larger than or equal to Threshold-Sched-Offset. When there are two PDSCHs in a slot/resource unit from more than one TRP with TCI states indicated by DCIs, the wireless device may select a PDSCH of a lowest indexed TRP, a lowest indexed CORESET group ID, a PDSCH scheduled by a DCI in CSS, a PDSCH scheduled by a DCI with a lower search space index, a PDSCH scheduled by a DCI with a lower CORESET index, and/or the like.

Figure 26:
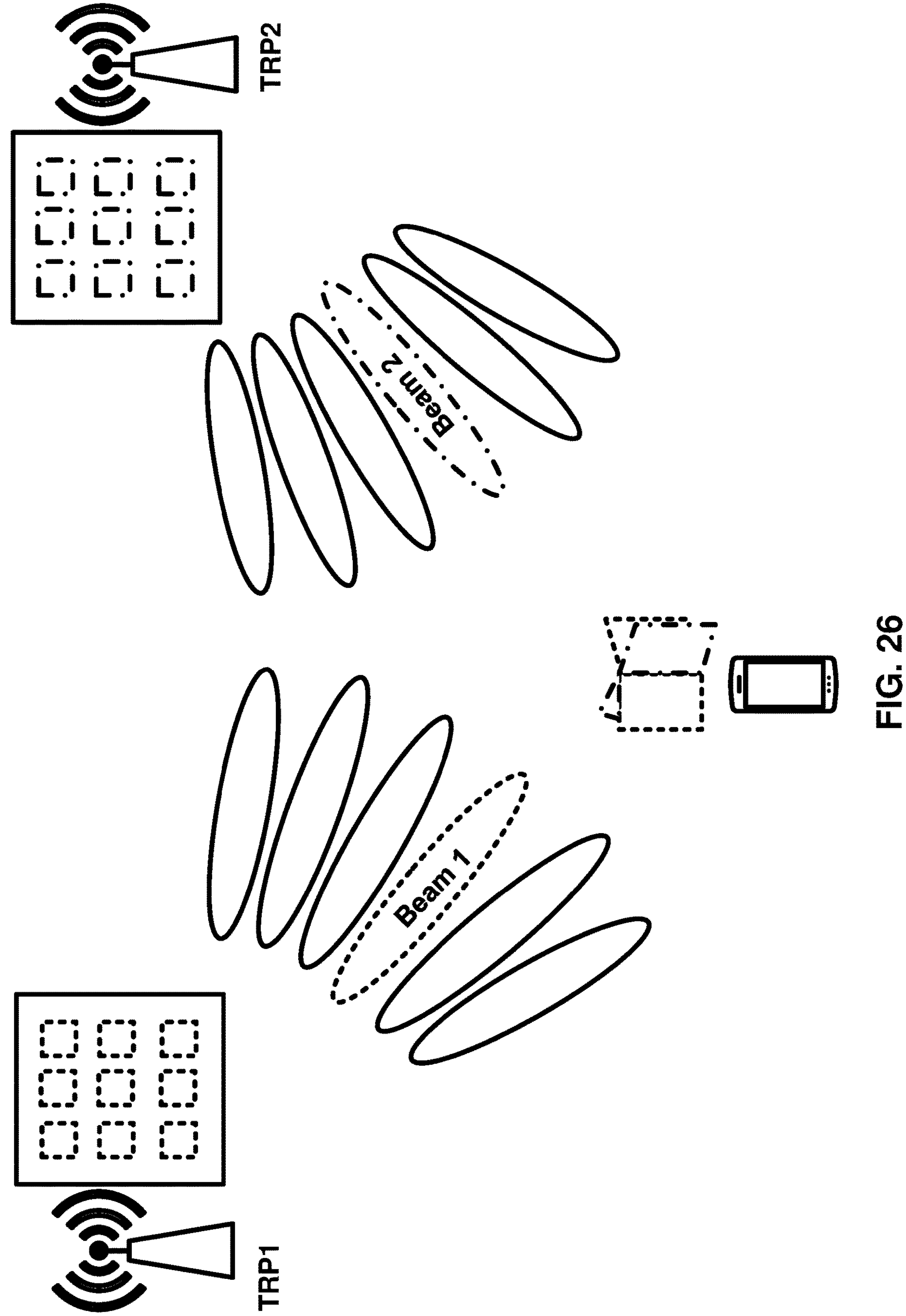
FIG. 26 is an example diagram of a multi-panel scenario.

A wireless device may support more than one use cases in a multi-TRP scenario. For example, the wireless device may support eMBB service via a first TRP and may support URLLC service via s second TRP. A wireless device may put higher priority on one or more first TCI states supporting URLLC over one or more second TCI states supporting eMBB. In an example, the one or more first TCI states may include a default TCI state determined based on one or more CORESETs. The wireless device may prioritize a default TCI state of a URLLC PDSCH over a TCI state of an eMBB PDSCH indicated implicitly or explicitly by a scheduling DCI of the eMBB PDSCH. FIG. 26 illustrates an example. In an example, a wireless device is configured/activated with a first TRP (TRP1) and a second TRP (TRP2). For example, the wireless device may monitor a first search space (SS1) and a second search space (SS2) where the first search space is transmitted by the first TRP (TRP1) and the second search space is transmitted by the second TRP (TRP2). For example, the wireless device may receive a first DCI from the first Search Space (SS1) to support one or more of eMBB packets. The wireless device may receive a second DCI from the second Search Space (SS2) to support one or more URLLC packets. The wireless device may have received a DCI via SS1 scheduling a first PDSCH on a time m. The wireless device may have received another DCI via SS1 scheduling a second PDSCH on a time s. A TCI state of the first PDSCH and the second PDSCH is assumed to be the same as a TCI state of a CORESET associated with the first search space. In determining a default TCI, the wireless device may assume a default TCI may be determined based on a search space monitoring occasion. From a starting OFDM symbol of a search space monitoring occasion (e.g., a first OFDM symbol of slot n) to a first symbol of a next search space monitoring occasion (e.g., a k-th OFDM symbol of slot n where a monitoring occasion of SS2 starts), the wireless device may determine a default TCI state based on the search space that the wireless device has monitored during the time. For example, the wireless device may switch a default TCI state from a first TCI state of a CORESET associated with SS1 to a second TCI state of another CORESET associated with SS2 in a slot n (between the first symbol to k−1-th symbol). In slot n+2, the wireless device may receive the second PDSCH with a TCI state indicated by the DCI. During the second PDSCH reception, the wireless device may monitor SS2 to support URLLC service. Regardless whether there is any control and/or data scheduled on SS2, the wireless device may prioritize URLLC service and switch a default TCI state based on a TCI state for monitoring SS2.

In determining a TCI state for receiving control and/or data in a time, a wireless device may follow a priority rule. For example, one or more TCI assumptions of one or more PDSCHs may collide (e.g., a first TCI assumption for a first PDSCH, a second TCI assumption for a second PDSCH, and a third TCI assumption for a third PDSCH may collide), a wireless device may prioritize a PDSCH supporting higher QoS requirement or higher priority (where the priority/QoS may be indicated by the higher layer or determined based on a search space scheduling the PDSCH or determined based on a TRP index, or determined based on a CORESET transmitting a DCI scheduling the PDSCH, or based on explicit priority/QoS field in a DCI, etc.). For example, a URLLC PDSCH may have higher priority over an eMBB PDSCH. In comparing a first PDSCH and a second PDSCH with different priority, the wireless device may not consider whether a PDSCH may be scheduled with a small timing gap between a DCI and the PDSCH (and thus a default TCI determination is applied to the PDSCH) or a PDSCH may be scheduled with a large timing gap between a DCI and the PDSCH (and thus an implicit or explicit DCI indication based TCI determination is applied to the PDSCH). The wireless device may assume there is a PDSCH scheduled after a search space regardless whether there is any actual scheduling or not. For the convenience, this is called 'a virtual PDSCH'.

For example, in FIG. 25, the wireless device may assume that there is a PDSCH scheduled after a SS2 monitoring occasion, which is called as a virtual PDSCH. The virtual PDSCH may not be an actual PDSCH scheduled by a DCI. The wireless device may assume the virtual PDSCH after the Search Space for potential scheduling of any data from the SS2 until the wireless device may finish decoding of the control channels/DCIs from SS2. Based on the virtual PDSCH and the second PDSCH scheduled by TRP1, the wireless device may select the virtual PDSCH in determining a TCI state during X duration. This may degrade the performance of TRP1, particularly when there is no data scheduling from SS2. A wireless device may receive an urgent data transmission successfully by prioritizing potential transmissions. The TRP1 may not schedule a data during X to avoid the performance degradation. When multiple PDSCHs may have the same priority, selection mechanism (s) mentioned in the specification (e.g., prioritize a PDSCH with an implicit/explicit DCI indication for a TCI determination) may be applied. In FIG. 25, the base station schedule a first PDSCH at a time m and a second PDSCH at a time s. The base station may indicate a first TCI state of the first PDSCH as a TCI state associated with a first TRP. The base station may indicate a second TCI state of the second PDSCH as the TCI state associated with the first TRP. During receiving the second PDSCH, the wireless device may monitor a second search space (SS2) wherein an active TCI state of the second search space is a second TCI state associated with a second TRP. The wireless device may determine a TCI state collision between the active TCI state and the second TCI state of the second PDSCH. The wireless device may prioritize the active TCI state of the second search space, as the second search space is for an URLLC. The wireless device may drop the second PDSCH or may drop a few OFDM symbols of the second PDSCH overlapping with the virtual PDSCH.

One or more embodiments specified in the specification may be applicable to a cross-carrier scheduling configuration. In an example, a wireless device may configure a cross-carrier scheduling configuration for a first TRP and/or a second TRP (or for a cell). A first list of TCI states for scheduled carrier/cell/TRP may be configured separately from a second list of TCI states for the scheduling carrier/cell/TRP. In determining a default TCI state of a PDSCH in a first TRP/carrier/cell where the first TRP/carrier/cell is cross-carrier scheduled by a second TRP/carrier/cell, a wireless device may identify a TCI state of one or more CORESETs monitored in the first TRP/carrier/cell in a most recent slot as the default TCI state. When there is no CORESET is monitored/configured in the first TRP/carrier/cell, a lowest indexed TCI state from one or more TCI states configured to the first TRP/carrier/cell may be used for the default TCI or the most recent TCI state assumption used for a PDSCH reception at the first TRP/carrier/cell may be used for the default TCI state. A wireless device may apply a first default TCI state determination (e.g., based on a lowest indexed CORESET monitored in the most recent slot) or a second default TCI determination (e.g., based on a lowest indexed TCI state) for a BWP depending on whether the BWP is configured with self-carrier scheduling or cross-carrier scheduling.

A wireless device may have one or more panels. FIG. 26 illustrates an example where a wireless device has four different panels. A base station may have two panels where a first TRP (TRP1) operates with a first panel and a second TRP (TRP2) operates with a second panel. The wireless device is activated with the first TRP and the second TRP where the wireless device may assign two panels for the first TRP and the remaining two panels for the second TRP. For the TRP1, a first beam (e.g., beam1, TCI state #1) is a good beam identified by the wireless device among one or more beams supported by the TRP1. For the TRP2, a second beam (e.g., beam2, TCI state #2) is a good beam identified by the wireless device among one or more beams supported by the TRP2. A wireless device may support a first Threshold-Sched-Offset and a second Threshold-Sched-Offset. The wireless device may report the first Threshold-Sched-Offset and the second Threshold-Sched-Offset to the base station. The wireless device may require the first Threshold-Sched-Offset for a timing offset of a DCI and its corresponding PDSCH when a first TCI state of a CORESET carrying the DCI and a second TCI state (e.g., indicated TCI state by the DCI) of the corresponding PDSCH are associated with the same TRP. The wireless device may require the second Threshold-Sched-Offset for a timing offset of a DCI and its corresponding PDSCH when a first TCI state of a CORESET carrying the DCI and a second TCI state of the corresponding PDSCH are associated with different TRPs. A wireless device may require larger offset to switch a TCI state of a TRP to another TCI state of another TRP. When the wireless device may support two offsets, a default TCI state may be defined for a timing offset is smaller than the first Threshold-Sched-Offset. When the wireless device may receive a DCI comprising a resource assignment and a TCI state of the other TRP, where the DCI is transmitted by the first TRP, the wireless device may skip monitoring of data/control between a last OFDM symbol of the CORESET/Search Space carried the DCI+Threshold-Sched-Offset and the starting OFDM symbol of the corresponding PDSCH scheduled by the DCI. The duration in between may be considered as a panel switching latency, and the wireless device is not expected to receive (and/or transmit) during a panel switching. In response to switching a panel, a wireless device may stay on the switched panel until the wireless device may receive another command to switch a panel.

Figure 27:
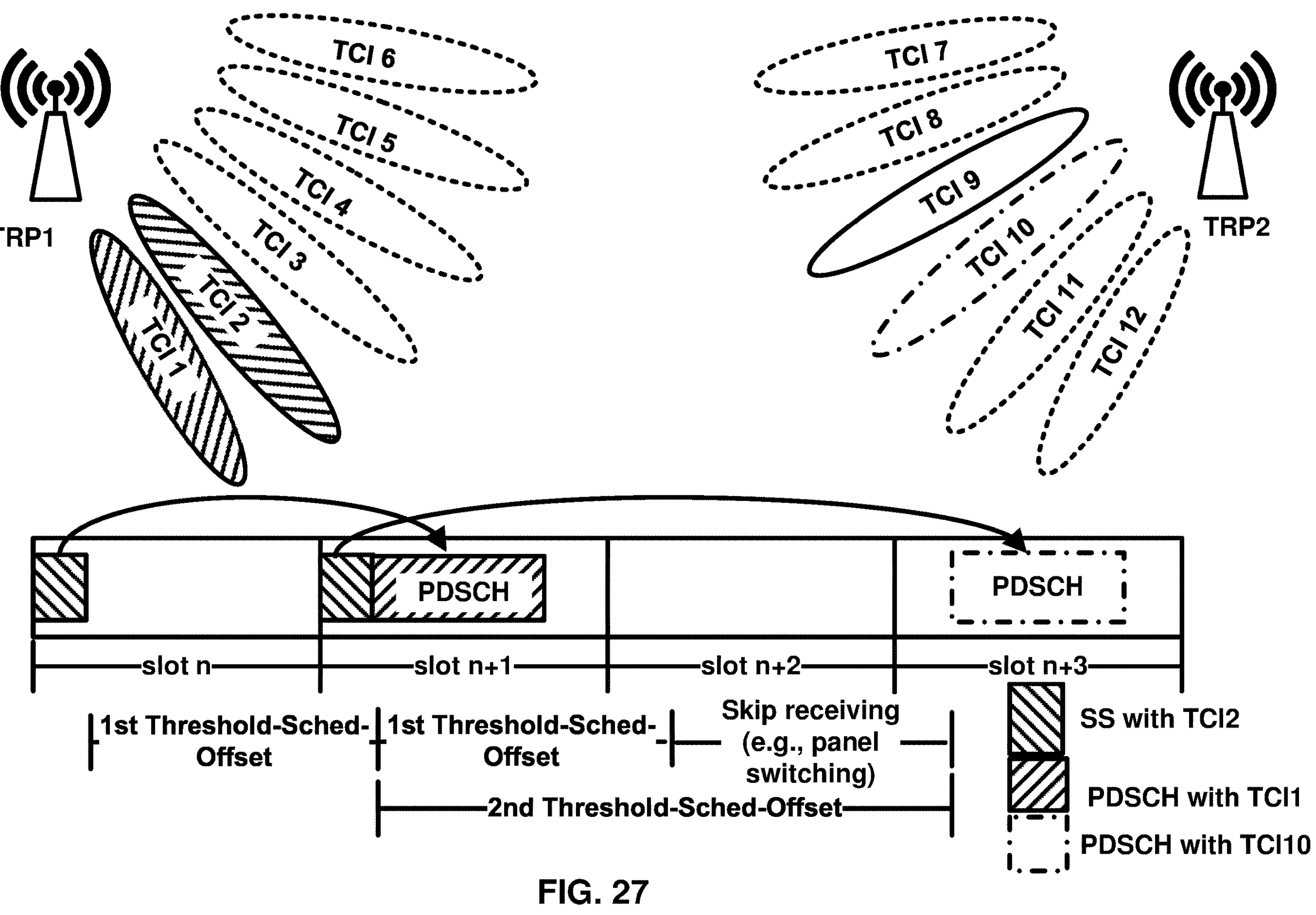
FIG. 27 is an example diagram of more than one Threshold-sched-offset values.

To support control/data monitoring in a different panel setting, a wireless device may be configured with one or more CORESETs/Search Spaces for each panel setup. The wireless device may activate a set of CORESETs/Search Spaces associated with a new panel when a panel switching is triggered. FIG. 27 illustrates an example. For example, a first DCI scheduling a first PDSCH with a first TCI state from the same TRP may require 1$^{st}$ Threshold-Sched-Offset. A second DCI scheduling a second PDSCH with a second TCI state from a different TRP may require 2$^{nd}$ Threshold-Sched-Offset. In an example, the first PDSCH may be scheduled at slot n+1 with an explicit indication of a TCI state by the first DCI. In an example, the second PDSCH may be scheduled at slot n+3 with by the second DCI (at slot n+1) with an explicit indication of a TCI state in another TRP (TRP2) by the second DCI transmitted by a TRP (TRP1).

Figure 28:
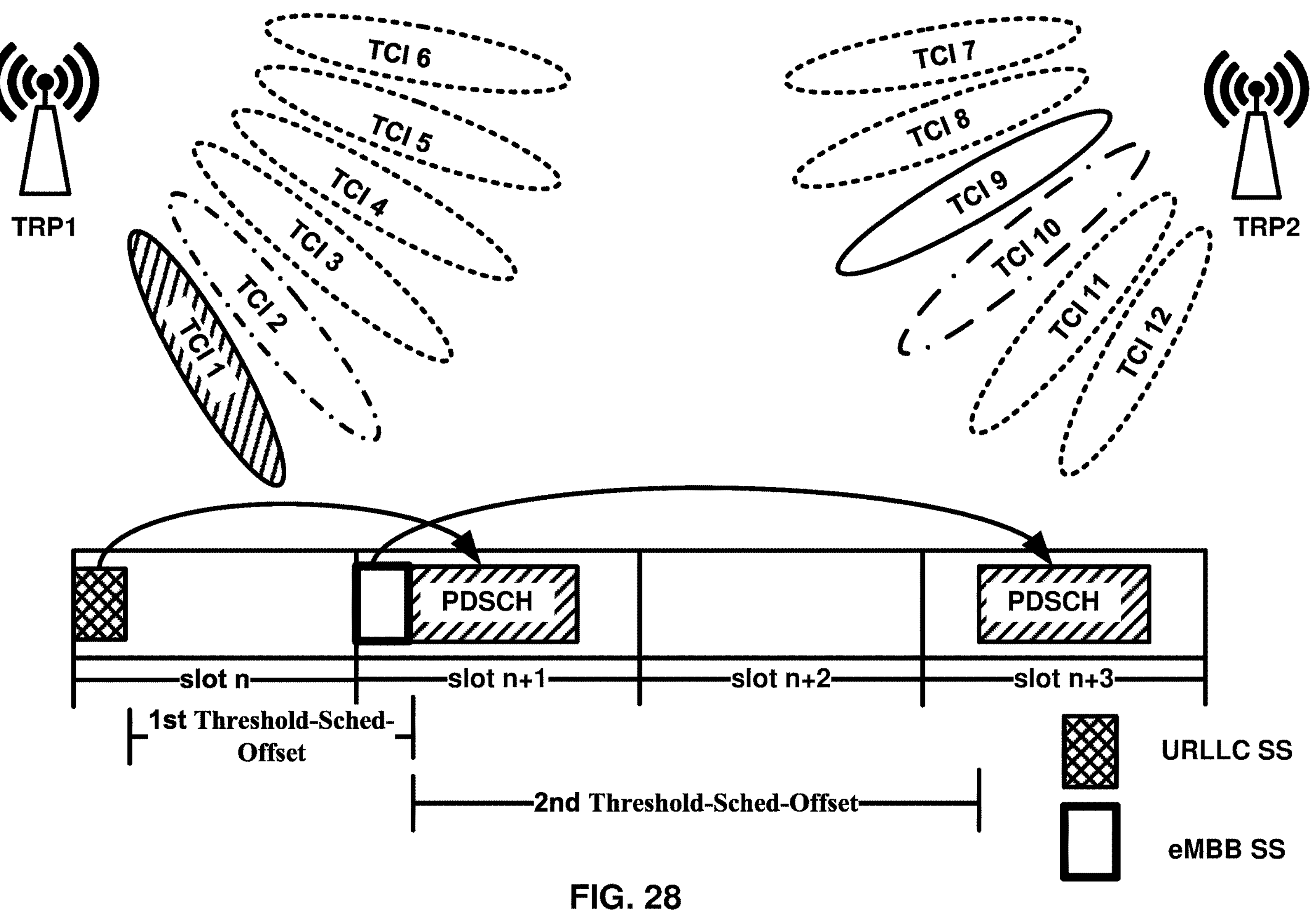
FIG. 28 is an example diagram of more than one Threshold-sched-offset values.

In an example, a wireless device may support more than one Threshold-Sched-Offset values. For example, a first Threshold-Sched-Offset may be applied to one or more search space monitoring occasions where the one or more search space may have a small number of candidates so that the wireless device may be able to finish a control channel decoding with a shorter delay. For example, a second Threshold-Sched-Offset may be applied to other search spaces. A wireless device may report the second Threshold-Sched-Offset and may optionally report the first Threshold-Sched-Offset. The wireless device may report one or more conditions where the second Threshold-Sched-Offset may be applied. For example, a condition may be a number of candidates for a search space or a CORESET span. For example, a condition may be one or more RNTIs associated with one or more search spaces. For example, a condition may be a supporting one or more capabilities for URLLC services. A base station may configure whether to apply a first Threshold-Sched-Offset for a search space, for a CORESET, for a TRP, for a set of search space, for a set of CORESETs, for a set of RNTIs. When there is no configuration to utilize the first Threshold-Sched-Offset, the wireless device may assume that the second Threshold-Sched-Offset value is used. FIG. 28 illustrates an example. A wireless device receives a first DCI (in slot n) scheduling a first PDSCH (in slot n+1) where the first PDSCH is for a URLLC service. The wireless device receives a second DCI (in slot n+1) scheduling a second PDSCH (in slot n+3) where the second PDSCH is for an eMBB service. In the example, a wireless device supports $1^{st}$ Threshold-Sched-Offset for one or more search space scheduling a DCI to support URLLC services. The wireless device supports $2^{nd}$ Threshold-Sched-Offset for one or more search space scheduling a DCI to support eMBB services. Depending on which search space, the wireless device may apply different Threshold-Sched-Offset in determining a TCI state of a PDSCH. In the example, a TCI state of the first PDSCH, after the $1^{st}$ Threshold-Sched-Offset, is determined based on the indication of the first DCI. In the example, a TCI state of the second PDSCH, after $2^{nd}$ Threshold-Sched-Offset, is determined based on the indication of the second DCI.

Figure 29:
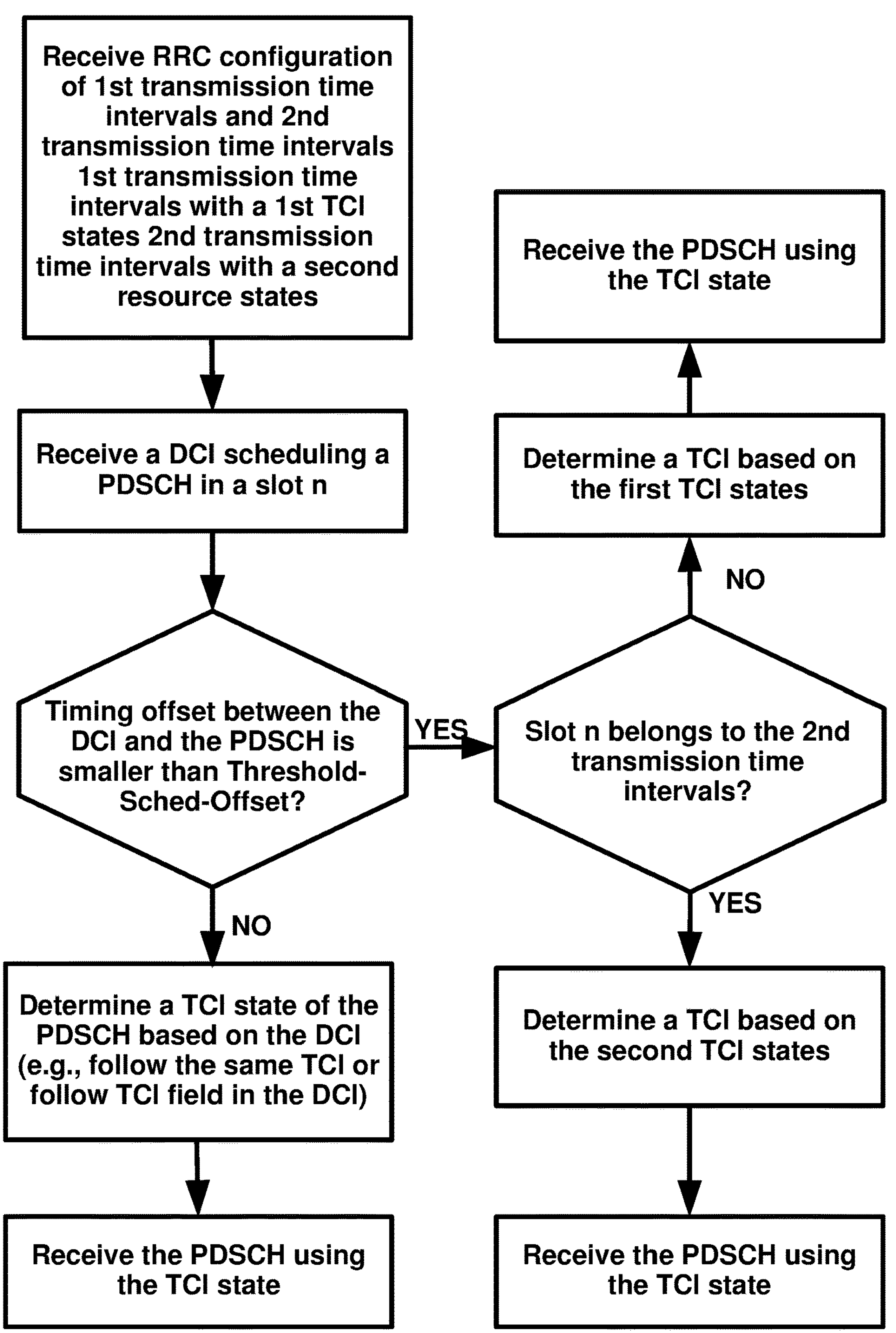
FIG. 29 is a flow diagram of an aspect of an example embodiment of the present disclosure.

FIG. 29 illustrates a flow diagram to determine a TCI state for a PDSCH. A wireless device may determine a first default TCI state based on a first set of TCI states during a first set of transmission time intervals. The wireless device may determine a second default TCI state based on a second set of TCI states during a second set of transmission time intervals. The wireless device may receive a DCI scheduling a PDSCH on a slot n. If the timing offset between the DCI and the PDSCH is smaller than a Threshold-Sched-Offset, the wireless device applies the first default TCI or the second DCI depending on whether the slot n belongs to the first set of transmission time intervals or the second set of transmission time intervals. Otherwise, the indicated TCI state by the DCI (e.g., either by implicitly or explicitly) is assumed for the TCI state of the PDSCH.

Figure 30:
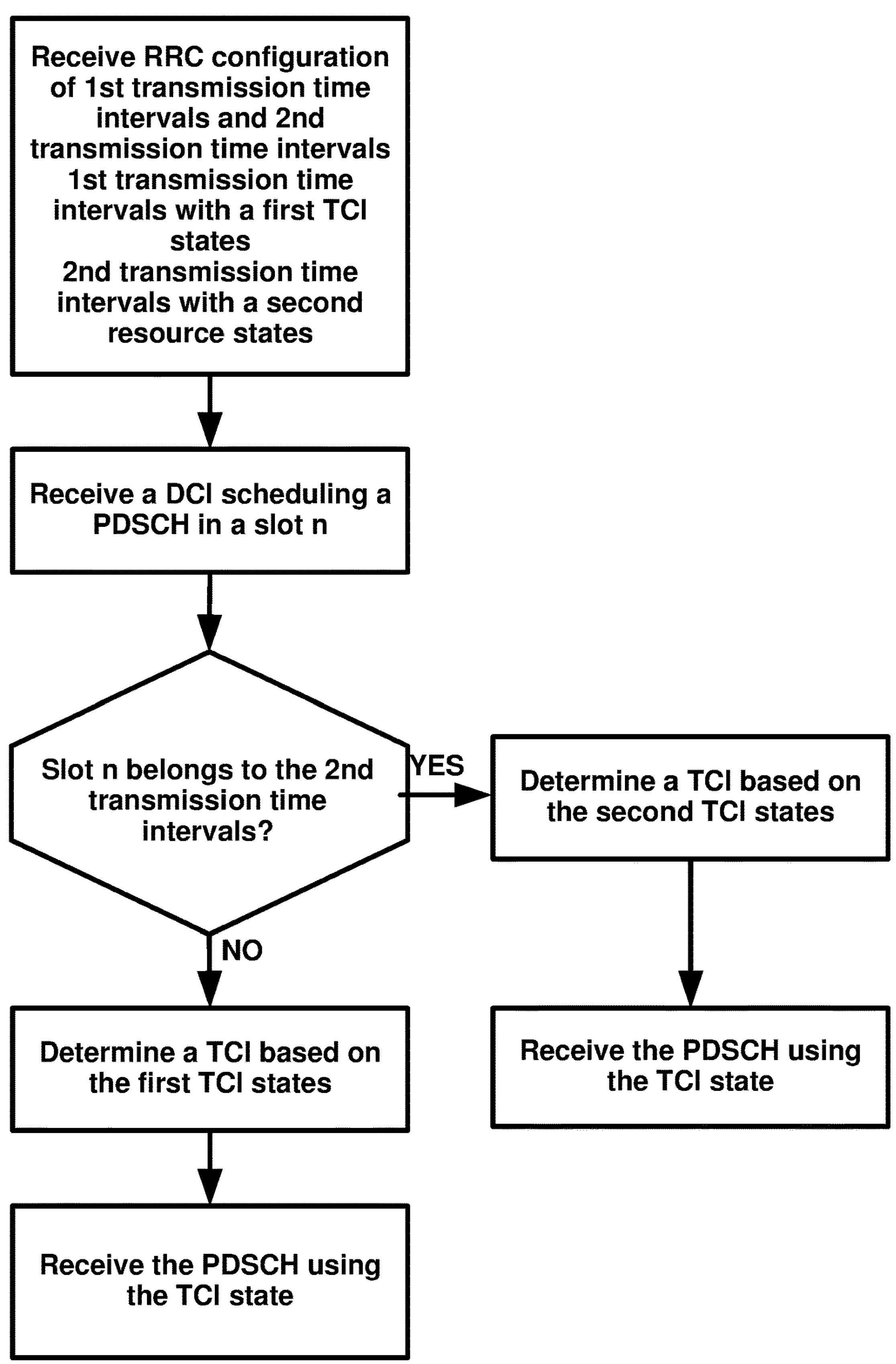
FIG. 30 is a flow diagram of an aspect of an example embodiment of the present disclosure.

FIG. 30 illustrates a flow diagram to determine a TCI state for a PDSCH based on the first set of transmission time intervals or the second set of transmission time intervals. A wireless device may determine a first default TCI state based on a first set of TCI states during a first set of transmission time intervals. The wireless device may determine a second default TCI state based on a second set of TCI states during a second set of transmission time intervals.

One or more embodiments in the specification may be also applied to a TCI state assumption and/or spatial filter assumption to transmit an uplink signal such as PUSCH, SRS, PRACH, etc.

A wireless device may be indicated with a first set of transmission time intervals associated with a first TCI states for a first TRP, and a second set of transmission time intervals associated with a second TCI states for a second TRP, either by explicit configuration or implicitly determined based on other configurations such as search space sets. The wireless device may perform on a slot n based on a rule. For example, if the slot n is not part of the first set or the second set, the wireless device may determine the slot n belongs to the first set to determine a default TCI state. For example, if the slot n is not part of the first set or the second set, the wireless device may not determine a default TCI state on a PDSCH scheduled on the slot n. If the PDSCH is indicated (implicitly or explicitly) with a TCI state by a scheduling DCI, the wireless device applies the indicated TCI state. For example, the wireless device may apply one or more TCI from the first TCI states only if the slot n belongs to the first set of transmission time interval. If the wireless device may be indicated with a TCI state not belonging to the first TCI states, the wireless device may receive nor transmit the PDSCH or a PUSCH or a channel. The wireless device may apply one or more TCI from the second TCI states only if the slot n belongs to the second set of transmission time interval. If the wireless device may be indicated with a TCI state not belonging to the second TCI states, the wireless device may not receive nor transmit the PDSCH or a PUSCH or a channel. For example, a wireless device may determine a default TCI state of a PDSCH only based on the first set and the second set. The wireless device should be able to receive or transmit any TCI state on slot n when there is a TCI state implicitly or explicitly indicated.

In response to a beam failure recovery procedure of a TRP or a CG, a wireless device may assume that one or more slots are associated with the TRP by ignoring the first set and the second set until the beam recovery procedure is completed. To enhance the opportunity of beam recovery related messages, the wireless device may temporarily disable semi-static partitioning of resources.

One or more embodiments specified in the specification may be applied to a dual connectivity scenario. A wireless device may be configured/activated with a MCG and a SCG. In an example, a first cell Cx of the MCG and a second cell Cy of the SCG may operate in the same frequency/band/carrier. The one or more embodiments specified in the specification may be applied to the first cell Cx and the second cell Cy (e.g., the first cell Cx may correspond to a first TRP, the second cell Cy may correspond to a second TRP). A first base station of MCG may configure a first set of transmission time intervals via one or more RRC signaling. A second base station of SCG may configure a second set of transmission time intervals. In an example, the first set of transmission time intervals may be applied to all cells of MCG. The second set of transmission time intervals may be applied to all cells of SCG. In an example, the first set of transmission time intervals may be applied to the first cell Cx. The second set of transmission time intervals may be applied to the second cell Cy. In an example, the first gNB may configure a first (or a second) set of transmission time intervals for a cell/frequency/band where a wireless device may receive another cell in a different cell group. The wireless device may assume resources not indicated in the configured set of transmission time intervals are used for the other CG (cell group). In an example, embodiments in the specification may be applied to one or more cell groups or one or more cells in a hand-over scenario. For example, a wireless device may switch from a source cell to a target cell based on a dual connectivity scenario where the source cell is a PCell in a MCG and the target cell is a sPCell in a SCG. In response to a hand-over completion or hand-over procedure, the MCG and SCG may be switched. For example, a wireless device may maintain a multi-TRP scenario between a source cell and a target cell in a hand-over scenario where the source cell may configure/activate the target cell utilizing a second TRP in a multi-TRP scenario. The wireless device may apply a multi-TRP scenario during a hand-over procedure. In response to a hand-over completion, a first TRP (e.g., a source cell) and the second TRP may be switched, and the second TRP may be deactivated.

A wireless device may receive one or more radio resource control (RRC) messages. The one or more RRC messages may indicate a first set of transmission time intervals and one or more first TCI states associated with the first set of transmission time intervals. The one or more RRC messages may indicate a second set of transmission time intervals and one or more second TCI states associated with the second set of transmission time intervals. The wireless device may determine a first selected TCI state for a first resource, during the first set of transmission time intervals, based on the first TCI states. The wireless device may determine a second selected TCI state for a second resource, during the second set of transmission time intervals, based on the second TCI states.

A wireless device may receive one or more radio resource control (RRC) messages. The one or more RRC messages may indicate a first set of transmission time intervals, and one or more first TCI states which are associated with the first set of transmission time intervals. The one or more RRC messages may indicate a second set of transmission time intervals, and one or more second TCI states associated with the second set of transmission time intervals. For example, the wireless device may receive one or more first search space configurations for a first TRP. The wireless device may determine each monitoring occasion or monitoring span defined by the one or more first search space may indicate the first set of transmission time intervals. The wireless device may determine additional X OFDM symbols after each monitoring occasion or monitoring span based on the one or more first search space may additionally indicate the first set of transmission time intervals. For example, the wireless device may receive one or more second search space configurations for a second TRP. The wireless device may determine each monitoring occasion or monitoring span defined by the one or more second search space may indicate the second set of transmission time intervals. The wireless device may determine additional X OFDM symbols after each monitoring occasion or monitoring span based on the one or more second search space may additionally indicate the second set of transmission time intervals. For example, the wireless device may receive one or more RRC configuration comprising the first set of transmission time intervals and the second set of transmission time intervals. The wireless device may determine a first selected TCI state for a first resource, where the first resource is during the first set of transmission time intervals, based on the set of first TCI states. The wireless device may determine a second selected TCI state for a second resource, where the second resource is during the second set of transmission time intervals, based on the set of second TCI states. The wireless device may receive or transmit one or more control and data via the first resource based on the first TCI state. The wireless device may receive or transmit one or more control and data via the second resource based on the second TCI state.

The first TCI states may be associated with a first TRP of one or more TRPs for a cell. The second TCI states may be associated with a second TRP of the one or more TRPs for the cell. The wireless device may be configured/activated with the first TRP and the second TRP for the cell by the base station.

The first TCI states may be associated with a master cell group (MCG) of one or more cell groups in a frequency. The second TCI states may be associated with a secondary cell group (SCG) of the one or more cell groups in the frequency. The wireless device may be configured/activated with a first cell of MCG and a second cell of SCG in the frequency.

The wireless device may determine a third TCI state for a PDSCH when a timing offset between a scheduling DCI for the PDSCH and the PDSCH is greater than or equal to a threshold value. The third state may be determined based on the scheduling DCI. For example, if the scheduling DCI is based on a DCI format 1_0 (e.g., a fallback DCI without having an explicit TCI field), the third TCI state is the same as a TCI state of a CORESET carrying the scheduling DCI. If the scheduling DCI may carry a TCI field, the indicated TCI state in the field is used for the third TCI state. The wireless device may use the third TCI state for the PDSCH regardless of a slot where the PDSCH is scheduled belongs to the first set of transmission time intervals or the second set of transmission time intervals.

The wireless device may support a first threshold value and a second threshold value. The first threshold value may be smaller than the second threshold value. The first threshold value may be smaller than the second threshold value. The first threshold value may be used for one or more search space scheduling a DCI comprising a resource assignment for a URLLC data. The second threshold value may be the same value as the threshold value. The threshold value may be Threshold-Sched-Offset.

A wireless device may receive one or more radio resource control (RRC) messages. The one or more RRC messages may indicate one or more first time-domain resources for a cell, and one or more first TCI states which are associated with the one or more first time-domain resources. The one or more RRC messages may indicate one or more second time-domain resources for the cell, and one or more second TCI states which are associated with the one or more second time-domain resources. The wireless device may receive a DCI and a PDSCH scheduling by the DCI. The wireless device may determine a first TCI state of the PDSCH based on the DCI when a timing offset between the DCI and the PDSCH is greater than or equal to a threshold value. The wireless device may determine a second TCI state of the PDSCH, when the timing offset between the DCI and the PDSCH is smaller than the threshold value, based on the first TCI states when a slot of the PDSCH is the one or more first time-domain resources or based on the second TCI states when the slot of the PDSCH is the one or more second time-domain resources.

A wireless device may receive one or more radio resource control (RRC) messages. The one or more RRC messages may indicate a first set of transmission time intervals, and one or more first TCI states which are associated with the first set of transmission time intervals. The one or more RRC messages may indicate a second set of transmission time intervals, and one or more second TCI states associated with the second set of transmission time intervals. For example, the wireless device may receive one or more first search space configurations for a first TRP. The wireless device may determine each monitoring occasion or monitoring span defined by the one or more first search space may indicate the first set of transmission time intervals. The wireless device may determine additional K OFDM symbols after each monitoring occasion or monitoring span based on the one or more first search space may additionally indicate the first set of transmission time intervals. For example, the wireless device may receive one or more second search space configurations for a second TRP. The wireless device may determine each monitoring occasion or monitoring span defined by the one or more second search space may indicate the second set of transmission time intervals. The wireless device may determine additional K OFDM symbols after each monitoring occasion or monitoring span based on the one or more second search space may additionally indicate the second set of transmission time intervals. For example, the wireless device may receive one or more RRC configuration comprising the first set of transmission time intervals and the second set of transmission time intervals. The wireless device may determine a first TCI state for a first resource, where the first resource is during the first set of transmission time intervals, based on the set of first TCI states. The wireless device may determine a second TCI state for a second resource, where the second resource is during the second set of transmission time intervals, based on the set of second TCI states. The wireless device may determine a third TCI state for a PDSCH when a beam failure recovery is triggered. The wireless device may apply the third TCI state if available. When the third TCI is not available, the wireless device may receive or transmit one or more control and data via the first resource based on the first TCI state. When the third TCI state is not available, the wireless device may receive or transmit one or more control and data via the second resource based on the second TCI state.

A wireless device may receive one or more radio resource control (RRC) messages. The one or more RRC messages may indicate one or more first time-domain resources for a cell, and one or more first TCI states which are associated with the one or more first time-domain resources. The one or more RRC messages may indicate one or more second time-domain resources for the cell, and one or more second TCI states which are associated with the one or more second time-domain resources. The wireless device may receive a DCI and a PDSCH scheduling by the DCI. The wireless device may determine a first TCI state of the PDSCH based on the first TCI states when a slot of the PDSCH is the one or more first time-domain resources. The wireless device may determine a second TCI state of the PDSCH based on the DCI when a timing offset between the DCI and the PDCH is greater than or equal to a threshold value or the second TCI states when the slot of PDSCH may be in the one or more second time-domain resources and the timing offset between the DCI and the PDSCH is smaller than the threshold value.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 31 is a flow diagram as per an aspect of an example embodiment of the present disclosure. At 3110, a wireless device may receive one or more radio resource control messages comprising configuration parameters of a cell. The configuration parameters may indicate a first set of transmission time intervals configured for a first control resource set (coreset) group of the cell and a first transmission configuration indicator (TCI) state of the first coreset group. The configuration parameters may indicate a second set of transmission time intervals configured for a second coreset group of the cell and a second TCI state of a second coreset group. At 3120, the wireless device may receive a first downlink control information (DCI) comprising an assignment of a resource of the cell. At 3130, the wireless device may select as a TCI state for the resource, based on which of the first set of transmission time intervals or the second set of transmission time intervals overlaps in time with the resource, one of the first TCI state or the second TCI state. At 3140, the wireless device may receive, based on the TCI state, data via the resource.

According to an example embodiment, the first TCI state may be associated with a first transmission and reception point (TRP). The first TRP may transmit, based on the first TCI state, one or more downlink signals. The first TCI state may be associated with the first TRP. The first coreset group may correspond to the first TRP. The second TCI state may be associated with a second TRP. The second TRP may transmit, based on the second TCI state, one or more downlink signals. The second TCI state may be associated with the second TRP. The second coreset group may correspond to the second TRP.

According to an example embodiment, the wireless device may receive a second DCI comprising a resource assignment for the cell. The DCI may indicate a third TCI state associated with the first coreset group and a fourth TCI state associated with the second coreset group. The DCI may indicate a first resource for a first physical downlink channel (PDSCH). A first gap between the second DCI and the first resource may be smaller than a threshold value. The DCI may indicate a second resource for a second PDSCH. The second gap between the second DCI and the second resource is equal to or larger than the threshold value. The DCI may indicate a third resource for a third PDSCH. The third gap may be between the second DCI and the third resource is larger than the second gap. The wireless device may receive the first PDSCH based on a default TCI state. The default TCI state may be determined based on a TCI state of a coreset that the wireless device monitors in a most recent slot before the first resource. The wireless device may receive the second PDSCH based on the third TCI state. The wireless device may receive the third PDSCH based on the fourth TCI state. In an example, the wireless device may receive the first PDSCH based on a default TCI state. The default TCI state may be determined as the first TCI state in response to receiving the second DCI via a first coreset of the first coreset group or as the second TCI state in response to receiving the second DCI via a second coreset of the second coreset group. For example, the threshold value is determined based on a UE capability. The wireless device may transmit the UE capability to a base station. For example, the wireless device may support a first threshold value and a second threshold value for the threshold value. For example, the first threshold value may be smaller than the second threshold value. The wireless device may select the first threshold value or the second threshold value as the threshold value based on one or more parameters of a search space. The wireless device may monitor a third DCI via the search space. For example, the wireless device may select the first threshold value as the threshold value in response to interval between two consecutive monitoring occasions of the search space is smaller than a time unit such as a slot. For example, the wireless device may select the second threshold value as the threshold value in response to interval between two consecutive monitoring occasions of the search space is equal to or greater than the time unit.

According to an example embodiment, the wireless device may determine, based on one or more first search spaces associated with one or more first coresets of the first coreset group, the first set of transmission time intervals for the first coreset group. The wireless device may determine the first set of transmission time intervals comprise one or more first slots. The wireless device may monitor DCIs via the one or more first search spaces of the first coreset group during the one or more first slots. The wireless device may determine the second set of transmission time intervals comprise one or more second slots. The one or more first slots may not comprise the one or more second slots.

According to an example embodiment, when the wireless device receives the data, DM-RS ports of a PDSCH carrying the data may be quasi-collocated with a reference signal configured in the TCI state. The wireless device may assume that the DM-RS ports of the PDSCH may be quasi-collocated with the reference signal configured in the TCI state.

According to an example embodiment, a base station may comprise the first TRP and the second TRP.

According to an example embodiment, a wireless device may receive one or more radio resource control messages indicating a first transmission configuration indicator (TCI) state of a first control resource set (coreset) group of a cell; a second TCI state of a second coreset group of the cell; and a default TCI state of the first coreset group of the cell. The wireless device may receive a downlink control information (DCI) indicating a first resource. A gap may be between the DCI and the first resource is smaller than a threshold value. The DCI may indicate a second resource. A gap may be between the DCI and the second resource is equal or larger than the threshold value. The DCI may indicate a third resource. The third resource may be a next resource of the second resource. The DCI may indicate the first TCI state may be applied for the second resource. The DCI may indicate the second TCI state may be applied for the third resource. The wireless device may determine the default state for the first resource, the first TCI state for the second resource and the second TCI state for the third resource. The wireless device may receive, based on the default TCI state, the first TCI state and the second TCI state. data via the first resource, the second resource and the third resource respectively.

According to an example embodiment, a wireless device may receive one or more radio resource control messages comprising a first transmission configuration indictor (TCI) state of a first control resource set (coreset) group of a cell and a second TCI state of a second coreset group of the cell. The one or more radio resource control messages may indicate a default TCI state. The wireless device may receive a downlink control information (DCI) comprising an assignment of a resource of the cell. A scheduling offset may be between the DCI and the resource is smaller than a threshold value. The wireless device may determine the first TCI state as a default TCI state for the resource in response to the scheduling offset being smaller than the threshold value. The wireless device may receive, based on the default TCI state, data via the resource.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail may be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:

receiving downlink control information (DCI), wherein the DCI indicates a resource for reception of a transport block;

selecting a transmission configuration indicator (TCI) state among a first TCI state associated with a first set of transmission time intervals (TTIs) and a second TCI state associated with a second set of TTIs, based on which of the first set of TTIs or the second set of TTIs overlaps in time with the resource indicated by the DCI; and receiving the transport block via the resource, based on the selected TCI state.

2. The method of claim 1, further comprising receiving configuration parameters, wherein the configuration parameters indicate the first set of TTIs and the second set of TTIs.

3. The method of claim 1, wherein the first TCI state is associated with a first transmission and reception point (TRP).

4. The method of claim 3, wherein the second TCI state is associated with a second transmission and reception point (TRP).

5. The method of claim 1, further comprising receiving a second DCI, wherein the second DCI comprises a resource assignment, wherein the resource assignment indicates:

a third TCI state associated with the first set of TTIs, a fourth TCI state associated with the second set of TTIs, a first resource for a first physical downlink shared channel (PDSCH), wherein a first gap between the second DCI and the first resource is smaller than a threshold value, a second resource for a second PDSCH, wherein a second gap between the second DCI and the second resource is equal to or larger than the threshold value, and a third resource for a third PDSCH, wherein a third gap between the second DCI and the third resource is larger than the second gap.

6. The method of claim 5, further comprising:

receiving the first PDSCH based on a default TCI state, wherein the default TCI state is determined based on a TCI state of a control resource set (coreset) monitored by the wireless device in a most recent slot before the first resource;

receiving the second PDSCH based on the third TCI state; and receiving the third PDSCH based on the fourth TCI state.

7. The method of claim 5, further comprising receiving the first PDSCH based on a default TCI state, wherein the default TCI state is the first TCI state in response to receiving the second DCI via a first coreset of a first coreset group, wherein the first set of TTIs is configured for the first coreset group; or wherein the default TCI state is the second TCI state in response to receiving the second DCI via a second coreset of a second coreset group, wherein the second set of TTIs is configured for the second coreset group.

8. The method of claim 5, wherein the threshold value is determined based on a wireless device capability; and wherein the wireless device transmits the wireless device capability to a base station.

9. The method of claim 1, further comprising determining the first set of TTIs for the first coreset group, based on one or more first search spaces associated with one or more first coresets of a first coreset group.

10. The method of claim 9, further comprising:

determining the first set of TTIs comprise one or more first slots, wherein the wireless device monitors DCIs via the one or more first search spaces of the first coreset group during the one or more first slots; and determining the second set of TTIs comprise one or more second slots, wherein the one or more first slots do not comprise the one or more second slots.

11. A wireless device comprising: one or more processors; and memory storing instructions that, when executed by the one or more processors, cause the wireless device to:

receive downlink control information (DCI), wherein the DCI indicates a resource for reception of a transport block;

select a transmission configuration indicator (TCI) state among a first TCI state associated with a first set of transmission time intervals (TTIs) and a second TCI state associated with a second set of TTIs, based on which of the first set of TTIs or the second set of TTIs overlaps in time with the resource indicated by the DCI; and receive the transport block via the resource based on the selected TCI state.

12. The wireless device of claim 11, wherein the instructions further cause the wireless device to receive configuration parameters indicating the first set of TTIs and the second set of TTIs.

13. The wireless device of claim 11, wherein the first TCI state is associated with a first transmission and reception point (TRP).

14. The wireless device of claim 13, wherein the second TCI state is associated with a second transmission and reception point (TRP).

15. The wireless device of claim 11, wherein the instructions further cause the wireless device to receive a second DCI;

wherein the second DCI comprises a resource assignment;

wherein the resource assignment indicates a third TCI state associated with the first set of TTIs;

wherein the resource assignment indicates a fourth TCI state associated with the second set of TTIs;

wherein the resource assignment indicates a first resource for a first physical downlink shared channel (PDSCH), wherein a first gap between the second DCI and the first resource is smaller than a threshold value;

wherein the resource assignment indicates a second resource for a second PDSCH, wherein a second gap between the second DCI and the second resource is equal to or larger than the threshold value; and wherein the resource assignment indicates a third resource for a third PDSCH, wherein a third gap between the second DCI and the third resource is larger than the second gap.

16. The wireless device of claim 15, wherein the instructions further cause the wireless device to receive:

the first PDSCH based on a default TCI state, wherein the default TCI state is determined based on a TCI state of a control resource set (coreset) monitored by the wireless device in a most recent slot before the first resource;

the second PDSCH based on the third TCI state; and the third PDSCH based on the fourth TCI state.

17. The wireless device of claim 15, wherein the instructions further cause the wireless device to receive the first PDSCH based on a default TCI state, wherein the default TCI state is the first TCI state in response to receiving the second DCI via a first coreset of a first coreset group, wherein the first set of TTIs is configured for the first coreset group; or wherein the default TCI state is the second TCI state in response to receiving the second DCI via a second coreset of a second coreset group, wherein the second set of TTIs is configured for the second coreset group.

18. The wireless device of claim 15, wherein the threshold value is determined based on a wireless device capability; and wherein the wireless device transmits the wireless device capability to a base station.

19. The wireless device of claim 11, wherein the instructions further cause the wireless device to determine the first set of TTIs for the first coreset group based on one or more first search spaces associated with one or more first coresets of a first coreset group.

20. A system comprising:

a base station;

one or more first processors; and first memory storing first instructions that, when executed by the one or more first processors, cause the base station to transmit downlink control information (DCI) indicating a resource for reception of a transport block; and a wireless device comprising:

one or more second processors; and second memory storing second instructions that, when executed by the one or more second processors, cause the wireless device to:

receive the DCI;

select, for reception of the transport block, a transmission configuration indicator (TCI) state among a first TCI state associated with a first set of transmission time intervals (TTIs) and a second TCI state associated with a second set of TTIs, based on which of the first set of TTIs or the second set of TTIs overlaps in time with the resource indicated by the DCI; and receive, from the base station and based on the selected TCI state, the transport block via the resource.

* * * * *